(12) United States Patent
Imoto et al.

(10) Patent No.: US 9,790,359 B2
(45) Date of Patent: Oct. 17, 2017

(54) TREAD RUBBER COMPOSITION AND PNEUMATIC TIRE

(71) Applicant: SUMITOMO RUBBER INDUSTRIES, LTD., Kobe-shi, Hyogo (JP)

(72) Inventors: Yoji Imoto, Kobe (JP); Masato Kawase, Kobe (JP); Masako Nakatani, Kobe (JP); Ryuichi Tokimune, Kobe (JP); Akinori Nagae, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 117 days.

(21) Appl. No.: 14/400,251

(22) PCT Filed: Jun. 7, 2013

(86) PCT No.: PCT/JP2013/065777
§ 371 (c)(1),
(2) Date: Nov. 10, 2014

(87) PCT Pub. No.: WO2013/183743
PCT Pub. Date: Dec. 12, 2013

(65) Prior Publication Data
US 2015/0099823 A1    Apr. 9, 2015

(30) Foreign Application Priority Data

Jun. 8, 2012  (JP) ................. 2012-131221
Jun. 18, 2012 (JP) ................. 2012-137165
Jun. 18, 2012 (JP) ................. 2012-137167

(51) Int. Cl.
| | |
|---|---|
| *B60C 1/00* | (2006.01) |
| *C08K 5/548* | (2006.01) |
| *C08L 47/00* | (2006.01) |
| *C08L 43/04* | (2006.01) |
| *C08K 3/36* | (2006.01) |
| *C08L 9/00* | (2006.01) |
| *C08F 236/14* | (2006.01) |
| *C08C 19/44* | (2006.01) |

(52) U.S. Cl.
CPC ............. *C08L 47/00* (2013.01); *B60C 1/00* (2013.01); *B60C 1/0016* (2013.01); *C08F 236/14* (2013.01); *C08K 3/36* (2013.01); *C08K 5/548* (2013.01); *C08L 9/00* (2013.01); *C08L 43/04* (2013.01); *C08C 19/44* (2013.01); *C08L 2205/03* (2013.01); *Y02T 10/862* (2013.01)

(58) Field of Classification Search
CPC ............ C08L 43/04; C08K 3/36; C08K 5/548
See application file for complete search history.

(56) References Cited

U.S. PATENT DOCUMENTS

| | | |
|---|---|---|
| 3,485,857 A | 12/1969 | Speier |
| 3,504,007 A | 3/1970 | Owen et al. |
| 3,853,994 A | 12/1974 | Barcza |
| 3,900,679 A | 8/1975 | Marzocchi |
| 4,183,844 A | 1/1980 | Streck et al. |
| 4,396,751 A | 8/1983 | Kampf et al. |
| 4,894,409 A | 1/1990 | Shimada et al. |
| 5,128,416 A | 7/1992 | Imai et al. |
| 5,189,109 A | 2/1993 | Imai et al. |

(Continued)

FOREIGN PATENT DOCUMENTS

| | | |
|---|---|---|
| CN | 102093602 A | 6/2011 |
| CN | 102212218 A | 10/2011 |

(Continued)

OTHER PUBLICATIONS

Machine translation of JP 2009-263420 A, Nov. 12, 2009.*

(Continued)

*Primary Examiner* — Vickey Nerangis
(74) *Attorney, Agent, or Firm* — Birch, Stewart, Kolasch & Birch, LLP

(57) ABSTRACT

Provided are a tread rubber composition that can achieve a balanced improvement in fuel economy, wet-grip performance, and abrasion resistance, and a pneumatic tire including the composition. The tread rubber composition includes: a rubber component; silica; and a silane-coupling agent containing a mercapto group, the rubber component including per 100% by mass thereof 5% by mass or more of a conjugated diene polymer (A), the polymer (A) including a monomer unit derived from a conjugated diene, a monomer unit derived from a compound of formula (1), and a monomer unit derived from a compound of formula (2), at least one end of the copolymer (A) being modified by the following compound (G) or an alkoxysilane compound, the composition including 5-150 parts by mass of the silica per 100 parts by mass of the rubber component, Compound (G): at least one compound selected from the group consisting of compounds containing an optionally-substituted amino group and a carbonyl group and compounds containing an optionally-substituted amino group and a thiocarbonyl group, $$V^1 \text{-} S^1 \qquad (1)$$

$$V^2 \text{-} A^2 \qquad (2)$$

wherein $V^1$ and $V^2$ each represent a hydrocarbyl group containing a polymerizable carbon-carbon double bond; $S^1$ represents a substituted silyl group, and $A^2$ represents a substituted amino group or a nitrogen-containing heterocyclic group.

6 Claims, No Drawings

(56) References Cited

U.S. PATENT DOCUMENTS

| | | | |
|---|---|---|---|
| 5,459,205 A | 10/1995 | Furukawa | |
| 5,508,333 A | 4/1996 | Shimizu | |
| 5,821,290 A | 10/1998 | Labauze | |
| 6,627,721 B1 | 9/2003 | Rodewald et al. | |
| 7,041,761 B2 | 5/2006 | Halasa et al. | |
| 7,342,070 B2 | 3/2008 | Tsukimawashi et al. | |
| 8,334,339 B2 * | 12/2012 | Ito | C08F 236/04 524/547 |
| 2005/0203251 A1 | 9/2005 | Oshima et al. | |
| 2006/0004143 A1 | 1/2006 | Inagaki et al. | |
| 2007/0088132 A1 | 4/2007 | Taniguchi et al. | |
| 2008/0289740 A1 | 11/2008 | Mori et al. | |
| 2008/0319151 A1 | 12/2008 | Oshima | |
| 2009/0163668 A1 | 6/2009 | Yamada et al. | |
| 2009/0203826 A1 | 8/2009 | Rachita et al. | |
| 2009/0203843 A1 | 8/2009 | Fukuoka et al. | |
| 2009/0247692 A1 | 10/2009 | Oshima et al. | |
| 2010/0056713 A1 | 3/2010 | Oshima | |
| 2010/0317852 A1 | 12/2010 | Tonomura et al. | |
| 2011/0082251 A1 | 4/2011 | Oshima | |
| 2011/0136962 A1 | 6/2011 | Hattori et al. | |
| 2011/0237737 A1 | 9/2011 | Fujii et al. | |
| 2011/0245370 A1 | 10/2011 | Uesaka et al. | |
| 2011/0245407 A1 | 10/2011 | Ito, I et al. | |
| 2011/0275755 A1 | 11/2011 | Oshima et al. | |
| 2012/0041134 A1 | 2/2012 | Ito et al. | |
| 2012/0041135 A1 | 2/2012 | Ito et al. | |
| 2012/0041136 A1 | 2/2012 | Ito et al. | |

FOREIGN PATENT DOCUMENTS

| | | |
|---|---|---|
| CN | 102382257 A | 3/2012 |
| CN | 102382258 A | 3/2012 |
| CN | 102432759 A | 5/2012 |
| EP | 0334042 A2 | 9/1989 |
| JP | 1-217011 A | 8/1989 |
| JP | 1-217047 A | 8/1989 |
| JP | 7-82422 A | 3/1995 |
| JP | 2000-344955 A | 12/2000 |
| JP | 2003-160603 A | 6/2003 |
| JP | 2009263420 A * | 11/2009 |
| JP | 2011-140547 A | 7/2011 |
| JP | 2011-140613 A | 7/2011 |
| JP | 2011-144349 A | 7/2011 |
| JP | 2011-148952 A | 8/2011 |
| JP | 2011-231303 A | 11/2011 |

OTHER PUBLICATIONS

Machine translation of Japanese Publication No. 2011-140547-A, published Jul. 21, 2011.
Machine translation of Japanese Publication No. 2011-144349-A, published Jul. 28, 2011.
Machine translation of Japanese Publication No. 2011-148952-A, published Aug. 4, 2011.
International Search Report for PCT/JP2013/065777 mailed on Sep. 17, 2013.

* cited by examiner

TREAD RUBBER COMPOSITION AND PNEUMATIC TIRE

TECHNICAL FIELD

The present invention relates to tread rubber compositions and pneumatic tires formed from the tread rubber compositions.

BACKGROUND ART

Rubber compositions containing a conjugated diene polymer (e.g. polybutadiene, a butadiene-styrene copolymer) and a filler (e.g. carbon black, silica), for example, are used as rubber compositions for automobile tires. Nowadays, fuel-efficient automobiles are more and more demanded due to the public's increasing concern about environmental issues. Thus, rubber compositions for automobile tires with higher fuel economy are also desired.

Methods for enhancing fuel economy have been proposed. For example, Patent Literature 1 proposes the use of a diene rubber (modified rubber) which is modified by an organic silicon compound containing an amino group and an alkoxy group. However, the increasing concern on environmental issues nowadays demands further improved fuel economy. Moreover, other performance properties required for rubber compositions for automobile tires include wet grip performance and abrasion resistance, which are usually opposed to fuel economy. Thus, it has been difficult to provide high levels of these properties in a balanced manner.

CITATION LIST

Patent Literature 1: JP 2000-344955 A

SUMMARY OF INVENTION

Technical Problem

The present invention is devised to solve the above problem, and aims to provide tread rubber compositions that can achieve a balanced improvement in fuel economy, wet grip performance, and abrasion resistance, and pneumatic tires including the tread rubber compositions.

Solution to Problem

A first aspect of the present invention relates to a tread rubber composition, including:
a rubber component;
silica; and
a silane coupling agent containing a mercapto group,
the rubber component including a conjugated diene polymer (A) in an amount of 5% by mass or more per 100% by mass of the rubber component, the conjugated diene polymer (A) including a monomer unit derived from a conjugated diene, a monomer unit derived from a compound represented by the following formula (1), and a monomer unit derived from a compound represented by the following formula (2), at least one end of the copolymer (A) being modified by the following compound (G) or an alkoxysilane compound,
the tread rubber composition including the silica in an amount of 5 to 150 parts by mass relative to 100 parts by mass of the rubber component,

[Chem. 1]

$$V^1-S^1 \quad (1)$$

wherein $V^1$ represents a hydrocarbyl group containing a polymerizable carbon-carbon double bond; and $S^1$ represents a substituted silyl group,

[Chem. 2]

$$V^2-A^2 \quad (2)$$

wherein $V^2$ represents a hydrocarbyl group containing a polymerizable carbon-carbon double bond; and $A^2$ represents a substituted amino group or a nitrogen-containing heterocyclic group, Compound (G): at least one compound selected from the group consisting of compounds containing an optionally substituted amino group and a carbonyl group and compounds containing an optionally substituted amino group and a thiocarbonyl group.

The group represented by $V^2$ in the formula (2) is preferably a group represented by the following formula (2-V1):

[Chem. 3]

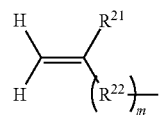

(2-V1)

wherein $R^{21}$ represents a hydrogen atom or a hydrocarbyl group; m represents 0 or 1; and $R^{22}$ represents a hydrocarbylene group.

The substituted amino group for $A^2$ in the formula (2) is preferably a group represented by the following formula (2-A),

[Chem. 4]

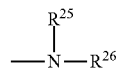

(2-A)

wherein $R^{25}$ and $R^{26}$ each represent a hydrocarbyl group or a trihydrocarbylsilyl group, or $R^{25}$ and $R^{26}$ are joined together to form a hydrocarbylene group optionally containing at least one of a nitrogen atom and an oxygen atom as a hetero atom, or $R^{25}$ and $R^{26}$ together form a single group bonded to the nitrogen atom via a double bond.

Preferably, the compound (G) is a compound represented by the following formula (3); and the alkoxysilane compound is a compound represented by the following formula (4),

[Chem. 5]

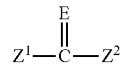

(3)

wherein E represents an oxygen atom or a sulfur atom; and $Z^1$ and $Z^2$ each represent a substituted amino group, a hydrogen atom, an optionally substituted hydrocarbyl group, or an optionally substituted hydrocarbyloxy group, provided that at least one of $Z^1$ and $Z^2$ is a group containing a substituted amino group, or $Z^1$ and $Z^2$ are joined together to form, together with the carbonyl carbon atom, a cyclic structure containing a substituted amino group,

[Chem. 6]

$$R^{42}-\underset{\underset{R^{43}}{|}}{\overset{\overset{R^{41}}{|}}{Si}}-(CH_2)_v-A^4 \quad (4)$$

wherein v represents an integer of 1 to 10; $R^{41}$, $R^{42}$, and $R^{43}$ each independently represent an alkyl group or an alkoxy group, and at least one of $R^{41}$, $R^{42}$, and $R^{43}$ is an alkoxy group; and $A^4$ represents a substituted amino group.

Preferably, in the formula (3), E is an oxygen atom; $Z^1$ is a group represented by the following formula (3-Z); and $Z^2$ is a hydrocarbyl group or a group represented by the following formula (3-Z):

[Chem. 7]

$$-(T)_p-A^3 \quad (3-Z)$$

wherein p represents 0 or 1; T represents a C1-10 hydrocarbylene group, a group represented by the following formula (3-Ta), or a group represented by the following formula (3-Tb); and $A^3$ represents a substituted amino group, and when $Z^2$ in the formula (3) is a hydrocarbyl group, $A^3$ of $Z^1$ and the hydrocarbyl group of $Z^2$ may be bonded, and when $Z^2$ in the formula (3) is a group represented by the formula (3-Z), $A^3$ of $Z^1$ and $A^3$ of $Z^2$ may be bonded,

[Chem. 8]

$$-O-R^{31}- \quad (3-Ta)$$

wherein $R^{31}$ represents a C1-10 hydrocarbylene group; and $R^{31}$ and $A^3$ are bonded,

[Chem. 9]

$$-\underset{\underset{R^{33}}{|}}{N}-R^{32}- \quad (3-Tb)$$

wherein $R^{32}$ represents a C1-10 hydrocarbylene group; $R^{33}$ represents a hydrogen atom or a C1-10 hydrocarbyl group; and $R^{32}$ and $A^3$ are bonded.

Preferably, the group represented by $V^1$ in the formula (1) is a group represented by the following formula (1-V1); and the group represented by $S^1$ in the formula (1) is a group represented by the following formula (1-S),

[Chem. 10]

$$\underset{H}{\overset{H}{\diagdown}}C=C\underset{(R^{12})_n-}{\overset{R^{11}}{\diagup}} \quad (1-V1)$$

wherein $R^{11}$ represents a hydrogen atom or a hydrocarbyl group; n represents 0 or 1; and $R^{12}$ represents a hydrocarbylene group,

[Chem. 11]

$$-\underset{\underset{X^3}{|}}{\overset{\overset{X^1}{|}}{Si}}-X^2 \quad (1-S)$$

wherein $X^1$, $X^2$, and $X^3$ each independently represent a substituted amino group or an optionally substituted hydrocarbyl group, and at least one of $X^1$, $X^2$, and $X^3$ is a substituted amino group.

Preferably, in the formula (1-V1), $R^{11}$ is a hydrogen atom; and n is 0.

The conjugated diene polymer (A) preferably has a vinyl bond content of at least 20 mol % but not more than 70 mol % based on 100 mol % of the constituent unit derived from a conjugated diene.

A second aspect of the present invention relates to a tread rubber composition, including:
 a rubber component;
 silica; and
 a silane coupling agent containing a mercapto group,
 the rubber component including a conjugated diene polymer (B) in an amount of 5% by mass or more per 100% by mass of the rubber component, the conjugated diene polymer (B) including a monomer unit derived from a conjugated diene, a monomer unit derived from a compound represented by the following formula (5), and a monomer unit derived from a compound represented by the following formula (6),
 the tread rubber composition including the silica in an amount of 5 to 150 parts by mass relative to 100 parts by mass of the rubber component,

[Chem. 12]

$$\underset{H}{\overset{H}{\diagdown}}C=C\underset{(R^{52})_w}{\overset{R^{51}}{\diagup}}\underset{\underset{X^{53}}{|}}{\overset{\overset{X^{51}}{|}}{Si}}-X^{52} \quad (5)$$

wherein $R^{51}$ represents a hydrogen atom or a hydrocarbyl group; w represents 0 or 1; $R^{52}$ represents a hydrocarbylene group; and $X^{51}$, $X^{52}$, and $X^{53}$ each independently represent a substituted amino group or an optionally substituted hydrocarbyl group, and at least one of $X^{51}$, $X^{52}$, and $X^{53}$ is a substituted amino group,

[Chem. 13]

$$\underset{H}{\overset{H}{\diagdown}}C=C\underset{(R^{62})_x-A^6}{\overset{R^{61}}{\diagup}} \quad (6)$$

wherein $R^{61}$ represents a hydrogen atom or a hydrocarbyl group; x represents 0 or 1; $R^{62}$ represents a hydrocarbylene group; and $A^6$ represents a substituted amino group or a nitrogen-containing heterocyclic group.

Preferably, in the formula (5), $R^{51}$ is a hydrogen atom; and w is 0.

Preferably, in the formula (6), $R^{61}$ is a hydrogen atom; x is 1; $R^{62}$ is a group represented by the following formula (6-Y); and A is a substituted amino group,

[Chem. 14]

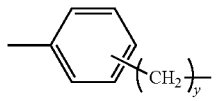

(6-Y)

wherein y represents an integer of 0 to 5; and when y is an integer of 1 to 5, $(CH_2)_y$ represents a substituent on the benzene ring and is bonded to $A^6$, and when y is 0, $(CH_2)_y$ represents a bond between the benzene ring and $A^6$.

The conjugated diene polymer (B) preferably has a vinyl bond content of at least 20 mol % but not more than 70 mol % based on 100 mol % of the constituent unit derived from a conjugated diene.

Preferably, the silane coupling agent is at least one of a silane coupling agent represented by the following formula (I) and a silane coupling agent containing a linking unit B represented by the following formula (II) and a linking unit A represented by the following formula (III),

[Chem. 15]

$$R^{102}-\underset{\underset{R^{103}}{|}}{\overset{\overset{R^{101}}{|}}{Si}}-R^{104}-SH \qquad (I)$$

wherein $R^{101}$ to $R^{103}$ each represent a branched or unbranched C1-12 alkyl group, a branched or unbranched C1-12 alkoxy group, or a group represented by —O—$(R^{111}$—O$)_b$—$R^{112}$ where b $R^{111}$s each represent a branched or unbranched C1-30 divalent hydrocarbon group, and b $R^{111}$s may be the same as or different from one another; $R^{112}$ represents a branched or unbranched C1-30 alkyl group, a branched or unbranched C2-30 alkenyl group, a C6-30 aryl group, or a C7-30 aralkyl group; and b represents an integer of 1 to 30, and $R^{101}$ to $R^{103}$ may be the same as or different from one another; and $R^{104}$ represents a branched or unbranched C1-6 alkylene group,

[Chem. 16]

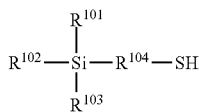

(II)

[Chem. 17]

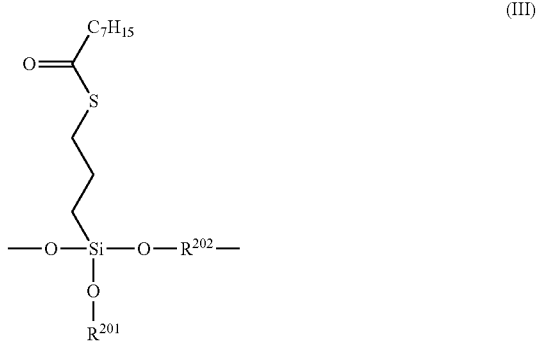

(III)

wherein $R^{201}$ represents a hydrogen atom, a halogen atom, a branched or unbranched C1-30 alkyl group, a branched or unbranched C2-30 alkenyl group, a branched or unbranched C2-30 alkynyl group, or the alkyl group in which a terminal hydrogen atom is replaced with a hydroxy group or a carboxyl group; and $R^{202}$ represents a branched or unbranched C1-30 alkylene group, a branched or unbranched C2-30 alkenylene group, or a branched or unbranched C2-30 alkynylene group, provided that $R^{201}$ and $R^{202}$ together may form a cyclic structure.

The present invention also relates to pneumatic tires, formed from the rubber compositions.

Advantageous Effects of Invention

The tread rubber compositions of the present invention include a conjugated diene polymer (A) including specific monomer units and having an end thereof modified by a specific compound, and/or a conjugated diene polymer (B) including specific monomer units, silica, and a silane coupling agent containing a mercapto group. The use of such a tread rubber composition provides pneumatic tires having a balanced improvement in fuel economy, wet grip performance, and abrasion resistance.

DESCRIPTION OF EMBODIMENTS

The conjugated diene polymer (A) according to the first aspect of the present invention includes a monomer unit derived from a conjugated diene, a monomer unit derived from a compound represented by the following formula (1), and a monomer unit derived from a compound represented by the following formula (2), and at least one end of the copolymer (A) is modified by the following compound (G) or an alkoxysilane compound,

[Chem. 18]

$$V^1\text{-}S^1 \qquad (1)$$

wherein $V^1$ represents a hydrocarbyl group containing a polymerizable carbon-carbon double bond; and $S^1$ represents a substituted silyl group,

[Chem. 19]

$$V^2\text{-}A^2 \qquad (2)$$

wherein $V^2$ represents a hydrocarbyl group containing a polymerizable carbon-carbon double bond; and $A^2$ represents a substituted amino group or a nitrogen-containing heterocyclic group, Compound (G): at least one compound selected from the group consisting of compounds containing an optionally substituted amino group and a carbonyl group and compounds containing an optionally substituted amino group and a thiocarbonyl group.

Herein, the hydrocarbyl group refers to a hydrocarbon residue. The hydrocarbylene group refers to a divalent hydrocarbon residue. The nitrogen-containing heterocyclic group refers to a group obtained by removing one hydrogen atom from a carbon atom on a heterocyclic ring of a compound having a nitrogen-containing heterocyclic ring, and the nitrogen-containing heterocyclic ring refers to an aromatic heterocyclic ring that contains a nitrogen atom as a hetero atom included in the ring.

Examples of the conjugated dienes include 1,3-butadiene, isoprene, 1,3-pentadiene, 2,3-dimethyl-1,3-butadiene, and 1,3-hexadiene, and one or more kinds of them are used. The conjugated diene is preferably 1,3-butadiene or isoprene.

$V^1$ in the formula (1) represents a hydrocarbyl group containing a polymerizable carbon-carbon double bond.

$V^1$ is preferably a group represented by the following formula (1-V):

[Chem. 20]

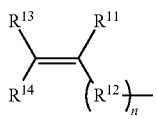

(1-V)

wherein n represents 0 or 1; $R^{11}$, $R^{13}$, and $R^{14}$ each independently represent a hydrogen atom or a hydrocarbyl group; and $R^{12}$ represents a hydrocarbylene group.

In the formula (1-V), n represents 0 or 1.

Examples of the hydrocarbyl groups for $R^{11}$, $R^{13}$, and $R^{14}$ include alkyl groups, alkenyl groups, and aryl groups. Examples of the alkyl groups include a methyl group, an ethyl group, a n-propyl group, an isopropyl group, a n-butyl group, a sec-butyl group, and a tert-butyl group, and preferably a methyl group. Examples of the alkenyl groups include a vinyl group, an allyl group, a 1-propenyl group, and a 1-methylethenyl group, and preferably a vinyl group. Examples of the aryl groups include a phenyl group, a methylphenyl group, and an ethylphenyl group, and preferably a phenyl group.

$R^{11}$, $R^{13}$, and $R^{14}$ each are preferably a hydrogen atom, a methyl group, a vinyl group, or a phenyl group, and more preferably a hydrogen atom.

Examples of the hydrocarbylene groups for $R^{12}$ include alkylene groups, arylene groups, and groups in which an arylene group and an alkylene group are bonded.

Examples of the alkylene groups include a methylene group, an ethylene group, and a trimethylene group, and preferably a methylene group or an ethylene group. Examples of the arylene groups include a phenylene group, a naphthylene group, and a biphenylene group, and preferably a phenylene group.

Examples of the groups in which an arylene group and an alkylene group are bonded include groups in which a phenylene group and an alkylene group are bonded, groups in which a naphthylene group and an alkylene group are bonded, and groups in which a biphenylene group and an alkylene group are bonded.

Preferably, the group in which an arylene group and an alkylene group are bonded is such that a carbon atom in the arylene group of the group is bonded to the carbon atom to which $R^{11}$ in the formula (1-V1) is bonded.

Examples of the groups in which a phenylene group and an alkylene group are bonded (phenylene-alkylene groups, such as, for example, groups represented by the following formula (1-R)) include para-phenylene-alkylene groups (for example, groups represented by the following formula (1-Ra)), meta-phenylene-alkylene groups (for example, groups represented by the following formula (1-Rb)), and ortho-phenylene-alkylene groups (for example, groups represented by the following formula (1-Rc)), depending on the position of a carbon atom on the benzene ring from which a hydrogen atom has been removed and the position of a carbon atom on the benzene ring to which the alkylene group is bonded,

[Chem. 21]

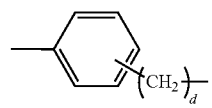

(1-R)

wherein d represents an integer of 1 to 10, and $(CH_2)_d$ represents a substituent on the benzene ring,

[Chem. 22]

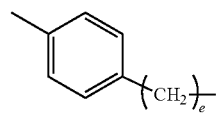

(1-Ra)

[Chem. 23]

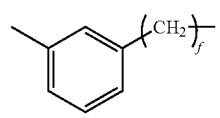

(1-Rb)

[Chem. 24]

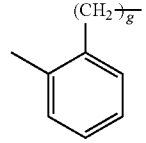

(1-Rc)

wherein e, f, and g each represent an integer of 1 to 10.

The group in which an arylene group and an alkylene group are bonded is preferably a group in which a phenylene group and an alkylene group are bonded, more preferably a group represented by the formula (1-Ra), or a group represented by the formula (1-Rb), and still more preferably a para-phenylene-methylene group (a group represented by the formula (1-Ra) with e=1), a meta-phenylene-methylene group (a group represented by the formula (1-Rb) with f=1), a para-phenylene-ethylene group (a group represented by the formula (1-Ra) with e=2), or a meta-phenylene-ethylene group (a group represented by the formula (1-Rb) with f=2).

Examples of the groups represented by the formula (1-V) include the following groups:

those in which $R^{11}$, $R^{13}$, and $R^{14}$ are hydrogen atoms, including a vinyl group, a vinylmethyl group, a vinylethyl group, a 4-vinylphenyl group, a 3-vinylphenyl group, a (4-vinylphenyl)methyl group, a 2-(4-vinylphenyl)ethyl group, a (3-vinylphenyl)methyl group, and a 2-(3-vinylphenyl)ethyl group;

those in which $R^{11}$ is a methyl group, and $R^{13}$ and $R^{14}$ are hydrogen atoms, including an isopropenyl group, a methallyl group, a 4-isopropenylphenyl group, a 3-isopropenylphenyl group, a (4-isopropenylphenyl)methyl group, a 2-(4-isopropenylphenyl)ethyl group, a (3-isopropenylphenyl)methyl group, and a 2-(3-isopropenylphenyl)ethyl group;

those in which $R^{11}$ is a vinyl group, and $R^{13}$ and $R^{14}$ are hydrogen atoms, including a 1-methylene-2-propenyl group and a 2-methylene-3-butenyl group;

those in which $R^{11}$ is a phenyl group, and $R^{13}$ and $R^{14}$ are hydrogen atoms, including a 4-(1-phenylvinyl)phenyl group, a 3-(1-phenylvinyl)phenyl group, and a 2-(1-phenylvinyl)phenyl group; and those in which $R^{11}$ is a hydrogen atom, $R^{13}$ is a methyl group, and $R^{14}$ is a hydrogen atom, including a 1-propenyl group, a crotyl group, a 4-(1-propenyl)phenyl group, a 4-(1-propenyl)phenylmethyl group, a 2-{4-(1-propenyl)phenyl}ethyl group, a 3-(1-propenyl)phenyl group, a 3-(1-propenyl)phenylmethyl group, and a 2-{3-(1-propenyl)phenyl}ethyl group.

The group represented by the formula (1-V) is preferably a group represented by the following formula (1-V1).

[Chem. 25]

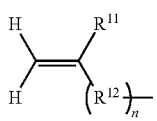

(1-V1)

wherein $R^{11}$ represents a hydrogen atom or a hydrocarbyl group; n represents 0 or 1; and $R^{12}$ represents a hydrocarbylene group.

The group represented by the formula (1-V1) is preferably a vinyl group, a 4-vinylphenyl group, a 3-vinylphenyl group, a (4-vinylphenyl)methyl group, a 2-(4-vinylphenyl)ethyl group, a (3-vinylphenyl)methyl group, or a 2-(3-vinylphenyl)ethyl group as a group in which $R^{11}$ is a hydrogen atom; a 4-isopropenylphenyl group, a 3-isopropenylphenyl group, a (4-isopropenylphenyl)methyl group, a 2-(4-isopropenylphenyl)ethyl group, a (3-isopropenylphenyl)methyl group, or a 2-(3-isopropenylphenyl)ethyl group as a group in which $R^{11}$ is a methyl group; a 1-methylene-2-propenyl group or a 2-methylene-3-butenyl group as a group in which $R^{11}$ is a vinyl group; and a 4-(1-phenylvinyl)phenyl group as a group in which $R^{11}$ is a phenyl group.

The group represented by the formula (1-V1) is still more preferably a vinyl group.

$S^1$ in the formula (1) represents a substituted silyl group.

Examples of the substituted silyl groups represented by $S^1$ include silyl groups in which a hydrogen atom bonded to the silicon atom is substituted with a substituent, such as an optionally substituted hydrocarbyl group, a hydrocarbyloxy group, or a substituted amino group. Substituents bonded to the silicon atom may be the same as or different from one another.

The substituted silyl group represented by $S^1$ is preferably a group represented by the following formula (1-S):

[Chem. 26]

(1-S)

wherein $X^1$, $X^2$, and $X^3$ each independently represent a substituted amino group or an optionally substituted hydrocarbyl group, and at least one of $X^1$, $X^2$, and $X^3$ is a substituted amino group.

Examples of the optionally substituted hydrocarbyl groups for $X^1$, $X^2$, and $X^3$ include hydrocarbyl groups optionally containing at least one selected from the group consisting of an oxygen atom, a nitrogen atom, and a silicon atom.

Examples of the hydrocarbyl groups for $X^1$, $X^2$, and $X^3$ include alkyl groups, alkenyl groups, alkynyl groups, aryl groups, and aralkyl groups. Examples of the alkyl groups include a methyl group, an ethyl group, a n-propyl group, an isopropyl group, a n-butyl group, a sec-butyl group, and a tert-butyl group. Examples of the alkenyl groups include a vinyl group, an allyl group, a 1-propenyl group, and a 1-methylethenyl group. Examples of the alkynyl groups include an ethynyl group and a propargyl group. Examples of the aryl groups include a phenyl group, a tolyl group, and a xylyl group. Examples of the aralkyl groups include a benzyl group. The hydrocarbyl group is preferably an alkyl group.

Examples of the hydrocarbyl groups containing an oxygen atom for $X^1$, $X^2$, and $X^3$ include alkoxyalkyl groups, such as a methoxymethyl group, a methoxyethyl group, an ethoxymethyl group, or an ethoxyethyl group.

Examples of the hydrocarbyl groups containing a nitrogen atom for $X^1$, $X^2$, and $X^3$ include dialkylaminoalkyl groups, such as a dimethylaminomethyl group, a dimethylaminoethyl group, a diethylaminomethyl group, or a diethylaminoethyl group.

Examples of the hydrocarbyl groups containing a silicon atom for $X^1$, $X^2$, and $X^3$ include trialkylsilylalkyl groups, such as a trimethylsilylmethyl group, a trimethylsilylethyl group, a triethylsilylmethyl group, or a triethylsilylethyl group.

The optionally substituted hydrocarbyl group for $X^1$, $X^2$, and $X^3$ preferably has 1 to 10 carbon atoms, and more preferably has 1 to 4 carbon atoms.

The optionally substituted hydrocarbyl group for $X^1$, $X^2$, and $X^3$ is preferably an alkyl group or an alkoxyalkyl group. The alkyl group is preferably a C1-4 alkyl group, and more preferably a methyl group or an ethyl group. The alkoxyalkyl group is preferably a C2-4 alkoxyalkyl group.

The substituted amino group for $X^1$, $X^2$, and $X^3$ is preferably a group represented by the following formula (1-X):

[Chem. 27]

(1-X)

wherein $R^{15}$ and $R^{16}$ each represent a hydrocarbyl group or a trihydrocarbylsilyl group, or $R^{15}$ and $R^{16}$ are joined together to form a hydrocarbylene group optionally containing a nitrogen atom and/or an oxygen atom as a hetero atom, or $R^{15}$ and $R^{16}$ together form a single group bonded to the nitrogen atom via a double bond.

Examples of the hydrocarbyl groups for $R^{15}$ and $R^{16}$ include alkyl groups, alkenyl groups, alkynyl groups, aryl groups, and aralkyl groups. Examples of the alkyl groups include a methyl group, an ethyl group, a n-propyl group, an isopropyl group, a n-butyl group, a sec-butyl group, and a tert-butyl group. Examples of the alkenyl groups include a vinyl group, an allyl group, a 1-propenyl group, and a 1-methylethenyl group. Examples of the alkynyl groups include an ethynyl group and a propargyl group. Examples of the aryl groups include a phenyl group, a tolyl group, and a xylyl group. Examples of the aralkyl groups include a benzyl group.

The hydrocarbyl group for $R^{15}$ and $R^{16}$ preferably has 1 to 10 carbon atoms, more preferably has 1 to 4 carbon atoms, and still more preferably has 1 to 2 carbon atoms.

The hydrocarbyl group for $R^{15}$ and $R^{16}$ is preferably an alkyl group, and more preferably a linear alkyl group.

Examples of the trihydrocarbylsilyl groups for $R^{15}$ and $R^{16}$ include trialkylsilyl groups, such as a trimethylsilyl group, a triethylsilyl group, a triisopropylsilyl group, or a tert-butyldimethylsilyl group.

The trihydrocarbylsilyl group for $R^{15}$ and $R^{16}$ is preferably a C3-9 trialkylsilyl group, more preferably a trialkylsilyl group in which an alkyl group bonded to the silicon atom is a C1-3 alkyl group, and still more preferably a trimethylsilyl group.

Examples of the hydrocarbylene groups which are formed by joining $R^{15}$ and $R^{16}$ and optionally contain a nitrogen atom and/or an oxygen atom as a hetero atom include hydrocarbylene groups, hydrocarbylene groups containing a nitrogen atom, and hydrocarbylene groups containing an oxygen atom. Examples of the hydrocarbylene groups include alkylene groups, such as an ethylene group, a trimethylene group, a tetramethylene group, a pentamethylene group, or a hexamethylene group. Examples of the hydrocarbylene groups containing a nitrogen atom include a group represented by —$CH_2CH_2$—NH—$CH_2$—, a group represented by —$CH_2CH_2$—N=CH—, a group represented by —CH=CH—N=CH—, and a group represented by —$CH_2CH_2$—NH—$CH_2CH_2$—. Examples of the hydrocarbylene groups containing an oxygen atom include a group represented by —$CH_2CH_2$—O—$CH_2CH_2$—.

The hydrocarbylene group which is formed by joining $R^{15}$ and $R^{16}$ and optionally contains a nitrogen atom and/or an oxygen atom as a hetero atom preferably has 2 to 20 carbon atoms, more preferably has 2 to 7 carbon atoms, and still more preferably has 4 to 6 carbon atoms.

The hydrocarbylene group which is formed by joining $R^{15}$ and $R^{16}$ and optionally contains a nitrogen atom and/or an oxygen atom as a hetero atom is preferably a hydrocarbylene group, more preferably an alkylene group, and still more preferably a polymethylene group.

Examples of the single groups which are formed of $R^{15}$ and $R^{16}$ and bonded to the nitrogen atom via a double bond include hydrocarbylidene groups, such as an ethylidene group, a propylidene group, a butylidene group, a 1-methylethylidene group, a 1-methylpropylidene group, or a 1,3-dimethylbutylidene group.

The single group which is formed of $R^{15}$ and $R^{16}$ and bonded to the nitrogen atom via a double bond preferably has 2 to 20 carbon atoms, and more preferably has 2 to 6 carbon atoms.

Preferably, $R^{15}$ and $R^{16}$ are each an alkyl group or a trialkylsilyl group, or $R^{15}$ and $R^{16}$ are joined together to form an alkylene group. More preferably they are each an alkyl group.

Examples of the groups represented by the formula (1-X) include non-cyclic amino groups and cyclic amino groups.

Examples of the non-cyclic amino groups include dialkylamino groups and bis(trialkylsilyl)amino groups. Examples of the dialkylamino groups include a dimethylamino group, a diethylamino group, a di(n-propyl)amino group, a di(iso-propyl)amino group, a di(n-butyl)amino group, a di(sec-butyl)amino group, a di(tert-butyl)amino group, and an ethylmethylamino group. Examples of the bis(trialkylsilyl)amino groups include a bis(trimethylsilyl)amino group and a bis(t-butyldimethylsilyl)amino group.

Other examples of the non-cyclic amino groups include an ethylideneamino group, a 1-methylpropylideneamino group, a 1,3-dimethylbutylideneamino group, a 1-methylethylideneamino group, and a 4-N,N-dimethylaminobenzylideneamino group.

Examples of the cyclic amino groups include 1-polymethyleneimino groups, such as a 1-aziridinyl group, a 1-azetidinyl group, a 1-pyrrolidinyl group, a 1-piperidinyl group, a 1-hexamethyleneimino group, a 1-heptamethyleneimino group, a 1-octamethyleneimino group, a 1-decamethyleneimino group, or a 1-dodecamethyleneimino group. Other examples thereof include a 1-pyrrolyl group, a 1-pyrazolidinyl group, a 1-imidazolidinyl group, a 1-pyrazolyl group, a 1-imidazolyl group, a 4,5-dihydro-1-imidazolyl group, a 1-piperazinyl group, and a morpholino group.

The group represented by the formula (1-X) is preferably a non-cyclic amino group, and more preferably a dialkylamino group. The dialkylamino group is preferably a dimethylamino group, a diethylamino group, a di(n-propyl)amino group, or a di(n-butyl)amino group, and more preferably a dimethylamino group or a diethylamino group.

In the formula (1-S), at least one of $X^1$, $X^2$, and $X^3$ is a substituted amino group; preferably, two or more, more preferably two of $X^1$, $X^2$, and $X^3$ are substituted amino groups.

Examples of the compounds represented by the formula (1) in which $V^1$ is a group represented by the formula (1-V1), $S^1$ is a group represented by the formula (1-S), $R^{11}$ in the formula (1-V1) is a hydrogen atom, and one of $X^1$, $X^2$, and $X^3$ in the formula (1-S) is a dialkylamino group include the following:

compounds in which n in the formula (1-V1) is 0:
(dimethylamino)dimethylvinylsilane,
(diethylamino)dimethylvinylsilane,
(di-n-propylamino)dimethylvinylsilane,
(di-n-butylamino)dimethylvinylsilane,
(dimethylamino)diethylvinylsilane,
(diethylamino)diethylvinylsilane,
(di-n-propylamino)diethylvinylsilane, and
(di-n-butylamino)diethylvinylsilane; and compounds in which n in the formula (1-V1) is 1:
(dimethylamino)dimethyl-4-vinylphenylsilane,
(dimethylamino)dimethyl-3-vinylphenylsilane,
(diethylamino)dimethyl-4-vinylphenylsilane,
(diethylamino)dimethyl-3-vinylphenylsilane,
(di-n-propylamino)dimethyl-4-vinylphenylsilane,
(di-n-propylamino)dimethyl-3-vinylphenylsilane,
(di-n-butylamino)dimethyl-4-vinylphenylsilane, (di-n-butylamino)dimethyl-3-vinylphenylsilane,
(dimethylamino)diethyl-4-vinylphenylsilane,
(dimethylamino)diethyl-3-vinylphenylsilane,
(diethylamino)diethyl-4-vinylphenylsilane,
(diethylamino)diethyl-3-vinylphenylsilane,
(di-n-propylamino)diethyl-4-vinylphenylsilane,
(di-n-propylamino)diethyl-3-vinylphenylsilane,
(di-n-butylamino)diethyl-4-vinylphenylsilane, and
(di-n-butylamino)diethyl-3-vinylphenylsilane.

Examples of the compounds represented by the formula (1) in which $V^1$ is a group represented by the formula (1V1), $S^1$ is a group represented by the formula (1-S), $R^{11}$ in the formula (1-V1) is a hydrogen atom, and two of $X^1$, $X^2$, and $X^3$ in the formula (1-S) are dialkylamino groups include the following:

compounds in which n in the formula (1-V1) is 0:
bis(dimethylamino)methylvinylsilane,
bis(diethylamino)methylvinylsilane,
bis(di-n-propylamino)methylvinylsilane,
bis(di-n-butylamino)methylvinylsilane,
bis(dimethylamino)ethylvinylsilane,
bis(diethylamino)ethylvinylsilane,
bis(di-n-propylamino)ethylvinylsilane, and
bis(di-n-butylamino)ethylvinylsilane; and compounds in which n in the formula (1-V1) is 1:
bis(dimethylamino)methyl-4-vinylphenylsilane,
bis(dimethylamino)methyl-3-vinylphenylsilane,
bis(diethylamino)methyl-4-vinylphenylsilane,
bis(diethylamino)methyl-3-vinylphenylsilane,
bis(di-n-propylamino)methyl-4-vinylphenylsilane,
bis(di-n-propylamino)methyl-3-vinylphenylsilane,
bis(di-n-butylamino)methyl-4-vinylphenylsilane,
bis(di-n-butylamino)methyl-3-vinylphenylsilane,
bis(dimethylamino)ethyl-4-vinylphenylsilane,
bis(dimethylamino)ethyl-3-vinylphenylsilane,
bis(diethylamino)ethyl-4-vinylphenylsilane,
bis(diethylamino)ethyl-3-vinylphenylsilane,
bis(di-n-propylamino)ethyl-4-vinylphenylsilane,
bis(di-n-propylamino)ethyl-3-vinylphenylsilane,
bis(di-n-butylamino)ethyl-4-vinylphenylsilane, and
bis(di-n-butylamino)ethyl-3-vinylphenylsilane.

Examples of the compounds represented by the formula (1) in which $V^1$ is a group represented by the formula (1-V1), $S^1$ is a group represented by the formula (1-S), $R^{11}$ in the formula (1-V1) is a methyl group, and two of $X^1$, $X^2$, and $X^3$ in the formula (1-S) are dialkylamino groups include the following:

compounds in which n in the formula (1-V1) is 1:
bis(dimethylamino)methyl-4-isopropenylphenylsilane,
bis(dimethylamino)methyl-3-isopropenylphenylsilane,
bis(diethylamino)methyl-4-isopropenylphenylsilane,
bis(diethylamino)methyl-3-isopropenylphenylsilane,
bis(di-n-propylamino)methyl-4-isopropenylphenylsilane,
bis(di-n-propylamino)methyl-3-isopropenylphenylsilane,
bis(di-n-butylamino)methyl-4-isopropenylphenylsilane,
bis(di-n-butylamino)methyl-3-isopropenylphenylsilane,
bis(dimethylamino)ethyl-4-isopropenylphenylsilane,
bis(dimethylamino)ethyl-3-isopropenylphenylsilane,
bis(diethylamino)ethyl-4-isopropenylphenylsilane,
bis(diethylamino)ethyl-3-isopropenylphenylsilane,
bis(di-n-propylamino)ethyl-4-isopropenylphenylsilane,
bis(di-n-propylamino)ethyl-3-isopropenylphenylsilane,
bis(di-n-butylamino)ethyl-4-isopropenylphenylsilane, and
bis(di-n-butylamino)ethyl-3-isopropenylphenylsilane.

Examples of the compounds represented by the formula (1) in which $V^1$ is a group represented by the formula (1-V1), $S^1$ is a group represented by the formula (1-S), $R^{11}$ in the formula (1-V1) is a vinyl group, and two of $X^1$, $X^2$, and $X^3$ in the formula (1-S) are dialkylamino groups include the following:

compounds in which n in the formula (1-V1) is 0:
bis(dimethylamino)methyl(1-methylene-2-propenyl)silane,
bis(diethylamino)methyl(1-methylene-2-propenyl)silane,
bis(di-n-propylamino)methyl(1-methylene-2-propenyl)silane,
bis(di-n-butylamino)methyl(1-methylene-2-propenyl)silane,
bis(dimethylamino)ethyl(1-methylene-2-propenyl)silane,
bis(diethylamino)ethyl(1-methylene-2-propenyl)silane,
bis(di-n-propylamino)ethyl(1-methylene-2-propenyl)silane, and
bis(di-n-butylamino)ethyl(1-methylene-2-propenyl)silane.

Examples of the compounds represented by the formula (1) in which $V^1$ is a group represented by the formula (1-V1), $S^1$ is a group represented by the formula (1-S), $R^{11}$ in the formula (1-V1) is a phenyl group, and two of $X^1$, $X^2$, and $X^3$ in the formula (1-S) are dialkylamino groups include the following:

compounds in which n in the formula (1-V1) is 1:
1-(4-bis(dimethylamino)methylsilyl)-1-phenylethylene,
1-(4-bis(diethylamino)methylsilyl)-1-phenylethylene,
1-(4-bis(di-n-propylamino)methylsilyl)-1-phenylethylene,
1-(4-bis(di-n-butylamino)methylsilyl)-1-phenylethylene,
1-(4-bis(dimethylamino)ethylsilyl)-1-phenylethylene,
1-(4-bis(diethylamino)ethylsilyl)-1-phenylethylene,
1-(4-bis(di-n-propylamino)ethylsilyl)-1-phenylethylene, and
1-(4-bis(di-n-butylamino)ethylsilyl)-1-phenylethylene.

Examples of the compounds represented by the formula (1) in which $V^1$ is a group represented by the formula (1-V1), $S^1$ is a group represented by the formula (1-S), $R^{11}$ in the formula (1-V1) is a hydrogen atom, and the three $X^1$, $X^2$, and $X^3$ in the formula (1-S) are dialkylamino groups include the following:

compounds in which n in the formula (1-V1) is 0:
tris(dimethylamino)vinylsilane,
tris(diethylamino)vinylsilane,
tris(di-n-propylamino)vinylsilane, and
tris(di-n-butylamino)vinylsilane; and compounds in which n in the formula (1-V1) is 1:
tris(dimethylamino)-4-vinylphenylsilane,
tris(dimethylamino)-3-vinylphenylsilane,
tris(diethylamino)-4-vinylphenylsilane,
tris(diethylamino)-3-vinylphenylsilane,
tris(di-n-propylamino)-4-vinylphenylsilane,
tris(di-n-propylamino)-3-vinylphenylsilane,
tris(di-n-butylamino)-4-vinylphenylsilane, and
tris(di-n-butylamino)-3-vinylphenylsilane.

Examples of the compounds represented by the formula (1) in which $V^1$ is a group represented by the formula (1-V1), $S^1$ is a group represented by the formula (1-S), $R^{11}$ in the formula (1-V1) is a methyl group, and the three $X^1$, $X^2$, and $X^3$ in the formula (1-S) are dialkylamino groups include the following:

compounds in which n in the formula (1-V1) is 1:
tris(dimethylamino)-4-isopropenylphenylsilane,
tris(dimethylamino)-3-isopropenylphenylsilane,
tris(diethylamino)-4-isopropenylphenylsilane,
tris(diethylamino)-3-isopropenylphenylsilane,
tris(di-n-propylamino)-4-isopropenylphenylsilane,
tris(di-n-propylamino)-3-isopropenylphenylsilane,
tris(di-n-butylamino)-4-isopropenylphenylsilane, and
tris(di-n-butylamino)-3-isopropenylphenylsilane.

Examples of the compounds represented by the formula (1) in which $V^1$ is a group represented by the formula (1-V1), $S^1$ is a group represented by the formula (1-S), $R^{11}$ in the formula (1-V1) is a vinyl group, and the three $X^1$, $X^2$, and $X^3$ in the formula (1-S) are dialkylamino groups include the following:

compounds in which n in the formula (1-V1) is 0:
tris(dimethylamino)(1-methylene-2-propenyl)silane,
tris(diethylamino)(1-methylene-2-propenyl)silane,
tris(di-n-propylamino)(1-methylene-2-propenyl)silane, and
tris(di-n-butylamino)(1-methylene-2-propenyl)silane.

Examples of the compounds represented by the formula (1) in which $V^1$ is a group represented by the formula (1-V1), $S^1$ is a group represented by the formula (1-S), $R^{11}$ in the formula (1-V1) is a phenyl group, and the three $X^1$, $X^2$, and $X^3$ in the formula (1-S) are dialkylamino groups include the following:

compounds in which n in the formula (1-V1) is 1:
1-(4-tris(dimethylamino)silyl)-1-phenylethylene,
1-(4-tris(diethylamino)silyl)-1-phenylethylene,
1-(4-tris(di-n-propylamino)methylsilyl)-1-phenylethylene, and
1-(4-tris(di-n-butylamino)methylsilyl)-1-phenylethylene.

The compound represented by the formula (1) is preferably a compound in which $V^1$ is a group represented by the formula (1-V1), and $S^1$ is a group represented by the formula (1-S), more preferably a compound in which two of $X^1$, $X^2$, and $X^3$ in the formula (1-S) are dialkylamino groups, and still more preferably a compound in which $R^{11}$ in the formula (1-V1) is a hydrogen atom, and n in the formula (1-V1) is 0. Particularly preferred are compounds in which the remaining one of $X^1$, $X^2$, and $X^3$ is an alkyl group or an alkoxyalkyl group. Most preferred are
bis(dimethylamino)methylvinylsilane,
bis(diethylamino)methylvinylsilane,
bis(di-n-propylamino)methylvinylsilane,
bis(di-n-butylamino)methylvinylsilane,
bis(dimethylamino)ethylvinylsilane,
bis(diethylamino)ethylvinylsilane,
bis(di-n-propylamino)ethylvinylsilane, and
bis(di-n-butylamino)ethylvinylsilane.

$V^2$ in the formula (2) represents a hydrocarbyl group containing a polymerizable carbon-carbon double bond.

$V^2$ is preferably a group represented by the following formula (2-V):

[Chem. 28]

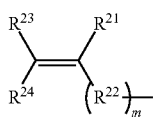

(2-V)

wherein m represents 0 or 1; $R^{21}$, $R^{23}$, and $R^{24}$ each independently represent a hydrogen atom or a hydrocarbyl group; and $R^{22}$ represents a hydrocarbylene group.

In the formula (2-V), m represents 0 or 1.

Examples of the hydrocarbyl groups for $R^{21}$, $R^{23}$, and $R^{24}$ include alkyl groups, alkenyl groups, and aryl groups. Examples of the alkyl groups include a methyl group, an ethyl group, a n-propyl group, an isopropyl group, a n-butyl group, a sec-butyl group, and a tert-butyl group, and preferably a methyl group. Examples of the alkenyl groups include a vinyl group, an allyl group, a 1-propenyl group, and a 1-methylethenyl group, and preferably a vinyl group. Examples of the aryl groups include a phenyl group, a methylphenyl group, and an ethylphenyl group, and preferably a phenyl group.

$R^{21}$, $R^{23}$, and $R^{24}$ each are preferably a hydrogen atom, a methyl group, a vinyl group, or a phenyl group, and more preferably a hydrogen atom.

Examples of the hydrocarbylene groups for $R^{22}$ include alkylene groups, arylene groups, and groups in which an arylene group and an alkylene group are bonded.

Examples of the alkylene groups include a methylene group, an ethylene group, and a trimethylene group, and preferably a methylene group or an ethylene group. Examples of the arylene groups include a phenylene group, a naphthylene group, and a biphenylene group, and preferably a phenylene group, and more preferably a para-phenylene group or a meta-phenylene group.

Examples of the groups in which an arylene group and an alkylene group are bonded include groups in which a phenylene group and an alkylene group are bonded, a group in which a naphthylene group and an alkylene group are bonded, and a group in which a biphenylene group and an alkylene group are bonded.

Preferably, the group in which an arylene group and an alkylene group are bonded is such that a carbon atom in the arylene group of the group is bonded to the carbon atom to which $R^{21}$ in the formula (2-V1) is bonded.

Examples of the groups in which a phenylene group and an alkylene group are bonded (phenylene-alkylene groups, such as, for example, groups represented by the following formula (2-R)) include para-phenylene-alkylene groups (for example, groups represented by the following formula (2-Ra)), meta-phenylene-alkylene groups (for example, groups represented by the following formula (2-Rb)), and ortho-phenylene-alkylene groups (for example, groups represented by the following formula (2-Rc)), depending on the position of a carbon atom on the benzene ring from which a hydrogen atom has been removed and the position of a carbon atom on the benzene ring to which the alkylene group is bonded,

[Chem. 29]

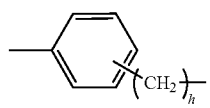

(2-R)

wherein h represents an integer of 1 to 10, and $(CH_2)_h$ represents a substituent on the benzene ring,

[Chem. 30]

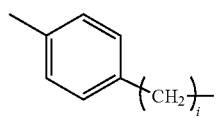

(2-Ra)

[Chem. 31]

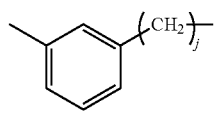

(2-Rb)

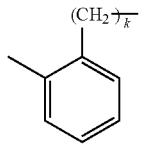 (2-Rc)

wherein i, j, and k each represent an integer of 1 to 10.

Here, h in the formula (2-R), i in the formula (2-Ra), j in the formula (2-Rb), and k in the formula (2-Rc) are each preferably 1 to 5, more preferably 1 to 2, and still more preferably 1.

The group in which an arylene group and an alkylene group are bonded is preferably a group in which a phenylene group and an alkylene group are bonded, more preferably a group represented by the formula (2-Ra) or a group represented by the formula (2-Rb), still more preferably a para-phenylene-methylene group (a group represented by the formula (2-Ra) with i=1), a meta-phenylene-methylene group (a group represented by the formula (2-Rb) with j=1), a para-phenylene-ethylene group (a group represented by the formula (2-Ra) with i=2), or a meta-phenylene-ethylene group (a group represented by the formula (2-Rb) with j=2), and particularly preferably a para-phenylene-methylene group (a group represented by the formula (2-Ra) with i=1) or a meta-phenylene-methylene group (a group represented by the formula (2-Rb) with j=1).

Examples of the groups represented by the formula (2-V) include the following:

those in which $R^{21}$, $R^{23}$, and $R^{24}$ are hydrogen atoms, including a vinyl group, a vinylmethyl group, a vinylethyl group, a 4-vinylphenyl group, a 3-vinylphenyl group, a (4-vinylphenyl)methyl group, a 2-(4-vinylphenyl)ethyl group, a (3-vinylphenyl)methyl group, and a 2-(3-vinylphenyl)ethyl group;

those in which $R^{21}$ is a methyl group, and $R^{23}$ and $R^{24}$ are hydrogen atoms, including an isopropenyl group, a methallyl group, a 4-isopropenylphenyl group, a 3-isopropenylphenyl group, a (4-isopropenylphenyl)methyl group, a 2-(4-isopropenylphenyl)ethyl group, a (3-isopropenylphenyl)methyl group, and a 2-(3-isopropenylphenyl)ethyl group;

those in which $R^{21}$ is a vinyl group, and $R^{23}$ and $R^{24}$ are hydrogen atoms, including a 1-methylene-2-propenyl group and a 2-methylene-3-butenyl group;

those in which $R^{21}$ is a phenyl group, and $R^{23}$ and $R^{24}$ are hydrogen atoms, including a 4-(1-phenylvinyl)phenyl group, a 3-(1-phenylvinyl)phenyl group, and a 2-(1-phenylvinyl)phenyl group; and those in which $R^{21}$ is a hydrogen atom, $R^{23}$ is a methyl group, and $R^{24}$ is a hydrogen atom, including a 1-propenyl group, a crotyl group, a 4-(1-propenyl)phenyl group, a 4-(1-propenyl)phenylmethyl group, a 2-{4-(1-propenyl)phenyl}ethyl group, a 3-(1-propenyl)phenyl group, a 3-(1-propenyl)phenylmethyl group, and a 2-{3-(1-propenyl)phenyl}ethyl group.

The group represented by the formula (2-V) is preferably a group represented by the following formula (2-V1):

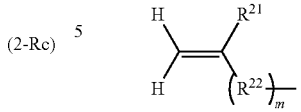 (2-V1)

wherein $R^{21}$ represents a hydrogen atom or a hydrocarbyl group; m represents 0 or 1; and $R^{22}$ represents a hydrocarbylene group.

The group represented by the formula (2-V1) is preferably a vinyl group, a 4-vinylphenyl group, a 3-vinylphenyl group, a (4-vinylphenyl)methyl group, a 2-(4-vinylphenyl)ethyl group, a (3-vinylphenyl)methyl group, or a 2-(3-vinylphenyl)ethyl group as a group in which $R^{21}$ is a hydrogen atom; a 4-isopropenylphenyl group, a 3-isopropenylphenyl group, a (4-isopropenylphenyl)methyl group, a 2-(4-isopropenylphenyl)ethyl group, a (3-isopropenylphenyl)methyl group, or a 2-(3-isopropenylphenyl)ethyl group as a group in which $R^{21}$ is a methyl group; a 1-methylene-2-propenyl group or a 2-methylene-3-butenyl group as a group in which $R^{21}$ is a vinyl group; and a 4-(1-phenylvinyl)phenyl group as a group in which $R^{21}$ is a phenyl group.

The group represented by the formula (2-V1) is more preferably a vinyl group, a (4-vinylphenyl)ethyl group, or a (3-vinylphenyl)ethyl group, which are groups in which $R^{21}$ is a hydrogen atom.

In the formula (2), $A^2$ represents a substituted amino group or a nitrogen-containing heterocyclic group.

The substituted amino group for $A^2$ is preferably a group represented by the following formula (2-A):

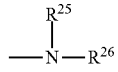 (2-A)

wherein $R^{25}$ and $R^{26}$ each represent a hydrocarbyl group or a trihydrocarbylsilyl group, or $R^{25}$ and $R^{26}$ are joined together to form a hydrocarbylene group optionally containing a nitrogen atom and/or an oxygen atom as a hetero atom, or $R^{25}$ and $R^{26}$ together form a single group bonded to the nitrogen atom via a double bond.

Examples of the hydrocarbyl groups for $R^{25}$ and $R^{26}$ include alkyl groups, alkenyl groups, alkynyl groups, aryl groups, and aralkyl groups. Examples of the alkyl groups include a methyl group, an ethyl group, a n-propyl group, an isopropyl group, a n-butyl group, a sec-butyl group, and a tert-butyl group. Examples of the alkenyl groups include a vinyl group, an allyl group, a 1-propenyl group, and a 1-methylethenyl group. Examples of the alkynyl groups include an ethynyl group and a propargyl group. Examples of the aryl groups include a phenyl group, a tolyl group, and a xylyl group. Examples of the aralkyl groups include a benzyl group.

The hydrocarbyl group for $R^{25}$ and $R^{26}$ preferably has 1 to 10 carbon atoms, more preferably has 1 to 4 carbon atoms, and still more preferably has 1 to 2 carbon atoms.

The hydrocarbyl group for $R^{25}$ and $R^{26}$ is preferably an alkyl group or an alkenyl group, more preferably an alkyl group, and still more preferably a linear alkyl group.

Examples of the trihydrocarbylsilyl groups for $R^{25}$ and $R^{26}$ include trialkylsilyl groups, such as a trimethylsilyl group, a triethylsilyl group, a triisopropylsilyl group, or a tert-butyldimethylsilyl group.

The trihydrocarbylsilyl group for $R^{25}$ and $R^{26}$ is preferably a C3-9 trialkylsilyl group, more preferably a trialkylsilyl group in which an alkyl group bonded to the silicon atom is a C1-4 alkyl group, and still more preferably a trimethylsilyl group.

Examples of the hydrocarbylene groups which are formed by joining $R^{25}$ and $R^{26}$ and optionally contain a nitrogen atom and/or an oxygen atom as a hetero atom include hydrocarbylene groups, hydrocarbylene groups containing a nitrogen atom, and hydrocarbylene groups containing an oxygen atom. Examples of the hydrocarbylene groups include alkylene groups, such as an ethylene group, a trimethylene group, a tetramethylene group, a pentamethylene group, or a hexamethylene group. Examples of the hydrocarbylene groups containing a nitrogen atom include a group represented by —CH$_2$CH$_2$—NH—CH$_2$—, a group represented by —CH$_2$CH$_2$—N═CH—, a group represented by —CH═CH—N═CH—, and a group represented by —CH$_2$CH$_2$—NH—CH$_2$CH$_2$—. Examples of the hydrocarbylene groups containing an oxygen atom include a group represented by —CH$_2$CH$_2$—O—CH$_2$CH$_2$—.

The hydrocarbylene group which is formed by joining $R^{25}$ and $R^{26}$ and optionally contains a nitrogen atom and/or an oxygen atom as a hetero atom preferably has 2 to 20 carbon atoms, more preferably has 2 to 7 carbon atoms, and still more preferably has 4 to 6 carbon atoms.

The hydrocarbylene group which is formed by joining $R^{25}$ and $R^{26}$ and optionally contains a nitrogen atom and/or an oxygen atom as a hetero atom is preferably a hydrocarbylene group, more preferably an alkylene group, and still more preferably a polymethylene group.

Examples of the single groups which are formed of $R^{25}$ and $R^{26}$ and bonded to the nitrogen atom via a double bond include hydrocarbylidene groups, such as an ethylidene group, a propylidene group, a butylidene group, a 1-methylethylidene group, a 1-methylpropylidene group, or a 1,3-dimethylbutylidene group.

The single group which is formed of $R^{25}$ and $R^{26}$ and bonded to the nitrogen atom via a double bond preferably has 2 to 20 carbon atoms, and more preferably has 2 to 6 carbon atoms.

Preferably, $R^{25}$ and $R^{26}$ are each a hydrocarbyl group or a trihydrocarbylsilyl group, or $R^{25}$ and $R^{26}$ are joined together to form a hydrocarbylene group.

Examples of the groups represented by the formula (2-A) include non-cyclic amino groups and cyclic amino groups.

Examples of the non-cyclic amino groups include dialkylamino groups and bis(trialkylsilyl)amino groups. Examples of the dialkylamino groups include a dimethylamino group, a diethylamino group, a di(n-propyl)amino group, a di(isopropyl)amino group, a di(n-butyl)amino group, a di(sec-butyl)amino group, a di(tert-butyl)amino group, and an ethylmethylamino group. Examples of the bis(trialkylsilyl)amino groups include a bis(trimethylsilyl)amino group, and a bis(t-butyldimethylsilyl)amino group.

Other examples of the non-cyclic amino groups include an ethylideneamino group, a 1-methylpropylideneamino group, a 1,3-dimethylbutylideneamino group, a 1-methylethylideneamino group, and a 4-N,N-dimethylaminobenzylideneamino group.

Examples of the cyclic amino groups include a 1-aziridinyl group, a 1-azetidinyl group, a 1-pyrrolidinyl group, a 1-piperidinyl group, a 1-hexamethyleneimino group, a 1-imidazolyl group, a 4,5-dihydro-1-imidazolyl group, a 1-pyrrolyl group, a 1-pyrazolyl group, a 1-imidazolidinyl group, a 1-piperazinyl group, and a morpholino group.

The group represented by the formula (2-A) is preferably a group in which $R^{25}$ and $R^{26}$ are hydrocarbyl groups, a group in which $R^{25}$ and $R^{26}$ are trihydrocarbylsilyl groups, or a group in which $R^{25}$ and $R^{26}$ are joined together to form a hydrocarbylene group. The group represented by the formula (2-A) is more preferably a group in which $R^{25}$ and $R^{26}$ are linear alkyl groups, a group in which $R^{25}$ and $R^{26}$ are trialkylsilyl groups, or a group in which $R^{25}$ and $R^{26}$ are joined together to form a polymethylene group.

The group represented by the formula (2-A) is still more preferably a dimethylamino group, a diethylamino group, a di(n-propyl)amino group, a di(n-butyl)amino group, a bis(trimethylsilyl)amino group, a bis(tert-butyldimethylsilyl)amino group, a 1-pyrrolidinyl group, a 1-piperidinyl group, or a 1-hexamethyleneimino group, and particularly preferably a 1-pyrrolidinyl group.

Examples of the nitrogen-containing heterocyclic groups for $A^2$ include nitrogen-containing aliphatic heterocyclic groups and nitrogen-containing aromatic heterocyclic groups. Herein, the nitrogen-containing aliphatic heterocyclic group refers to a group obtained by removing one hydrogen atom from a carbon atom on a heterocyclic ring of a compound having a nitrogen-containing aliphatic heterocyclic ring, and the nitrogen-containing aliphatic heterocyclic ring refers to an aliphatic heterocyclic ring containing a nitrogen atom as a hetero atom included in the ring. The nitrogen-containing aromatic heterocyclic group refers to a group obtained by removing one hydrogen atom from a carbon atom on a heterocyclic ring of a compound having a nitrogen-containing aromatic heterocyclic ring, and the nitrogen-containing aromatic heterocyclic ring refers to an aromatic heterocyclic ring containing a nitrogen atom as a hetero atom included in the ring.

Examples of the nitrogen-containing aliphatic heterocyclic groups for $A^2$ include groups only containing a nitrogen atom as a hetero atom included in the ring, groups containing a nitrogen atom and an oxygen atom as hetero atoms included in the ring, and groups containing a nitrogen atom and a sulfur atom as hetero atoms included in the ring.

Examples of the nitrogen-containing aliphatic heterocyclic groups only containing a nitrogen atom as a hetero atom included in the ring include groups containing an aziridine ring, groups containing an azetidine ring, groups containing a pyrrolidine ring, groups containing a piperidine ring, groups containing a hexamethyleneimine ring, groups containing an imidazolidine ring, groups containing a piperazine ring, and groups containing a pyrazolidine ring.

Examples of the groups containing an aziridine ring include N-alkyl-2-aziridinyl groups.

Examples of the groups containing an azetidine ring include N-alkyl-2-azetidinyl groups and N-alkyl-3-azetidinyl groups.

Examples of the groups containing a pyrrolidine ring include N-alkyl-2-pyrrolidinyl groups and N-alkyl-3-pyrrolidinyl groups.

Examples of the groups containing a piperidine ring include N-alkyl-2-piperidinyl groups, N-alkyl-3-piperidinyl groups, and N-alkyl-4-piperidinyl groups.

Examples of the groups containing a hexamethyleneimine ring include N-alkyl-2-hexamethyleneimino groups, N-alkyl-3-hexamethyleneimino groups, and N-alkyl-4-hexamethyleneimino groups.

Examples of the groups containing an imidazolidine ring include 1,3-dialkyl-2-imidazolidyl groups and 1,3-dialkyl-4-imidazolidyl groups.

Examples of the groups containing a piperazine ring include 1,4-dialkyl-2-piperazinyl groups.

Examples of the groups containing a pyrazolidine ring include 1,2-dialkyl-3-pyrazolidyl groups and 1,2-dialkyl-4-pyrazolidyl groups.

Examples of the nitrogen-containing aliphatic heterocyclic groups containing a nitrogen atom and an oxygen atom as hetero atoms included in the ring include groups containing a morpholine ring and groups containing an isooxazolidine ring.

Examples of the groups containing a morpholine ring include N-alkyl-2-morpholino groups and N-alkyl-3-morpholino groups.

Examples of the groups containing an isooxazolidine ring include N-alkyl-3-isooxazolidinyl groups, N-alkyl-4-isooxazolidinyl groups, and N-alkyl-5-isooxazolidinyl groups.

Examples of the nitrogen-containing aliphatic heterocyclic groups containing a nitrogen atom and a sulfur atom as hetero atoms included in the ring include groups containing a thiomorpholine ring and groups containing an isothiazolidine ring.

Examples of the groups containing a thiomorpholine ring include N-alkyl-2-thiomorpholino groups and N-alkyl-3-thiomorpholino groups.

Examples of the groups containing an isothiazolidine ring include N-alkyl-3-isothiazolidinyl groups, N-alkyl-4-isothiazolidinyl groups, and N-alkyl-5-isothiazolidinyl groups.

The nitrogen-containing aliphatic heterocyclic group for $A^2$ is preferably a group only containing a nitrogen atom as a hetero atom included in the ring. The nitrogen-containing aliphatic heterocyclic group preferably has 4 to 10 carbon atoms.

Examples of the nitrogen-containing aromatic heterocyclic groups for $A^2$ include groups only containing a nitrogen atom as a hetero atom included in the ring, groups containing a nitrogen atom and an oxygen atom as hetero atoms included in the ring, and groups containing a nitrogen atom and a sulfur atom as hetero atoms included in the ring.

Examples of the nitrogen-containing aromatic heterocyclic groups only containing a nitrogen atom as a hetero atom included in the ring include groups containing a pyrrole ring, groups containing an imidazole ring, groups containing a pyrazole ring, groups containing a pyridine ring, groups containing a pyridazine ring, groups containing a pyrimidine ring, groups containing a pyrazine ring, groups containing a quinoline ring, groups containing an isoquinoline ring, groups containing a cinnoline ring, groups containing a quinazoline ring, and groups containing a phthalazine ring.

Examples of the groups containing a pyrrole ring include a 2-pyrrolyl group, a 3-pyrrolyl group, a 2-(N-methylpyrrolyl) group, and a 3-(N-methylpyrrolyl) group.

Examples of the groups containing an imidazole ring include a 2-imidazolyl group, a 4-imidazolyl group, a 5-imidazolyl group, a 2-(N-methylimidazolyl) group, a 4-(N-methylimidazolyl) group, and a 5-(N-methylimidazolyl) group.

Examples of the groups containing a pyrazole ring include a 3-pyrazolyl group, a 4-pyrazolyl group, a 5-pyrazolyl group, a 3-(N-methylpyrazolyl) group, a 4-(N-methylpyrazolyl) group, and a 5-(N-methylpyrazolyl) group.

Examples of the groups containing a pyridine ring include a 2-pyridyl group, a 3-pyridyl group, and a 4-pyridyl group.

Examples of the groups containing a pyridazine ring include a 3-pyridazyl group and a 4-pyridazyl group.

Examples of the groups containing a pyrimidine ring include a 2-pyrimidyl group, a 4-pyrimidyl group, and a 5-pyrimidyl group.

Examples of the groups containing a pyrazine ring include a 2-pyrazyl group.

Examples of the groups containing a quinoline ring include a 2-quinolyl group, a 3-quinolyl group, a 4-quinolyl group, a 5-quinolyl group, a 6-quinolyl group, a 7-quinolyl group, and an 8-quinolyl group.

Examples of the groups containing an isoquinoline ring include a 1-isoquinolyl group, a 3-isoquinolyl group, a 4-isoquinolyl group, a 5-isoquinolyl group, a 6-isoquinolyl group, a 7-isoquinolyl group, and an 8-isoquinolyl group.

Examples of the groups containing a cinnoline ring include a 3-cinnolinyl group, a 4-cinnolinyl group, a 5-cinnolinyl group, a 6-cinnolinyl group, a 7-cinnolinyl group, and an 8-cinnolinyl group.

Examples of the groups containing a quinazoline ring include a 2-quinazolinyl group, a 4-quinazolinyl group, a 5-quinazolinyl group, a 6-quinazolinyl group, a 7-quinazolinyl group, and an 8-quinazolinyl group.

Examples of the groups containing a phthalazine ring include a 1-phthalazinyl group, a 5-phthalazinyl group, and a 6-phthalazinyl group.

The nitrogen-containing aromatic heterocyclic group only containing a nitrogen atom as a hetero atom included in the ring is preferably a group containing an imidazole ring, a group containing a pyridine ring, or a group containing a quinoline ring.

Examples of the nitrogen-containing aromatic heterocyclic groups containing a nitrogen atom and an oxygen atom as hetero atoms included in the ring include groups containing an oxazole ring and groups containing an isooxazole ring.

Examples of the groups containing an oxazole ring include a 2-oxazolyl group, a 4-oxazolyl group, and a 5-oxazolyl group.

Examples of the groups containing an isooxazole ring include a 3-isooxazolyl group, a 4-isooxazolyl group, and a 5-isooxazolyl group.

The nitrogen-containing aromatic heterocyclic group containing a nitrogen atom and an oxygen atom as hetero atoms included in the ring is preferably a group containing an oxazole ring.

Examples of the nitrogen-containing aromatic heterocyclic groups containing a nitrogen atom and a sulfur atom as hetero atoms included in the ring include groups containing a thiazole ring and groups containing an isothiazole ring.

Examples of the groups containing a thiazole ring include a 2-thiazolyl group, a 4-thiazolyl group, and a 5-thiazolyl group.

Examples of the groups containing an isothiazole ring include a 3-isothiazolyl group, a 4-isothiazolyl group, and a 5-isothiazolyl group.

The nitrogen-containing aromatic heterocyclic group containing a nitrogen atom and a sulfur atom as hetero atoms included in the ring is preferably a group containing a thiazole ring.

The nitrogen-containing aromatic heterocyclic group for $A^2$ is preferably a nitrogen-containing aromatic heterocyclic group only containing a nitrogen atom as a hetero atom included in the ring, more preferably a group containing an imidazole ring, a group containing a pyridine ring, or a group containing a quinoline ring, and still more preferably a group containing a pyridine ring.

Examples of the compounds represented by the formula (2) in which $V^2$ is a group represented by the formula (2-V1), $R^{21}$ in the formula (2-V1) is a hydrogen atom, m is 0, and $A^2$ is a substituted amino group include the following:
1-vinylpyrrolidine,
1-vinylpiperidine,
1-vinylhexamethyleneimine, 1-vinylpiperazine,
1-vinylpyrrole,
1-vinylimidazole,
1-vinylpyrazole, and
1-vinylquinoline.

Examples of the compounds represented by the formula (2) in which $V^2$ is a group represented by the formula (2-V1), $R^{21}$ in the formula (2-V1) is a hydrogen atom, m is 1, $R^{22}$ is a phenylene group, and $A^2$ is a substituted amino group include the following:
4-N,N-dimethylaminostyrene,
4-N,N-diethylaminostyrene,
4-N,N-di-n-propylaminostyrene,
4-N,N-di-n-butylaminostyrene,
4-N,N-diallylaminostyrene,
4-N,N-bis(trimethylsilyl)aminostyrene,
4-N,N-bis(tert-butyldimethylsilyl)aminostyrene,
4-(1-aziridinyl)styrene,
4-(1-pyrrolidinyl)styrene,
4-(1-piperidinyl)styrene,
4-(1-hexamethyleneimino)styrene,
3-N,N-dimethylaminostyrene,
3-N,N-diethylaminostyrene,
3-N,N-di-n-propylaminostyrene,
3-N,N-di-n-butylaminostyrene,
3-N,N-diallylaminostyrene,
3-N,N-bis(trimethylsilyl)aminostyrene,
3-N,N-bis(tert-butyldimethylsilyl)aminostyrene,
3-(1-aziridinyl)styrene,
3-(1-pyrrolidinyl)styrene,
3-(1-piperidinyl)styrene, and
3-(1-hexamethyleneimino)styrene.

Examples of the compounds represented by the formula (2) in which $V^2$ is a group represented by the formula (2-V1), $R^{21}$ in the formula (2-V1) is a hydrogen atom, m is 1, $R^{22}$ is a group represented by the formula (2-Ra), and $A^2$ is a substituted amino group include the following:
  compounds in which i in the formula (2-Ra) is 1:
4-N,N-dimethylaminomethylstyrene,
4-N,N-diethylaminomethylstyrene,
4-N,N-di-n-propylaminomethylstyrene,
4-N,N-di-n-butylaminomethylstyrene,
4-N,N-diallylaminomethylstyrene,
4-N,N-bis(trimethylsilyl)aminomethylstyrene,
4-N,N-bis(tert-butyldimethylsilyl)aminomethylstyrene,
4-(1-aziridinyl)methylstyrene,
4-(1-pyrrolidinyl)methylstyrene,
4-(1-piperidinyl)methylstyrene, and
4-(1-hexamethyleneimino)methylstyrene; and
  compounds in which i in the formula (2-Ra) is 2:
4-N,N-dimethylaminoethylstyrene,
4-N,N-diethylaminoethylstyrene,
4-N,N-di-n-propylaminoethylstyrene,
4-N,N-di-n-butylaminoethylstyrene,
4-N,N-diallylaminoethylstyrene,
4-N,N-bis(trimethylsilyl)aminoethylstyrene,
4-N,N-bis(tert-butyldimethylsilyl)aminoethylstyrene,
4-(1-aziridinyl)ethylstyrene,
4-(1-piperidinyl)ethylstyrene,
4-(1-pyrrolidinyl)ethylstyrene, and
4-(1-hexamethyleneimino)ethylstyrene.

Examples of the compounds represented by the formula (2) in which $V^2$ is a group represented by the formula (2-V1), $R^{21}$ in the formula (2-V1) is a hydrogen atom, m is 1, $R^{22}$ is a group represented by the formula (2-Rb), and $A^2$ is a substituted amino group include the following:
  compounds in which j in the formula (2-Rb) is 1:
3-N,N-dimethylaminomethylstyrene,
3-N,N-diethylaminomethylstyrene,
3-N,N-di-n-propylaminomethylstyrene,
3-N,N-di-n-butylaminomethylstyrene,
3-N,N-diallylaminomethylstyrene,
3-N,N-bis(trimethylsilyl)aminomethylstyrene,
3-N,N-bis(tert-butyldimethylsilyl)aminomethylstyrene,
3-(1-aziridinyl)methylstyrene,
3-(1-pyrrolidinyl)methylstyrene,
3-(1-piperidinyl)methylstyrene, and
3-(1-hexamethyleneimino)methylstyrene; and
  compounds in which j in the formula (2-Rb) is 2:
3-N,N-dimethylaminoethylstyrene,
3-N,N-diethylaminoethylstyrene,
3-N,N-di-n-propylaminoethylstyrene,
3-N,N-di-n-butylaminoethylstyrene,
3-N,N-diallylaminoethylstyrene,
3-N,N-bis(trimethylsilyl)aminoethylstyrene,
3-N,N-bis(tert-butyldimethylsilyl)aminoethylstyrene,
3-(1-aziridinyl)ethylstyrene,
3-(1-piperidinyl)ethylstyrene,
3-(1-pyrrolidinyl)ethylstyrene, and
3-(1-hexamethyleneimino)ethylstyrene.

Examples of the compounds represented by the formula (2) in which $V^2$ is a group represented by the formula (2-V1), $R^{21}$ in the formula (2-V1) is a methyl group, m is 0, and $A^2$ is a substituted amino group include the following:
1-isopropenylpyrrolidine,
1-isopropenylpiperidine,
1-isopropenylhexamethyleneimine,
1-isopropenylpiperazine,
1-isopropenylpyrrole,
1-isopropenylimidazole,
1-isopropenylpyrazole, and
isopropenylquinoline.

Examples of the compounds represented by the formula (2) in which $V^2$ is a group represented by the formula (2-V1), $R^{21}$ in the formula (2-V1) is a methyl group, m is 1, $R^{22}$ is a phenylene group, and $A^2$ is a substituted amino group include the following:
4-N,N-dimethylaminoisopropenylbenzene,
4-N,N-diethylaminoisopropenylbenzene,
4-N,N-di-n-propylaminoisopropenylbenzene,
4-N,N-di-n-butylaminoisopropenylbenzene,
4-N,N-diallylaminoisopropenylbenzene,
4-N,N-bis(trimethylsilyl)aminoisopropenylbenzene,
4-N,N-bis(tert-butyldimethylsilyl)aminoisopropenylbenzene,
4-(1-aziridinyl)isopropenylbenzene,
4-(1-pyrrolidinyl)isopropenylbenzene,
4-(1-piperidinyl)isopropenylbenzene,
4-(1-hexamethyleneimino)isopropenylbenzene,
3-N,N-dimethylaminoisopropenylbenzene,
3-N,N-diethylaminoisopropenylbenzene,
3-N,N-di-n-propylaminoisopropenylbenzene,
3-N,N-di-n-butylaminoisopropenylbenzene,
3-N,N-diallylaminoisopropenylbenzene,
3-N,N-bis(trimethylsilyl)aminoisopropenylbenzene,
3-N,N-bis(tert-butyldimethylsilyl)aminoisopropenylbenzene,
3-(1-aziridinyl)isopropenylbenzene,
3-(1-pyrrolidinyl)isopropenylbenzene,
3-(1-piperidinyl)isopropenylbenzene, and
3-(1-hexamethyleneimino)isopropenylbenzene.

Examples of the compounds represented by the formula (2) in which $V^2$ is a group represented by the formula (2-V1), $R^{21}$ in the formula (2-V1) is a methyl group, m is 1, R²² is a group represented by the formula (2-Ra), and A² is a substituted amino group include the following:
compounds in which i in the formula (2-Ra) is 1:
4-N,N-dimethylaminomethylisopropenylbenzene,
4-N,N-diethylaminomethylisopropenylbenzene,
4-N,N-di-n-propylaminomethylisopropenylbenzene,
4-N,N-di-n-butylaminomethylisopropenylbenzene,
4-N,N-diallylaminomethylisopropenylbenzene,
4-N,N-bis(trimethylsilyl)aminomethylisopropenylbenzene,
4-N,N-bis(tert-butyldimethylsilyl)aminomethylisopropenylbenzene,
4-(1-aziridinyl)methylisopropenylbenzene,
4-(1-pyrrolidinyl)methylisopropenylbenzene,
4-(1-piperidinyl)methylisopropenylbenzene, and
4-(1-hexamethyleneimino)methylisopropenylbenzene; and
compounds in which i in the formula (2-Ra) is 2:
4-N,N-dimethylaminoethylisopropenylbenzene,
4-N,N-diethylaminoethylisopropenylbenzene,
4-N,N-di-n-propylaminoethylisopropenylbenzene,
4-N,N-di-n-butylaminoethylisopropenylbenzene,
4-N,N-diallylaminoethylisopropenylbenzene,
4-N,N-bis(trimethylsilyl)aminoethylisopropenylbenzene,
4-N,N-bis(tert-butyldimethylsilyl)aminoethylisopropenylbenzene,
4-(1-aziridinyl)ethylisopropenylbenzene,
4-(1-pyrrolidinyl)ethylisopropenylbenzene,
4-(1-piperidinyl)ethylisopropenylbenzene, and
4-(1-hexamethyleneimino)ethylisopropenylbenzene.

Examples of the compounds represented by the formula (2) in which V² is a group represented by the formula (2-V1), R²¹ in the formula (2-V1) is a methyl group, m is 1, R²² is a group represented by the formula (2-Rb), and A² is a substituted amino group include the following:
compounds in which j in the formula (2-Rb) is 1:
3-N,N-dimethylaminomethylisopropenylbenzene,
3-N,N-diethylaminomethylisopropenylbenzene,
3-N,N-di-n-propylaminomethylisopropenylbenzene,
3-N,N-di-n-butylaminomethylisopropenylbenzene,
3-N,N-diallylaminomethylisopropenylbenzene,
3-N,N-bis(trimethylsilyl)aminomethylisopropenylbenzene,
3-N,N-bis(tert-butyldimethylsilyl)aminomethylisopropenylbenzene,
3-(1-aziridinyl)methylisopropenylbenzene,
3-(1-pyrrolidinyl)methylisopropenylbenzene,
3-(1-piperidinyl)methylisopropenylbenzene, and
3-(1-hexamethyleneimino)methylisopropenylbenzene; and
compounds in which j in the formula (2-Rb) is 2:
3-N,N-dimethylaminoethylisopropenylbenzene,
3-N,N-diethylaminoethylisopropenylbenzene,
3-N,N-di-n-propylaminoethylisopropenylbenzene,
3-N,N-di-n-butylaminoethylisopropenylbenzene,
3-N,N-diallylaminoethylisopropenylbenzene,
3-N,N-bis(trimethylsilyl)aminoethylisopropenylbenzene,
3-N,N-bis(tert-butyldimethylsilyl)aminoethylisopropenylbenzene,
3-(1-aziridinyl)ethylisopropenylbenzene,
3-(1-pyrrolidinyl)ethylisopropenylbenzene,
3-(1-piperidinyl)ethylisopropenylbenzene, and
3-(1-hexamethyleneimino)ethylisopropenylbenzene.

Examples of the compounds represented by the formula (2) in which V² is a group represented by the formula (2-V1), R²¹ in the formula (2-V1) is a vinyl group, m is 0, and A² is a substituted amino group include the following:
2-N,N-dimethylamino-1,3-butadiene,
2-N,N-diethylamino-1,3-butadiene,
2-N,N-di-n-propylamino-1,3-butadiene,
2-N,N-di-n-butylamino-1,3-butadiene,
2-N,N-diallylamino-1,3-butadiene,
2-N,N-bis(trimethylsilyl)amino-1,3-butadiene,
2-N,N-bis(tert-butyldimethylsilyl)amino-1,3-butadiene,
2-(1-aziridinyl)-1,3-butadiene,
2-(1-pyrrolidinyl)-1,3-butadiene,
2-(1-piperidinyl)-1,3-butadiene,
2-(1-hexamethyleneimino)-1,3-butadiene,
2-(1-pyrrolyl)-1,3-butadiene,
2-(1-imidazolyl)-1,3-butadiene, and
2-(1-pyrazolyl)-1,3-butadiene.

Examples of the compounds represented by the formula (2) in which V² is a group represented by the formula (2-V1), R²¹ in the formula (2-V1) is a vinyl group, m is 1, R²² is an alkylene group, and A² is a substituted amino group include the following:
compounds in which R²² is a methylene group:
2-N,N-dimethylaminomethyl-1,3-butadiene,
2-N,N-diethylaminomethyl-1,3-butadiene,
2-N,N-di-n-propylaminomethyl-1,3-butadiene,
2-N,N-di-n-butylaminomethyl-1,3-butadiene,
2-N,N-diallylaminomethyl-1,3-butadiene,
2-N,N-bis(trimethylsilyl)aminomethyl-1,3-butadiene,
2-N,N-bis(tert-butyldimethylsilyl)aminomethyl-1,3-butadiene,
2-(1-aziridinyl)methyl-1,3-butadiene,
2-(1-pyrrolidinyl)methyl-1,3-butadiene,
2-(1-piperidinyl)methyl-1,3-butadiene,
2-(1-hexamethyleneimino)methyl-1,3-butadiene,
1-(2-methylene-3-butenyl)pyrrole,
1-(2-methylene-3-butenyl)imidazole, and
1-(2-methylene-3-butenyl)pyrazole; and
compounds in which R²² is an ethylene group:
5-N,N-dimethylamino-3-methylene-1-pentene,
5-N,N-diethylamino-3-methylene-1-pentene,
5-N,N-di-n-propylamino-3-methylene-1-pentene,
5-N,N-di-n-butylamino-3-methylene-1-pentene,
5-N,N-diallylamino-3-methylene-1-pentene,
5-N,N-bis(trimethylsilyl)amino-3-methylene-1-pentene,
5-N,N-bis(tert-butyldimethylsilyl)amino-3-methylene-1-pentene,
5-(1-aziridinyl)-3-methylene-1-pentene,
5-(1-pyrrolidinyl)-3-methylene-1-pentene,
5-(1-piperidinyl)-3-methylene-1-pentene,
5-(1-hexamethyleneimino)-3-methylene-1-pentene,
1-(3-methylene-4-pentenyl)pyrrole,
1-(3-methylene-4-pentenyl)imidazole, and
1-(3-methylene-4-pentenyl)pyrazole.

Examples of the compounds represented by the formula (2) in which V² is a group represented by the formula (2-V1), R²¹ in the formula (2-V1) is a phenyl group, m is 1, R²² is a phenylene group, and A² is a substituted amino group include the following:
1-(4-N,N-dimethylaminophenyl)-1-phenylethylene,
1-(4-N,N-diethylaminophenyl)-1-phenylethylene,
1-(4-N,N-dipropylaminophenyl)-1-phenylethylene,
1-(4-N,N-diisopropylaminophenyl)-1-phenylethylene,
1-(4-N,N-dibutylaminophenyl)-1-phenylethylene,
1-(4-N,N-diisobutylaminophenyl)-1-phenylethylene,
1-(4-N,N-di(tert-butyl)aminophenyl)-1-phenylethylene,
1-(4-N,N-diphenylaminophenyl)-1-phenylethylene,
1-(4-(1-aziridinyl)phenyl)-1-phenylethylene,
1-(4-(1-pyrrolidinyl)phenyl)-1-phenylethylene,
1-(4-(1-piperidinyl)phenyl)-1-phenylethylene,
1-(4-hexamethyleneiminophenyl)-1-phenylethylene,
1-(4-morpholinophenyl)-1-phenylethylene,
1-(4-(N,N-bis(trimethylsilyl)amino)phenyl)-1-phenylethylene, 1-(4-(N,N-bis(tert-butyldimethylsilyl)amino)phenyl)-1-phenylethylene,
1-(4-(N,N-bis(triisopropylsilyl)amino)phenyl)-1-phenylethylene,
1-(3-N,N-dimethylaminophenyl)-1-phenylethylene,
1-(3-N,N-diethylaminophenyl)-1-phenylethylene,
1-(3-N,N-dipropylaminophenyl)-1-phenylethylene,
1-(3-N,N-diisopropylaminophenyl)-1-phenylethylene,
1-(3-N,N-dibutylaminophenyl)-1-phenylethylene,
1-(3-N,N-diisobutylaminophenyl)-1-phenylethylene,
1-(3-N,N-di(tert-butyl)aminophenyl)-1-phenylethylene,
1-(3-N,N-diphenylaminophenyl)-1-phenylethylene,
1-(3-(1-aziridinyl)phenyl)-1-phenylethylene,
1-(3-(1-pyrrolidinyl)phenyl)-1-phenylethylene,
1-(3-(1-piperidinyl)phenyl)-1-phenylethylene,
1-(3-hexamethyleneiminophenyl)-1-phenylethylene,
1-(3-morpholinophenyl)-1-phenylethylene,
1-(3-(N,N-bis(trimethylsilyl)amino)phenyl)-1-phenylethylene,
1-(3-(N,N-bis(tert-butyldimethylsilyl)aminophenyl)-1-phenylethylene, and
1-(3-(N,N-bis(triisopropylsilyl)amino)phenyl)-1-phenylethylene.

Examples of the compounds represented by the formula (2) in which $V^2$ is a group represented by the formula (2-V1), $R^{21}$ in the formula (2-V1) is a phenyl group, m is 1, $R^{22}$ is a group represented by the formula (2-Ra), and $A^2$ is a substituted amino group include the following:
compounds in which i in the formula (2-Ra) is 1:
1-(4-N,N-dimethylaminomethylphenyl)-1-phenylethylene,
1-(4-N,N-diethylaminomethylphenyl)-1-phenylethylene,
1-(4-N,N-dipropylaminomethylphenyl)-1-phenylethylene,
1-(4-N,N-diisopropylaminomethylphenyl)-1-phenylethylene,
1-(4-N,N-dibutylaminomethylphenyl)-1-phenylethylene,
1-(4-N,N-diisobutylaminomethylphenyl)-1-phenylethylene,
1-(4-N,N-di(tert-butyl)aminomethylphenyl)-1-phenylethylene,
1-(4-N,N-diphenlyaminomethylphenyl)-1-phenylethylene,
1-(4-(1-aziridinylmethyl)phenyl)-1-phenylethylene,
1-(4-(1-pyrrolidinylmethyl)phenyl)-1-phenylethylene,
1-(4-(1-piperidinylmethyl)phenyl)-1-phenylethylene,
1-(4-hexamethyleneiminomethylphenyl)-1-phenylethylene,
1-(4-morpholinomethylphenyl)-1-phenylethylene,
1-(4-(N,N-bis(trimethylsilyl)aminomethyl)phenyl)-1-phenylethylene,
1-(4-(N,N-bis(tert-butyldimethylsilyl)amino)methylphenyl)-1-phenylethylene, and
1-(4-(N,N-bis(triisopropylsilyl)amino)methylphenyl)-1-phenylethylene.

Examples of the compounds represented by the formula (2) in which $V^2$ is a group represented by the formula (2-V1), $R^{21}$ in the formula (2-V1) is a phenyl group, m is 1, $R^{22}$ is a group represented by the formula (2-Rb), and $A^2$ is a substituted amino group include the following:
compounds in which j in the formula (2-Rb) is 1:
1-(3-N,N-dimethylaminomethylphenyl)-1-phenylethylene,
1-(3-N,N-diethylaminomethylphenyl)-1-phenylethylene,
1-(3-N,N-dipropylaminomethylphenyl)-1-phenylethylene,
1-(3-N,N-diisopropylaminomethylphenyl)-1-phenylethylene,
1-(3-N,N-dibutylaminomethylphenyl)-1-phenylethylene,
1-(3-N,N-diisobutylaminomethylphenyl)-1-phenylethylene,
1-(3-N,N-di(tert-butyl)aminomethylphenyl)-1-phenylethylene,
1-(3-N,N-diphenlyaminomethylphenyl)-1-phenylethylene,
1-(3-(1-aziridinylmethyl)phenyl)-1-phenylethylene,
1-(3-(1-pyrrolidinylmethyl)phenyl)-1-phenylethylene,
1-(3-(1-piperidinylmethyl)phenyl)-1-phenylethylene,
1-(3-hexamethyleneiminomethylphenyl)-1-phenylethylene,
1-(3-morpholinomethylphenyl)-1-phenylethylene,
1-(3-(N,N-bis(trimethylsilyl)aminomethyl)phenyl)-1-phenylethylene,
1-(3-(N,N-bis(tert-butyldimethylsilyl)aminomethylphenyl)-1-phenylethylene, and
1-(3-(N,N-bis(triisopropylsilyl)amino)methylphenyl)-1-phenylethylene.

Examples of the compounds represented by the formula (2) in which $V^2$ is a group represented by the formula (2-V1), $R^{21}$ in the formula (2-V1) is a hydrogen atom, m is 0, and $A^2$ is a nitrogen-containing aliphatic heterocyclic group include the following:
N-methyl-3-vinylpyrrolidine,
N-methyl-4-vinylpiperidine,
N-methyl-3-vinylhexamethyleneimine, and
N-methyl-4-vinylhexamethyleneimine.

Examples of the compounds represented by the formula (2) in which $V^2$ is a group represented by the formula (2-V1), $R^{21}$ in the formula (2-V1) is a hydrogen atom, m is 1, $R^{22}$ is a phenylene group, and $A^2$ is a nitrogen-containing aliphatic heterocyclic group include the following:
N-methyl-3-(4-vinylphenyl)pyrrolidine,
N-methyl-4-(4-vinylphenyl)piperidine,
N-methyl-3-(4-vinylphenyl)hexamethyleneimine,
N-methyl-4-(4-vinylphenyl)hexamethyleneimine,
N-methyl-3-(3-vinylphenyl)pyrrolidine,
N-methyl-4-(3-vinylphenyl)piperidine,
N-methyl-3-(3-vinylphenyl)hexamethyleneimine, and
N-methyl-4-(3-vinylphenyl)hexamethyleneimine.

Examples of the compounds represented by the formula (2) in which $V^2$ is a group represented by the formula (2-V1), $R^{21}$ in the formula (2-V1) is a hydrogen atom, m is 1, $R^{22}$ is a group represented by the formula (2-Ra), and $A^2$ is a nitrogen-containing aliphatic heterocyclic group include the following:
compounds in which i in the formula (2-Ra) is 1:
N-methyl-3-(4-vinylphenylmethyl)pyrrolidine,
N-methyl-4-(4-vinylphenylmethyl)piperidine,
N-methyl-3-(4-vinylphenylmethyl)hexamethyleneimine, and
N-methyl-4-(4-vinylphenylmethyl)hexamethyleneimine; and
compounds in which i in the formula (2-Ra) is 2:
N-methyl-3-(4-vinylphenylethyl)pyrrolidine,
N-methyl-4-(4-vinylphenylethyl)piperidine,
N-methyl-3-(4-vinylphenylethyl)hexamethyleneimine, and
N-methyl-4-(4-vinylphenylethyl)hexamethyleneimine.

Examples of the compounds represented by the formula (2) in which $V^2$ is a group represented by the formula (2-V1), $R^{21}$ in the formula (2-V1) is a hydrogen atom, m is 1, $R^{22}$ is a group represented by the formula (2-Rb), and $A^2$ is a nitrogen-containing aliphatic heterocyclic group include the following:
compounds in which j in the formula (2-Rb) is 1:
N-methyl-3-(3-vinylphenylmethyl)pyrrolidine,
N-methyl-4-(3-vinylphenylmethyl)piperidine,
N-methyl-3-(3-vinylphenylmethyl)hexamethyleneimine, and
N-methyl-4-(3-vinylphenylmethyl)hexamethyleneimine; and
compounds in which j in the formula (2-Rb) is 2:
N-methyl-3-(3-vinylphenylethyl)pyrrolidine,
N-methyl-4-(3-vinylphenylethyl)piperidine,
N-methyl-3-(3-vinylphenylethyl)hexamethyleneimine, and
N-methyl-4-(3-vinylphenylethyl)hexamethyleneimine.

Examples of the compounds represented by the formula (2) in which $V^2$ is a group represented by the formula (2-V1), $R^{21}$ in the formula (2-V1) is a methyl group, m is 0, and $A^2$ is a nitrogen-containing aliphatic heterocyclic group include the following:
N-methyl-3-isopropenylpyrrolidine,
N-methyl-4-isopropenylpiperidine,
N-methyl-3-isopropenylhexamethyleneimine, and
N-methyl-4-isopropenylhexamethyleneimine.

Examples of the compounds represented by the formula (2) in which $V^2$ is a group represented by the formula (2-V1), $R^{21}$ in the formula (2-V1) is a methyl group, m is 1, $R^{22}$ is a phenylene group, and $A^2$ is a nitrogen-containing aliphatic heterocyclic group include the following:
N-methyl-3-(4-isopropenylphenyl)pyrrolidine,
N-methyl-4-(4-isopropenylphenyl)piperidine,
N-methyl-3-(4-isopropenylphenyl)hexamethyleneimine, and
N-methyl-4-(4-isopropenylphenyl)hexamethyleneimine.

Examples of the compounds represented by the formula (2) in which $V^2$ is a group represented by the formula (2-V1), $R^{21}$ in the formula (2-V1) is a methyl group, m is 1, $R^{22}$ is a group represented by the formula (2-Ra), and $A^2$ is a nitrogen-containing aliphatic heterocyclic group include the following:
compounds in which i in the formula (2-Ra) is 1:
N-methyl-3-(4-isopropenylphenylmethyl)pyrrolidine,
N-methyl-4-(4-isopropenylphenylmethyl)piperidine,
N-methyl-3-(4-isopropenylphenylmethyl)hexamethyleneimine, and
N-methyl-4-(4-isopropenylphenylmethyl)hexamethyleneimine; and
compounds in which i in the formula (2-Ra) is 2:
N-methyl-3-(4-isopropenylphenylethyl)pyrrolidine,
N-methyl-4-(4-isopropenylphenylethyl)piperidine,
N-methyl-3-(4-isopropenylphenylethyl)hexamethyleneimine, and
N-methyl-4-(4-isopropenylphenylethyl)hexamethyleneimine.

Examples of the compounds represented by the formula (2) in which $V^2$ is a group represented by the formula (2-V1), $R^{21}$ in the formula (2-V1) is a vinyl group, m is 0, and $A^2$ is a nitrogen-containing aliphatic heterocyclic group include the following:
N-methyl-3-(1-methylene-2-propenyl)pyrrolidine,
N-methyl-4-(1-methylene-2-propenyl)piperidine,
N-methyl-3-(1-methylene-2-propenyl)hexamethyleneimine, and
N-methyl-4-(1-methylene-2-propenyl)hexamethyleneimine.

Examples of the compounds represented by the formula (2) in which $V^2$ is a group represented by the formula (2-V1), $R^{21}$ in the formula (2-V1) is a vinyl group, m is 1, $R^{22}$ is an alkylene group, and $A^2$ is a nitrogen-containing aliphatic heterocyclic group include the following:
compounds in which $R^{22}$ is a methylene group:
N-methyl-3-(2-methylene-3-butenyl)pyrrolidine,
N-methyl-4-(2-methylene-3-butenyl)piperidine,
N-methyl-3-(2-methylene-3-butenyl)hexamethyleneimine, and
N-methyl-4-(2-methylene-3-butenyl)hexamethyleneimine; and
compounds in which $R^{22}$ is an ethylene group:
N-methyl-3-(3-methylene-4-pentenyl)pyrrolidine,
N-methyl-4-(3-methylene-4-pentenyl)piperidine,
N-methyl-3-(3-methylene-4-pentenyl)hexamethyleneimine, and
N-methyl-4-(3-methylene-4-pentenyl)hexamethyleneimine.

Examples of the compounds represented by the formula (2) in which $V^2$ is a group represented by the formula (2-V1), $R^{21}$ in the formula (2-V1) is a phenyl group, m is 1, $R^{22}$ is a phenylene group, and $A^2$ is a nitrogen-containing aliphatic heterocyclic group include the following:
1-(4-N-methyl-3-pyrrolidinophenyl)-1-phenylethylene,
1-(4-N-methyl-3-piperidinophenyl)-1-phenylethylene,
1-(4-N-methyl-4-piperidinophenyl)-1-phenylethylene,
1-(4-N-methyl-3-hexamethyleneiminophenyl)-1-phenylethylene,
1-(4-N-methyl-4-hexamethyleneiminophenyl)-1-phenylethylene,
1-(3-N-methyl-3-pyrrolidinophenyl)-1-phenylethylene,
1-(3-N-methyl-3-piperidinophenyl)-1-phenylethylene,
1-(3-N-methyl-4-piperidinophenyl)-1-phenylethylene,
1-(3-N-methyl-3-hexamethyleneiminophenyl)-1-phenylethylene, and
1-(3-N-methyl-4-hexamethyleneiminophenyl)-1-phenylethylene.

Examples of the compounds represented by the formula (2) in which $V^2$ is a group represented by the formula (2-V1), $R^{21}$ in the formula (2-V1) is a phenyl group, m is 1, $R^{22}$ is a group represented by the formula (2-Ra), and $A^2$ is a nitrogen-containing aliphatic heterocyclic group include the following:
compounds in which i in the formula (2-Ra) is 1:
1-(4-N-methyl-3-pyrrolidinomethylphenyl)-1-phenylethylene,
1-(4-N-methyl-3-piperidinomethylphenyl)-1-phenylethylene,
1-(4-N-methyl-4-piperidinomethylphenyl)-1-phenylethylene, and
1-(4-N-methyl-3-hexamethyleneiminomethylphenyl)-1-phenylethylene.

Examples of the compounds represented by the formula (2) in which $V^2$ is a group represented by the formula (2-V1), $R^{21}$ in the formula (2-V1) is a phenyl group, m is 1, $R^{22}$ is a group represented by the formula (2-Rb), and $A^2$ is a nitrogen-containing aliphatic heterocyclic group include the following:
compounds in which j in the formula (2-Rb) is 1:
1-(3-N,N-dimethylaminomethylphenyl)-1-phenylethylene,
1-(3-N,N-diethylaminomethylphenyl)-1-phenylethylene,
1-(3-N,N-dipropylaminomethylphenyl)-1-phenylethylene, and
1-(3-N,N-diisopropylaminomethylphenyl)-1-phenylethylene.

Examples of the compounds represented by the formula (2) in which $V^2$ is a group represented by the formula (2-V1), $R^{21}$ in the formula (2-V1) is a hydrogen atom, m is 0, and $A^2$ is a nitrogen-containing aromatic heterocyclic group include the following:
N-methyl-2-vinylimidazole,
N-methyl-4-vinylimidazole,
N-methyl-5-vinylimidazole,
2-vinylpyridine,
3-vinylpyridine,
4-vinylpyridine,
2-vinylquinoline,
3-vinylquinoline, and
4-vinylquinoline.

Examples of the compounds represented by the formula (2) in which $V^2$ is a group represented by the formula (2-V1), $R^{21}$ in the formula (2-V1) is a methyl group, m is 0, and $A^2$ is a nitrogen-containing aromatic heterocyclic group include the following:

N-methyl-2-isopropenylimidazole,
N-methyl-4-isopropenylimidazole,
N-methyl-5-isopropenylimidazole,
2-isopropenylpyridine,
3-isopropenylpyridine,
4-isopropenylpyridine,
2-isopropenylquinoline,
3-isopropenylquinoline, and
4-isopropenylquinoline.

Examples of the compounds represented by the formula (2) in which $V^2$ is a group represented by the formula (2-V1), $R^{21}$ in the formula (2-V1) is a vinyl group, m is 0, and $A^2$ is a nitrogen-containing aromatic heterocyclic group include the following:
N-methyl-2-(1-methylene-2-propenyl)imidazole,
N-methyl-4-(1-methylene-2-propenyl)imidazole,
N-methyl-5-(1-methylene-2-propenyl)imidazole,
2-(1-methylene-2-propenyl)pyridine,
3-(1-methylene-2-propenyl)pyridine,
4-(1-methylene-2-propenyl)pyridine,
2-(1-methylene-2-propenyl)quinoline,
3-(1-methylene-2-propenyl)quinoline, and
4-(1-methylene-2-propenyl)quinoline.

Examples of the compounds represented by the formula (2) in which $V^2$ is a group represented by the formula (2-V1), $R^{21}$ in the formula (2-V1) is a vinyl group, m is 1, $R^{22}$ is an alkylene group, and $A^2$ is a nitrogen-containing aromatic heterocyclic group include the following:
compounds in which $R^{22}$ is a methylene group:
N-methyl-2-(2-methylene-3-butenyl)imidazole,
N-methyl-4-(2-methylene-3-butenyl)imidazole,
N-methyl-5-(2-methylene-3-butenyl)imidazole,
2-(2-methylene-3-butenyl)pyridine,
3-(2-methylene-3-butenyl)pyridine,
4-(2-methylene-3-butenyl)pyridine,
2-(2-methylene-3-butenyl)quinoline,
3-(2-methylene-3-butenyl)quinoline, and
4-(2-methylene-3-butenyl)quinoline; and
compounds in which $R^{22}$ is an ethylene group:
N-methyl-2-(3-methylene-4-pentenyl)imidazole,
N-methyl-4-(3-methylene-4-pentenyl)imidazole,
N-methyl-5-(3-methylene-4-pentenyl)imidazole,
2-(3-methylene-4-pentenyl)pyridine,
3-(3-methylene-4-pentenyl)pyridine,
4-(3-methylene-4-pentenyl)pyridine,
2-(3-methylene-4-pentenyl)quinoline,
3-(3-methylene-4-pentenyl)quinoline, and
4-(3-methylene-4-pentenyl)quinoline.

In the case where the conjugated diene polymer (A) is modified by the compound (G), the compound represented by the formula (2) is preferably a compound in which the group represented by $V^2$ is a group represented by the formula (2-V1), and $R^{21}$ in the formula (2-V1) is a hydrogen atom or a phenyl group.

The compound is more preferably
a compound in which $R^{21}$ is a hydrogen atom, m is 1, $R^{22}$ is a phenylene group, and $A^2$ is a substituted amino group represented by the formula (2-A);
a compound in which $R^{21}$ is a phenyl group, m is 1, $R^{22}$ is a phenylene group, and $A^2$ is a substituted amino group represented by the formula (2-A);
a compound in which $R^{21}$ is a hydrogen atom, m is 1, $R^{22}$ is a group represented by the formula (2-R), and $A^2$ is a substituted amino group represented by the formula (2-A);
a compound in which $R^{21}$ is a phenyl group, m is 1, $R^{22}$ is a group represented by the formula (2-R), and $A^2$ is a substituted amino group represented by the formula (2-A); or
a compound in which $R^{21}$ is a hydrogen atom, m is 0, and $A^2$ is a nitrogen-containing aromatic heterocyclic group.

The compound is still more preferably
a compound in which $R^{21}$ is a hydrogen atom, m is 1, $R^{22}$ is a para-phenylene group or a meta-phenylene group, and $A^2$ is a group represented by the formula (2-A) in which $R^{25}$ and $R^{26}$ are C1-2 linear alkyl groups;
a compound in which $R^{21}$ is a hydrogen atom, m is 1, $R^{22}$ is a para-phenylene group or a meta-phenylene group, and $A^2$ is a group represented by the formula (2-A) in which $R^{25}$ and $R^{26}$ are trimethylsilyl groups;
a compound in which $R^{21}$ is a phenyl group, m is 1, $R^{22}$ is a para-phenylene group or a meta-phenylene group, and $A^2$ is a group represented by the formula (2-A) in which $R^{25}$ and $R^{26}$ are C1-2 linear alkyl groups;
a compound in which $R^{21}$ is a phenyl group, m is 1, $R^{22}$ is a para-phenylene group or a meta-phenylene group, and $A^2$ is a group represented by the formula (2-A) in which $R^{25}$ and $R^{26}$ are trimethylsilyl groups;
a compound in which $R^{21}$ is a hydrogen atom, m is 1, $R^{22}$ is a group represented by the formula (2-Ra) or (2-Rb), and $A^2$ is a group represented by the formula (2-A) in which $R^{25}$ and $R^{26}$ are C1-2 linear alkyl groups;
a compound in which $R^{21}$ is a hydrogen atom, m is 1, $R^{22}$ is a group represented by the formula (2-Ra) or (2-Rb), and $A^2$ is a group represented by the formula (2-A) in which $R^{25}$ and $R^{26}$ are trimethylsilyl groups;
a compound in which $R^{21}$ is a phenyl group, m is 1, $R^{22}$ is a group represented by the formula (2-Ra) or (2-Rb), and $A^2$ is a group represented by the formula (2-A) in which $R^{25}$ and $R^{26}$ are C1-2 linear alkyl groups;
a compound in which $R^{21}$ is a phenyl group, m is 1, $R^{22}$ is a group represented by the formula (2-Ra) or (2-Rb), and $A^2$ is a group represented by the formula (2-A) in which $R^{25}$ and $R^{26}$ are trimethylsilyl groups; or
a compound in which m is 0, and $A^2$ is a pyridyl group.

In the case where the conjugated diene polymer (A) is modified by the compound (G), the compound represented by the formula (2) is particularly preferably
4-N,N-dimethylaminomethylstyrene,
3-N,N-dimethylaminomethylstyrene,
4-N,N-bis(trimethylsilyl)aminostyrene,
3-N,N-bis(trimethylsilyl)aminostyrene,
1-(4-N,N-dimethylaminophenyl)-1-phenylethylene,
1-(3-N,N-dimethylaminophenyl)-1-phenylethylene,
4-vinylpyridine, or
2-vinylpyridine.

In the case where the conjugated diene polymer (A) is modified by an alkoxysilane compound, the compound represented by the formula (2) is preferably a compound in which the group represented by $V^2$ is a group represented by the formula (2-V1), and $R^{21}$ in the formula (2-V1) is a hydrogen atom.

The compound is more preferably a compound in which $R^{21}$ is a hydrogen atom, m is 1, $R^{22}$ is a phenylene group, and $A^2$ is a substituted amino group represented by the formula (2-A);
a compound in which $R^{21}$ is a hydrogen atom, m is 1, $R^{22}$ is a group represented by the formula (2-R), and $A^2$ is a substituted amino group represented by the formula (2-A); or
a compound in which $R^{21}$ is a hydrogen atom, m is 0, and $A^2$ is a nitrogen-containing aromatic heterocyclic group.

The compound is still more preferably a compound in which $R^{21}$ is a hydrogen atom, m is 1, $R^{22}$ is a para-phenylene group or a meta-phenylene group, and $A^2$ is a group represented by the formula (2-A) in which $R^{25}$ and $R^{26}$ are joined together to form a polymethylene group;

a compound in which $R^{21}$ is a hydrogen atom, m is 1, $R^{22}$ is a group represented by the formula (2-Ra) or (2-Rb), and $A^2$ is a group represented by the formula (2-A) in which $R^{25}$ and $R^{26}$ are joined together to form a polymethylene group; or a compound in which $R^{21}$ is a hydrogen atom, m is 0, and $A^2$ is a pyridyl group.

In the case where the conjugated diene polymer (A) is modified by an alkoxysilane compound, the compound represented by the formula (2) is particularly preferably
3-(1-pyrrolidinyl)ethylstyrene,
4-(1-pyrrolidinyl)ethylstyrene,
4-vinylpyridine, or
2-vinylpyridine.

Examples of the compounds (G) include compounds represented by the following formula (3):

[Chem. 35]

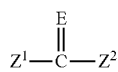
(3)

wherein E represents an oxygen atom or a sulfur atom, and $Z^1$ and $Z^2$ each represent a substituted amino group, a hydrogen atom, an optionally substituted hydrocarbyl group, or an optionally substituted hydrocarbyloxy group, provided that at least one of $Z^1$ and $Z^2$ is a group containing a substituted amino group, or $Z^1$ and $Z^2$ are joined together to form, together with the carbonyl carbon atom, a cyclic structure containing a substituted amino group.

In the formula (3), E represents an oxygen atom or a sulfur atom, and is preferably an oxygen atom.

Examples of the substituted amino groups for $Z^1$ and $Z^2$ in the formula (3) include amino groups substituted with a hydrocarbyl group, amino groups substituted with a group containing a substituted amino group, and amino groups substituted with a group containing a hydrocarbyloxy group.

Examples of the amino groups substituted with a hydrocarbyl group include dialkylamino groups, such as a dimethylamino group, a diethylamino group, or a dipropylamino group.

Examples of the amino groups substituted with a group containing a substituted amino group include (dialkylaminoalkyl)amino groups, such as a (dimethylaminomethyl)amino group, a (dimethylaminoethyl)amino group, a (dimethylaminopropyl)amino group, a (diethylaminopropyl)amino group, or a (dipropylaminopropyl)amino group; and bis(dialkylaminoalkyl)amino groups, such as a bis(dimethylaminoethyl)amino group or a bis(dimethylaminopropyl)amino group.

Examples of the amino groups substituted with a group containing a hydrocarbyloxy group include (alkoxyalkyl)amino groups, such as a (methoxymethyl)amino group, a (methoxyethyl)amino group, a (methoxypropyl)amino group, or an (ethoxymethyl)amino group; (aryloxyalkyl)amino groups, such as a (phenoxymethyl)amino group or a (phenoxyethyl)amino group; and (aralkyloxyalkyl)amino groups, such as a (benzyloxymethyl)amino group or a (benzyloxyethyl)amino group.

Examples of the optionally substituted hydrocarbyl groups for $Z^1$ and $Z^2$ include hydrocarbyl groups, hydrocarbyl groups substituted with a substituted amino group, and hydrocarbyl groups substituted with a hydrocarbyloxy group.

Examples of the hydrocarbyl groups include alkyl groups, such as a methyl group, an ethyl group, a n-propyl group, an isopropyl group, or a n-butyl group; cycloalkyl groups, such as a cyclohexyl group; aryl groups, such as a phenyl group, a methylphenyl group, or an ethylphenyl group; aralkyl groups, such as a benzyl group; alkenyl groups, such as a vinyl group, a 1-propenyl group, an allyl group, an isopropenyl group, a crotyl group, an isocrotyl group, or a methallyl group; and alkynyl groups, such as a propargyl group.

Examples of the hydrocarbyl groups substituted with a substituted amino group include hydrocarbyl groups substituted with a hydrocarbyl-substituted amino group. Examples of the hydrocarbyl groups substituted with a hydrocarbyl-substituted amino group include dialkylaminoalkyl groups, such as a dimethylaminomethyl group, a dimethylaminoethyl group, or a dimethylaminopropyl group; and dialkylaminoaryl groups, such as a dimethylaminophenyl group or a diethylaminophenyl group.

Examples of the hydrocarbyl groups substituted with a hydrocarbyloxy group include alkoxyalkyl groups, such as a methoxymethyl group, a methoxyethyl group, a methoxypropyl group, or an ethoxymethyl group; aryloxyalkyl groups, such as a phenoxymethyl group or a phenoxyethyl group; and aralkyloxyalkyl groups, such as a benzyloxymethyl group or a benzyloxyethyl group.

Examples of the optionally substituted hydrocarbyloxy groups for $Z^1$ and $Z^2$ include hydrocarbyloxy groups, hydrocarbyloxy groups substituted with a hydrocarbyloxy group, and hydrocarbyloxy groups substituted with a substituted amino group.

Examples of the hydrocarbyloxy groups include alkoxy groups, such as a methoxy group, an ethoxy group, a n-propoxy group, an isopropoxy group, or a butoxy group; aryloxy groups, such as a phenoxy group, a methylphenoxy group, or an ethylphenoxy group; and aralkyloxy groups, such as a benzyloxy group.

Examples of the hydrocarbyloxy groups substituted with a hydrocarbyloxy group include alkoxyalkoxy groups, such as a methoxymethoxy group, a methoxyethoxy group, a methoxypropoxy group, or an ethoxymethoxy group; aryloxyalkoxy groups, such as a phenoxymethoxy group or a phenoxyethoxy group; and aralkyloxyalkoxy groups, such as a benzyloxymethoxy group or a benzyloxyethoxy group.

Examples of the hydrocarbyloxy groups substituted with a substituted amino group include hydrocarbyloxy groups substituted with a hydrocarbyl-substituted amino group. Examples of the hydrocarbyloxy groups substituted with a hydrocarbyl-substituted amino group include dialkylaminoalkoxy groups, such as a dimethylaminomethoxy group, a dimethylaminoethoxy group, or a dimethylaminopropoxy group.

Preferred examples of the groups containing a substituted amino group include groups represented by the following formula (3-Z):

[Chem. 36]

(3-Z)

wherein p represents 0 or 1; T represents a C1-10 hydrocarbylene group, a group represented by the following formula (3-Ta), or a group represented by the following formula (3-Tb); and $A^3$ represents a substituted amino group,

[Chem. 37]

$$—O—R^{31}— \quad (3\text{-}Ta)$$

wherein $R^{31}$ represents a C1-10 hydrocarbylene group; and $R^{31}$ and $A^3$ are bonded,

[Chem. 38]

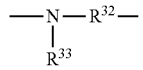
(3-Tb)

wherein $R^{32}$ represents a C1-10 hydrocarbylene group; $R^{33}$ represents a hydrogen atom or a C1-10 hydrocarbyl group; and $R^{32}$ and $A^3$ are bonded.

In the case where $Z^1$ in the formula (3) is a group represented by the formula (3-Z), and $Z^2$ is a hydrocarbyl group, $A^3$ of $Z^1$ and the hydrocarbyl group of $Z^2$ may be bonded. In the case where $Z^1$ and $Z^2$ in the formula (3) are groups represented by the formula (3-Z), $A^3$ of $Z^1$ and $A^3$ of $Z^2$ may be bonded.

In the formula (3-Z), p represents 0 or 1.

In the formula (3-Z), T represents a C1-10 hydrocarbylene group, a group represented by the formula (3-Ta), or a group represented by the formula (3-Tb).

Examples of the C1-10 hydrocarbylene groups for T include alkylene groups, such as a methylene group, an ethylene group, a trimethylene group, a tetramethylene group, a pentamethylene group, or a hexamethylene group; and arylene groups, such as a phenylene group or a naphthylene group.

In the formula (3-Ta), $R^{31}$ represents a C1-10 hydrocarbylene group. In the formula (3-Tb), $R^{32}$ represents a C1-10 hydrocarbylene group, and $R^{33}$ represents a hydrogen atom or a C1-10 hydrocarbyl group.

Examples of the C1-10 hydrocarbylene groups for $R^{31}$ and $R^{32}$ include alkylene groups, such as a methylene group, an ethylene group, a trimethylene group, a tetramethylene group, a pentamethylene group, or a hexamethylene group; and arylene groups, such as a phenylene group or a naphthylene group. Preferred is an ethylene group or a trimethylene group.

Examples of the C1-10 hydrocarbyl groups for $R^{33}$ include alkyl groups, aralkyl groups, and aryl groups. Examples of the alkyl groups include a methyl group, an ethyl group, a n-propyl group, an isopropyl group, a n-butyl group, a sec-butyl group, and a tert-butyl group. Examples of the aralkyl groups include a benzyl group. Examples of the aryl groups include a phenyl group. The C1-10 hydrocarbyl group is preferably a C1-10 alkyl group, and more preferably a methyl group or an ethyl group. $R^{33}$ is preferably a hydrogen atom or a C1-10 alkyl group, and more preferably a hydrogen atom, a methyl group, or an ethyl group.

Examples of the groups represented by the formula (3-Ta) include a group represented by —O—CH$_2$CH$_2$— and a group represented by —O—CH$_2$CH$_2$CH$_2$—.

Examples of the groups represented by the formula (3-Tb) include a group represented by —NH—CH$_2$CH$_2$— and a group represented by —NH—CH$_2$CH$_2$CH$_2$—.

Preferred examples of the groups represented by $A^3$ in the formula (3-Z) include groups represented by the following formula (3-A):

[Chem. 39]

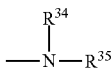
(3-A)

wherein $R^{34}$ and $R^{35}$ each represent a hydrocarbyl group optionally containing a nitrogen atom and/or an oxygen atom, or a trihydrocarbylsilyl group, or $R^{34}$ and $R^{35}$ are joined together to form a hydrocarbylene group optionally containing a nitrogen atom and/or an oxygen atom as a hetero atom, or $R^{34}$ and $R^{35}$ together form a single group bonded to the nitrogen atom via a double bond.

Examples of the hydrocarbyl groups for $R^{34}$ and $R^{35}$ include alkyl groups, alkenyl groups, alkynyl groups, aryl groups, and aralkyl groups. Examples of the alkyl groups include a methyl group, an ethyl group, a n-propyl group, an isopropyl group, a n-butyl group, a sec-butyl group, and a tert-butyl group. Examples of the alkenyl groups include a vinyl group, an allyl group, a 1-propenyl group, and a 1-methylethenyl group. Examples of the alkynyl groups include an ethynyl group and a propargyl group. Examples of the aryl groups include a phenyl group, a tolyl group, and a xylyl group. Examples of the aralkyl groups include a benzyl group.

The hydrocarbyl group for $R^{34}$ and $R^{35}$ preferably has 1 to 10 carbon atoms, more preferably has 1 to 4 carbon atoms, and still more preferably has 1 to 2 carbon atoms.

The hydrocarbyl group for $R^{34}$ and $R^{35}$ is preferably an alkyl group or an alkenyl group, more preferably an alkyl group, and still more preferably a linear alkyl group.

Examples of the hydrocarbyl groups containing a nitrogen atom for $R^{34}$ and $R^{35}$ include dialkylaminoalkyl groups, such as a dimethylaminomethyl group, a dimethylaminoethyl group, a dimethylaminopropyl group, or a diethylaminoethyl group. The hydrocarbyl group containing a nitrogen atom for $R^{34}$ and $R^{35}$ preferably has 3 to 10 carbon atoms, more preferably has 3 to 6 carbon atoms, and still more preferably has 3 to 4 carbon atoms.

Examples of the hydrocarbyl groups containing an oxygen atom for $R^{34}$ and $R^{35}$ include alkoxyalkyl groups, such as a methoxymethyl group, a methoxyethyl group, a methoxypropyl group, an ethoxymethyl group, or an ethoxyethyl group; oxacycloalkyl groups, such as an oxiranyl group or a tetrahydrofuranyl group; and oxacycloalkylalkyl groups, such as a glycidyl group or a tetrahydrofurfuryl group. The hydrocarbyl group containing an oxygen atom for $R^{34}$ and $R^{35}$ preferably has 2 to 10 carbon atoms, more preferably has 2 to 6 carbon atoms, and still more preferably 2 to 4 carbon atoms.

Herein, the oxacycloalkyl group refers to a group obtained by replacing CH$_2$ on an aliphatic ring of a cycloalkyl group with an oxygen atom. The oxacycloalkylalkyl group refers to a group obtained by replacing a hydrogen atom of an alkyl group with an oxacycloalkyl group.

Examples of the trihydrocarbylsilyl groups for $R^{34}$ and $R^{35}$ include trialkylsilyl groups, such as a trimethylsilyl group, a triethylsilyl group, a triisopropylsilyl group, or a tert-butyldimethylsilyl group.

The trihydrocarbylsilyl group for $R^{34}$ and $R^{35}$ is preferably a C3-9 trialkylsilyl group, more preferably a trialkylsilyl group in which an alkyl group bonded to the silicon atom is a C1-4 alkyl group, and still more preferably a trimethylsilyl group.

Examples of the hydrocarbylene groups which are formed by joining $R^{34}$ and $R^{35}$ and optionally contain a nitrogen atom and/or an oxygen atom as a hetero atom include hydrocarbylene groups, hydrocarbylene groups containing a nitrogen atom, and hydrocarbylene groups containing an oxygen atom. Examples of the hydrocarbylene groups include alkylene groups, such as an ethylene group, a trimethylene group, a tetramethylene group, a pentamethylene group, or a hexamethylene group. Examples of the hydrocarbylene groups containing a nitrogen atom include a group represented by —CH$_2$CH$_2$—NH—CH$_2$—, a group represented by —CH$_2$CH$_2$—N═CH—, a group represented by —CH═CH—N═CH—, and a group represented by —CH$_2$CH$_2$—NH—CH$_2$CH$_2$—. Examples of the hydrocarbylene groups containing an oxygen atom include a group represented by —CH$_2$CH$_2$—O—CH$_2$CH$_2$—.

The group formed by joining $R^{34}$ and $R^{35}$ preferably has 2 to 20 carbon atoms, more preferably has 2 to 7 carbon atoms, and still more preferably has 4 to 6 carbon atoms.

The hydrocarbylene group which is formed by joining $R^{34}$ and $R^{35}$ and optionally contains a nitrogen atom and/or an oxygen atom as a hetero atom is preferably a hydrocarbylene group, more preferably an alkylene group, and still more preferably a polymethylene group.

Examples of the single groups which are formed of $R^{34}$ and $R^{35}$ and bonded to the nitrogen atom via a double bond include hydrocarbylidene groups, such as an ethylidene group, a propylidene group, a butylidene group, a 1-methylethylidene group, a 1-methylpropylidene group, or a 1,3-dimethylbutylidene group.

The single group which is formed of $R^{34}$ and $R^{35}$ and bonded to the nitrogen atom via a double bond preferably has 2 to 20 carbon atoms, and more preferably has 2 to 6 carbon atoms.

Preferably, $R^{34}$ and $R^{35}$ are each a hydrocarbyl group or a trihydrocarbylsilyl group, or $R^{34}$ and $R^{35}$ are joined together to form a hydrocarbylene group.

Examples of the groups represented by the formula (3-A) include non-cyclic amino groups and cyclic amino groups.

Examples of the non-cyclic amino groups include dialkylamino groups and bis(trialkylsilyl)amino groups. Examples of the dialkylamino groups include a dimethylamino group, a diethylamino group, a di(n-propyl)amino group, a di(isopropyl)amino group, a di(n-butyl)amino group, a di(sec-butyl)amino group, a di(tert-butyl)amino group, and an ethylmethylamino group. Examples of the bis(trialkylsilyl) amino groups include a bis(trimethylsilyl)amino group, and a bis(tert-butyldimethylsilyl)amino group.

Other examples of the non-cyclic amino groups include an ethylideneamino group, a 1-methylpropylideneamino group, a 1,3-dimethylbutylideneamino group, a 1-methylethylideneamino group, and a 4-N,N-dimethylaminobenzylideneamino group.

Examples of the cyclic amino groups include a 1-aziridinyl group, a 1-azetidinyl group, a 1-pyrrolidinyl group, a 1-piperidinyl group, a 1-hexamethyleneimino group, a 1-imidazolyl group, a 4,5-dihydro-1-imidazolyl group, a 1-pyrrolyl group, a 1-pyrazolyl group, a 1-imidazolidinyl group, a 1-piperazinyl group, and a morpholino group.

The group represented by the formula (3-A) is preferably a group in which $R^{34}$ and $R^{35}$ are hydrocarbyl groups, a group in which $R^{34}$ and $R^{35}$ are trihydrocarbylsilyl groups, a group in which $R^{34}$ and $R^{35}$ are oxacycloalkylalkyl groups, or a group in which $R^{34}$ and $R^{35}$ are joined together to form a hydrocarbylene group. The group represented by the formula (3-A) is more preferably a group in which $R^{34}$ and $R^{35}$ are linear alkyl groups, a group in which $R^{34}$ and $R^{35}$ are trialkylsilyl groups, or a group in which $R^{34}$ and $R^{35}$ are joined together to form a polymethylene group.

The group represented by the formula (3-A) is still more preferably a dialkylamino group.

Examples of the groups represented by the formula (3-Z) with p=0 include dihydrocarbylamino groups, such as a dimethylamino group or a diethylamino group; cyclic amino groups, such as a 1-aziridinyl group, a 1-pyrrolidinyl group, a 1-piperidinyl group, a 1-hexamethyleneimino group, a 1-imidazolyl group, a 4,5-dihydro-1-imidazolyl group, a 1-imidazolidinyl group, a 1-piperazinyl group, or a morpholino group; di(oxacycloalkylalkyl)amino groups, such as a di(glycidyl)amino group or a di(tetrahydrofurfuryl)amino group; and bis(trialkylsilyl)amino groups, such as a bis(trimethylsilyl)amino group, a bis(triethylsilyl)amino group, a bis(t-butyldimethylsilyl)amino group, or a bis(triisopropylsilyl)amino group.

Examples of the groups represented by the formula (3-Z) in which p is 1, and T is a hydrocarbylene group include dihydrocarbylaminoalkyl groups, such as a dimethylaminoethyl group, a diethylaminoethyl group, a dimethylaminopropyl group, or a diethylaminopropyl group; and dihydrocarbylaminoaryl groups, such as a dimethylaminophenyl group or a diethylaminophenyl group.

Examples of the groups represented by the formula (3-Z) in which p is 1, and T is a group represented by the formula (3-Ta) include a group represented by —O—CH$_2$CH$_2$—N(CH$_3$)$_2$, a group represented by —O—CH$_2$CH$_2$—N(CH$_2$CH$_3$)$_2$, a group represented by —O—CH$_2$CH$_2$CH$_2$—N(CH$_3$)$_2$, and a group represented by —O—CH$_2$CH$_2$CH$_2$—N(CH$_2$CH$_3$)$_2$.

Examples of the groups represented by the formula (3-Z) in which p is 1, and T is a group represented by the formula (3-Tb) include a group represented by —NH—CH$_2$CH$_2$—N(CH$_3$)$_2$, a group represented by —NH—CH$_2$CH$_2$—N(CH$_2$CH$_3$)$_2$, a group represented by —NH—CH$_2$CH$_2$CH$_2$—N(CH$_3$)$_2$, and a group represented by —NH—CH$_2$CH$_2$CH$_2$—N(CH$_2$CH$_3$)$_2$.

Examples of the compounds represented by the formula (3) include carboxylic acid amide compounds, thiocarboxylic acid amide compounds, carboxylic acid ester compounds, and thiocarboxylic acid ester compounds.

Examples of the carboxylic acid amide compounds include:

formamide compounds, such as N,N-dimethylformamide or N,N-diethylformamide;

acetamide compounds, such as N,N-dimethylacetamide, N,N-diethylacetamide, aminoacetamide, N,N-dimethyl-N',N'-dimethylaminoacetamide, N,N-dimethylaminoacetamide, N,N-dimethyl-N'-ethylaminoacetamide, N,N-dimethylaminoacetamide, or N-phenyldiacetamide;

propionamide compounds, such as N,N-dimethylpropionamide;

benzamide compounds, such as N,N-dimethylbenzamide, N',N'-(p-dimethylamino)benzamide, N,N'-(p-diethylamino)benzamide, N,N-dimethyl-N',N'-(p-dimethylamino)benzamide, or N,N-dimethyl-N',N'-(p-diethylamino)benzamide;

pyridylamide compounds, such as N,N-dimethyl-4-pyridylamide; and phthalamide compounds, such as N,N,N',N'-tetramethylphthalamide or N,N,N',N'-tetraethylphthalamide.

Examples of the thiocarboxylic acid amide compounds include:
thioformamide compounds, such as N,N-dimethylthioformamide or N,N-diethylthioformamide;
thioacetamide compounds, such as N,N-dimethylthioacetamide, N,N-diethylthioacetamide, aminothioacetamide, N,N-dimethyl-N'—N'-dimethylaminothioacetamide, N,N-dimethylaminothioacetamide, N,N-dimethyl-N'-ethylaminothioacetamide, N,N-dimethylaminothioacetamide, or N-phenyldithioacetamide;
thiopropionamide compounds, such as N,N-dimethylthiopropionamide;
thiobenzamide compounds, such as N,N-dimethylthiobenzamide, N',N'-(p-dimethylamino)thiobenzamide, N',N'-(p-diethylamino)thiobenzamide, N,N-dimethyl-N',N'-(p-dimethylamino)thiobenzamide, or N,N-dimethyl-N',N'-(p-diethylamino)thiobenzamide;
pyridylthioamide compounds, such as N,N-dimethyl-4-pyridylthioamide; and
thiophthalamide compounds, such as N,N,N',N'-tetramethylthiophthalamide or N,N,N',N'-tetraethylthiophthalamide.

Examples of the carboxylic acid ester compounds include:
N,N-dialkylaminomethyl acetates, such as N,N-dimethylaminomethyl acetate or N,N-diethylaminomethyl acetate;
N,N-dialkylaminoethyl acetates, such as N,N-dimethylaminoethyl acetate or N,N-diethylaminoethyl acetate;
N,N-dialkylaminopropyl acetates, such as N,N-dimethylaminopropyl acetate or N,N-diethylaminopropyl acetate; and
N,N-dialkylaminoethyl benzoates, such as N,N-dimethylaminoethyl benzoate or N,N-diethylaminoethyl benzoate.

Examples of the thiocarboxylic acid ester compounds include:
N,N-dialkylaminomethyl thioacetates, such as N,N-dimethylaminomethyl thioacetate or N,N-diethylaminomethyl thioacetate;
N,N-dialkylaminoethyl thioacetates, such as N,N-dimethylaminoethyl thioacetate or N,N-diethylaminoethyl thioacetate;
N,N-dialkylaminopropyl thioacetates, such as N,N-dimethylaminopropyl thioacetate or N,N-diethylaminopropyl thioacetate; and
N,N-dialkylaminoethyl thiobenzoates, such as N,N-dimethylaminoethyl thiobenzoate or N,N-diethylaminoethyl thiobenzoate.

Suitable examples of the compounds represented by the formula (3) include compounds in which $Z^1$ is a group represented by the formula (3-Z), and $Z^2$ is an optionally substituted hydrocarbyl group or a hydrogen atom.

Examples of the compounds include compounds represented by the formula (3-Z) in which p is 1 and T is a phenylene group, as represented by the following formula (3-1), and compounds represented by the following formula (3-2):

[Chem. 40]

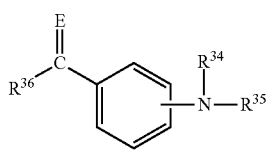

(3-1)

wherein E represents an oxygen atom or a sulfur atom; $R^{34}R^{35}N-$ represents a substituent on the benzene ring; $R^{34}$ and $R^{35}$ each represent a hydrocarbyl group optionally containing a nitrogen atom and/or an oxygen atom, or a trihydrocarbylsilyl group, or $R^{34}$ and $R^{35}$ are joined together to form a hydrocarbylene group optionally containing a nitrogen atom and/or an oxygen atom as a hetero atom, or $R^{34}$ and $R^{35}$ together form a single group bonded to the nitrogen atom via a double bond; and $R^{36}$ represents a hydrocarbyl group or a hydrogen atom,

[Chem. 41]

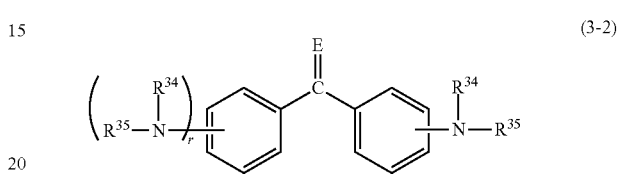

(3-2)

wherein E represents an oxygen atom or a sulfur atom; r represents a number of 0 to 2; $R^{34}R^{35}N-$ represents a substituent on the benzene ring; $R^{34}$ and $R^{35}$ each represent a hydrocarbyl group optionally containing a nitrogen atom and/or an oxygen atom, or a trihydrocarbylsilyl group, or $R^{34}$ and $R^{35}$ are joined together to form a hydrocarbylene group optionally containing a nitrogen atom and/or an oxygen atom as a hetero atom, or $R^{34}$ and $R^{35}$ together form a single group bonded to the nitrogen atom via a double bond.

E in the formula (3-1) and the formula (3-2) represents an oxygen atom or a sulfur atom, and is preferably an oxygen atom.

In the formula (3-2), r represents a number of 0 to 2.

$R^{34}R^{35}N-$ in the formula (3-1) and the formula (3-2) represents a substituent on the benzene ring. The definitions, examples, and preferred groups of $R^{34}$ and $R^{35}$ are as mentioned for $R^{34}$ and $R^{35}$ in the formula (3-A).

$R^{34}R^{35}N-$ in the formula (3-1) and the formula (3-2) is preferably a dialkylamino group. The alkyl groups in the dialkylamino group are each preferably a C1-4 alkyl group.

$R^{36}$ in the formula (3-1) represents a hydrogen atom or a hydrocarbyl group. Examples of the hydrocarbyl groups include alkyl groups, such as a methyl group, an ethyl group, a n-propyl group, an isopropyl group, a n-butyl group, a sec-butyl group, or a tert-butyl group; aryl groups, such as a phenyl group, a methylphenyl group, or an ethylphenyl group; and aralkyl groups, such as a benzyl group.

Examples of the compounds represented by the formula (3-1) include:
dialkylamino-substituted benzaldehyde compounds, such as 4-dimethylaminobenzaldehyde or 4-diethylaminobenzaldehyde;
dialkylamino-substituted acetophenone compounds, such as 4-dimethylaminoacetophenone or 4-diethylaminoacetophenone;
hetero ring-substituted acetophenone compounds, such as 4'-imidazol-1-yl-acetophenone, 4'-(1-pyrazolyl)acetophenone, or 4-morpholinoacetophenone;
dialkylamino-substituted thiobenzaldehyde compounds, such as 4-dimethylaminothiobenzaldehyde or 4-diethylaminothiobenzaldehyde;
dialkylamino-substituted thioacetophenone compounds, such as 4-dimethylaminothioacetophenone or 4-diethylaminothioacetophenone; and hetero ring-substituted thioacetophenone compounds, such as 4'-imidazol-1-yl-thioacetophenone, 4'-(1-pyrazolyl)thioacetophenone, or 4-morpholinothioacetophenone.

Examples of the compounds represented by the formula (3-2) include:

dialkylamino-substituted benzophenone compounds, such as 3-dimethylaminobenzophenone, 3-diethylaminobenzophenone, 4-dimethylaminobenzophenone, 4-diethylaminobenzophenone, 4,4'-bis(dimethylamino)-benzophenone, or 4,4'-bis(diethylamino)-benzophenone;

hetero ring-substituted benzophenone compounds, such as 4'-(imidazol-1-yl)-benzophenone, 4'-(1-pyrazolyl)benzophenone, or 4-morpholinobenzophenone;

dialkylamino-substituted thiobenzophenone compounds, such as 3-dimethylaminothiobenzophenone, 3-diethylaminothiobenzophenone, 4-dimethylaminothiobenzophenone, 4-diethylaminothiobenzophenone, 4,4'-bis(dimethylamino)thiobenzophenone, or 4,4'-bis(diethylamino)thiobenzophenone; and hetero ring-substituted thiobenzophenone compounds, such as 4'-(imidazol-1-yl)-thiobenzophenone, 4'-(1-pyrazolyl)thiobenzophenone, or 4-morpholinothiobenzophenone.

Suitable examples of the compounds represented by the formula (3) include compounds in which E is an oxygen atom, $Z^1$ is a group represented by the formula (3-Z), and $Z^2$ is a hydrocarbyl group, as represented by the following formula (3-3):

[Chem. 42]

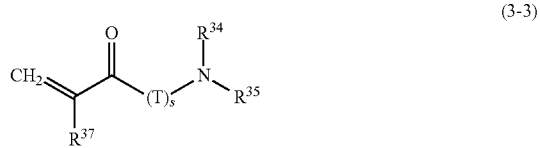

(3-3)

wherein s represents 0 or 1; T represents a C1-10 hydrocarbylene group, a group represented by the formula (3-Ta) or a group represented by the formula (3-Tb); $R^{34}$ and $R^{35}$ each represent a hydrocarbyl group optionally containing a nitrogen atom and/or an oxygen atom, or a trihydrocarbylsilyl group, or $R^{34}$ and $R^{35}$ are joined together to form a hydrocarbylene group optionally containing a nitrogen atom and/or an oxygen atom as a hetero atom, or $R^{34}$ and $R^{35}$ together form a single group bonded to the nitrogen atom via a double bond; and $R^{37}$ represents a hydrogen atom or a hydrocarbyl group.

The definition, examples, and preferred groups of T in the formula (3-3) are as mentioned in the formula (3-Z).

The definitions, examples, and preferred groups of $R^{34}$ and $R^{35}$ in the formula (3-3) are as mentioned in the formula (3-A).

Examples of the hydrocarbyl groups for $R^{37}$ include alkyl groups, alkenyl groups, and aryl groups. Examples of the alkyl groups include a methyl group, an ethyl group, a n-propyl group, an isopropyl group, a n-butyl group, a sec-butyl group, and a tert-butyl group, and preferably a methyl group. Examples of the alkenyl groups include a vinyl group, an allyl group, a 1-propenyl group, a 1-methylethenyl group, and preferably a vinyl group. Examples of the aryl groups include a phenyl group, a methylpheny group, and an ethylphenyl group, and preferably a phenyl group.

$R^{37}$ is preferably a hydrogen atom, a methyl group, a vinyl group, or a phenyl group, and more preferably a hydrogen atom or a methyl group.

Examples of the compounds represented by the formula (3-3) include the following acrylamide compounds of the formula in which s is 0 and $R^{37}$ is a hydrogen atom:
N,N-dimethylacrylamide,
N,N-diethylacrylamide,
N,N-bistrimethylsilylacrylamide,
N,N-di(glycidyl)acrylamide,
N,N-di(tetrahydrofurfuryl)acrylamide, and morpholinoacrylamide.

Examples of the compounds represented by the formula (3-3) include the following acrylamide compounds of the formula in which s is 1, T is a group represented by the formula (3-Tb), and $R^{37}$ is a hydrogen atom:
N-(2-dimethylaminoethyl)acrylamide,
N-(3-dimethylaminopropyl)acrylamide,
N-(4-dimethylaminobutyl)acrylamide,
N-(2-diethylaminoethyl)acrylamide,
N-(3-diethylaminopropyl)acrylamide,
N-(4-diethylaminobutyl)acrylamide,
N-(3-bistrimethylsilylaminopropyl)acrylamide,
N-(3-di(glycidyl)aminopropyl)acrylamide,
N-(3-di(tetrahydrofurfuryl)aminopropyl)acrylamide, and
N-(3-morpholinopropyl)acrylamide.

Examples of the compounds represented by the formula (3-3) include the following methacrylamide compounds of the formula in which s is 0 and $R^{37}$ is a methyl group:
N,N-dimethylmethacrylamide,
N,N-diethylmethacrylamide,
N,N-bistrimethylsilylmethacrylamide,
N,N-di(glycidyl)methacrylamide,
N,N-di(tetrahydrofurfuryl)methacrylamide, and morpholinomethacrylamide.

Examples of the compounds represented by the formula (3-3) include the following methacrylamide compounds of the formula in which s is 1, T is a group represented by the formula (3-Tb), and $R^{37}$ is a methyl group:
N-(2-dimethylaminoethyl)methacrylamide,
N-(3-dimethylaminopropyl)methacrylamide,
N-(4-dimethylaminobutyl)methacrylamide,
N-(2-diethylaminoethyl)methacrylamide,
N-(3-diethylaminopropyl)methacrylamide,
N-(4-diethylaminobutyl)methacrylamide,
N-(3-bistrimethylsilylaminopropyl)methacrylamide,
N-(3-di(glycidyl)aminopropyl)methacrylamide,
N-(3-di(tetrahydrofurfuryl)aminopropyl)methacrylamide, and
N-(3-morpholinopropyl)methacrylamide.

Examples of the compounds represented by the formula (3-3) include the following acrylate compounds of the formula in which s is 1, T is a group represented by the formula (3-Ta), and $R^{37}$ is a hydrogen atom:
2-dimethylaminoethyl acrylate,
3-dimethylaminopropyl acrylate,
4-dimethylaminobutyl acrylate,
2-diethylaminoethyl acrylate,
3-diethylaminopropyl acrylate,
4-diethylaminobutyl acrylate,
3-bistrimethylsilylaminopropyl acrylate,
3-di(glycidyl)aminopropyl acrylate,
3-di(tetrahydrofurfuryl)aminopropyl acrylate, and
3-morpholinopropyl acrylate.

Examples of the compounds represented by the formula (3-3) include the following methacrylate compounds of the formula in which s is 1, T is a group represented by the formula (3-Ta), and $R^{37}$ is a methyl group:
2-dimethylaminoethyl methacrylate,
3-dimethylaminopropyl methacrylate,
4-dimethylaminobutyl methacrylate,
2-diethylaminoethyl methacrylate,
3-diethylaminopropyl methacrylate,
4-diethylaminobutyl methacrylate,
3-bistrimethylsilylaminopropyl methacrylate,
3-di(glycidyl)aminopropyl methacrylate,
3-di(tetrahydrofurfuryl)aminopropyl methacrylate, and
3-morpholinopropyl methacrylate.

The compound represented by the formula (3) is preferably a compound represented by the formula (3-3), more preferably an acrylamide or methacrylamide compound of the formula in which s is 1, T is a group represented by the formula (3-Tb), and $R^{37}$ is a hydrogen atom or a methyl group.

The compound represented by the formula (3) is still more preferably
N-(3-dimethylaminopropyl)acrylamide,
N-(3-diethylaminopropyl)acrylamide,
N-(3-dimethylaminopropyl)methacrylamide, or
N-(3-diethylaminopropyl)methacrylamide.

Suitable examples of the compounds represented by the formula (3) include compounds in which $Z^1$ is a group represented by the formula (3-Z), $Z^2$ is a hydrocarbylene group, and $A^3$ of $Z^1$ and the hydrocarbylene group of $Z^2$ are bonded, and compounds in which $Z^1$ and $Z^2$ are groups represented by the formula (3-Z), and $A^3$ of $Z^1$ and $A^3$ of $Z^2$ are bonded. Examples of the compounds include compounds in which E is an oxygen atom and p is 0, as represented by the following formula (3-4), and compounds represented by the following formula (3-5):

[Chem. 43]

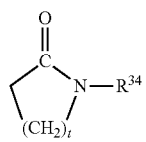

(3-4)

wherein t represents a number of 0 to 10, and $R^{34}$ represents a hydrocarbyl group optionally containing a nitrogen atom and/or an oxygen atom, or a trihydrocarbylsilyl group,

[Chem. 44]

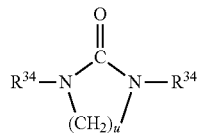

(3-5)

wherein u represents a number of 0 to 10, and $R^{34}$ represents a hydrocarbyl group optionally containing a nitrogen atom and/or an oxygen atom, or a trihydrocarbylsilyl group.

In the formulas, t and u each represent a number of 0 to 10. The number is preferably 2 or more for enhanced fuel economy, and is preferably 7 or less for enhanced productivity.

In the formulas, the definition, examples, and preferred groups of $R^{34}$ are as mentioned for $R^{34}$ in the formula (3-A). $R^{34}$ is preferably a hydrocarbyl group, more preferably a C1-4 alkyl group or a C6-10 aryl group.

Examples of the compounds represented by the formula (3-4) include: β-propiolactam compounds, such as N-methyl-β-propiolactam, N-(t-butyl)-β-propiolactam, or N-phenyl-β-propiolactam;

2-pyrrolidone compounds, such as 1-methyl-2-pyrrolidone, 1-(t-butyl)-2-pyrrolidone, 1-phenyl-2-pyrrolidone, 1-(p-methylphenyl)-2-pyrrolidone, 1-(p-methoxyphenyl)-2-pyrrolidone, 1-benzyl-2-pyrrolidone, 1-naphthyl-2-pyrrolidone, 1-phenyl-5-methyl-2-pyrrolidone, 1-(t-butyl)-5-methyl-2-pyrrolidone, or 1-(t-butyl)-1,3-dimethyl-2-pyrrolidone;

2-piperidone compounds, such as 1-(t-butyl)-2-piperidone, 1-phenyl-2-piperidone, 1-(p-methylphenyl)-2-piperidone, 1-(p-methoxyphenyl)-2-piperidone, or 1-naphthyl-2-piperidone;

ε-caprolactam compounds, such as N-methyl-ε-caprolactam, N-ethyl-ε-caprolactam, N-(n-propyl)-ε-caprolactam, N-phenyl-ε-caprolactam, N-(p-methoxyphenyl)-ε-caprolactam, or N-benzyl-ε-caprolactam; and ω-laurilolactam compounds, such as N-phenyl-ω-laurilolactam.

The compound represented by the formula (3-4) is preferably a 2-pyrrolidone compound or an ε-caprolactam compound, more preferably a 1-hydrocarbyl-substituted-2-pyrrolidone or a N-hydrocarbyl-substituted-ε-caprolactam, still more preferably a 1-alkyl-substituted-2-pyrrolidone, a 1-aryl-substituted-2-pyrrolidone, a N-alkyl-substituted-ε-caprolactam, or a N-aryl-substituted-ε-caprolactam, and particularly preferably 1-phenyl-2-pyrrolidone or N-methyl-ε-caprolactam.

Examples of the compounds represented by the formula (3-5) include 1,3-hydrocarbyl-substituted-2-imidazolidinones, such as 1,3-dimethyl-2-imidazolidinone, 1,3-diethyl-2-imidazolidinone, 1,3-di(n-propyl)-2-imidazolidinone, 1,3-di(t-butyl)-2-imidazolidinone, or 1,3-diphenyl-2-imidazolidinone.

The compound represented by the formula (3-5) is preferably a 1,3-substituted-2-imidazolidinone, more preferably a 1,3-hydrocarbyl-substituted-2-imidazolidinone, and still more preferably a 1,3-dialkyl-2-imidazolidinone. The 1,3-dialkyl-2-imidazolidinone is preferably 1,3-dimethyl-2-imidazolidinone, 1,3-diethyl-2-imidazolidinone, or 1,3-di(n-propyl)-2-imidazolidinone, and more preferably 1,3-dimethyl-2-imidazolidinone.

Examples of the alkoxysilane compounds include tetraalkoxysilane compounds, alkoxysilane compounds containing an alkyl group, alkoxysilane compounds containing a halogen atom, alkoxysilane compounds containing an epoxy group, alkoxysilane compounds containing a mercapto group, and alkoxysilane compounds containing a substituted amino group.

Examples of the tetraalkoxysilane compounds include tetramethoxysilane, tetraethoxysilane, tetra-n-propoxysilane, tetraisopropoxysilane, tetra-n-butoxysilane, tetraisobutoxysilane, tetra-tert-butoxysilane, and tetra-(2-ethylhexanoxy)silane.

Examples of the alkoxysilane compounds containing an alkyl group include methyltrimethoxysilane, methyltriethoxysilane, methyltri-n-propoxysilane, methyltriisopropoxysilane, methyltri-n-butoxysilane, methyltriisobutoxysilane, methyltri-tert-butoxysilane, methyltri-(2-ethylhexanoxy)silane, dimethyldimethoxysilane, dimethyldiethoxysilane, dimethyldi-n-propoxysilane, dimethyldiisopropoxysilane, dimethyldi-n-butoxysilane, dimethyldiisobutoxysilane, dimethyldi-tert-butoxysilane, and dimethyldi-(2-ethylhexanoxy)silane.

Examples of the alkoxysilane compounds containing a halogen atom include trimethoxychlorosilane, triethoxychlorosilane, tri-n-propoxychlorosilane, triisopropoxychlorosilane, tri-n-butoxychlorosilane, triisobutoxychlorosilane, tri-tert-butoxychlorosilane, tri-(2-ethylhexanoxy)chlorosilane, dimethoxydichlorosilane, diethoxydichlorosilane, di-n-propoxydichlorosilane, diisopropoxydichlorosilane, di-n-butoxydichlorosilane, diisobutoxydichlorosilane, di-tert-butoxydichlorosilane, di-(2-ethylhexanoxy)dichlorosilane, methoxytrichlorosilane, ethoxytrichlorosilane, trimethoxybromosilane, triethoxybromosilane, tri-n-propoxybromosilane, triisopropoxybromosilane, tri-n-butoxybromosilane, dimethoxydibromosilane, diethoxydibromosilane, di-n-propoxydibromosilane, diisopropoxydibromosilane, di-n-butoxydibromosilane, methoxytribromosilane, ethoxytribromosilane, trimethoxyiodosilane, triethoxyiodosilane, tri-n-propoxyiodosilane, triisopropoxyiodosilane, tri-n-butoxyiodosilane, dimethoxydiiodosilane, diethoxydiiodosilane, di-n-propoxydiiodosilane, diisopropoxydiiodosilane, di-n-butoxydiiodosilane, methoxytriiodosilane, and ethoxytriiodosilane.

Examples of the alkoxysilane compounds containing an epoxy group include 2-glycidoxyethyltrimethoxysilane, 3-glycidoxypropyltrimethoxysilane, 4-glycidoxybutyltrimethoxysilane, 2-glycidoxyethyltriethoxysilane, 3-glycidoxypropyltriethoxysilane, 4-glycidoxybutyltriethoxysilane, 2-glycidoxyethyltripropoxysilane, 3-glycidoxypropyltripropoxysilane, 4-glycidoxybutyltripropoxysilane, 3-glycidoxypropylmethyldimethoxysilane, 3-glycidoxypropylmethyldiethoxysilane, 3-glyoidoxypropylethyldimethoxysilane, 3-glycidoxypropylethyldiethoxysilane, 3-glycidoxypropyldimethylmethoxysilane, 3-glycidoxypropyldimethylethoxysilane, 3-glycidoxypropyldiethylmethoxysilane, 3-glycidoxypropyldiethylethoxysilane, bis(3-glycidoxypropyl)dimethoxysilane, bis(3-glycidoxypropyl)diethoxysilane, bis(3-glycidoxypropyl)dipropoxysilane, bis(3-glycidoxypropyl)methylmethoxysilane, bis(3-glycidoxypropyl)methylethoxysilane, bis(3-glycidoxypropyl)ethylmethoxysilane, bis(3-glycidoxypropyl)ethylethoxysilane, tris(3-glycidoxypropyl)methoxysilane, tris(3-glycidoxypropyl)ethoxysilane, tris(3-glycidoxypropyl)dipropoxysilane, β-(3,4-epoxycyclohexyl)ethyl-trimethoxysilane, β-(3,4-epoxycyclohexyl)ethyl-triethoxysilane, β-(3,4-epoxycyclohexyl)ethyl-tripropoxysilane, β-(3,4-epoxycyclohexyl)propyl-trimethoxysilane, β-(3,4-epoxycyclohexyl)propyl-triethoxysilane, β-(3,4-epoxycyclohexyl)propyl-tripropoxysilane, β-(3,4-epoxycyclohexyl)ethyl-methyldimethoxysilane, β-(3,4-epoxycyclohexyl)ethyl-methyldiethoxysilane, β-(3,4-epoxycyclohexyl)propyl-methyldimethoxysilane, β-(3,4-epoxycyclohexyl)propyl-methyldiethoxysilane, β-(3,4-epoxycyclohexyl)ethyl-dimethylmethoxysilane, β-(3,4-epoxycyclohexyl)ethyl-dimethylethoxysilane, β-(3,4-epoxycyclohexyl)propyl-dimethylmethoxysilane, and β-(3,4-epoxycyclohexyl)propyl-dimethylethoxysilane.

Examples of the alkoxysilane compounds containing a mercapto group include 2-mercaptoethyltrimethoxysilane, 3-mercaptopropyltrimethoxysilane, 4-mercaptobutyltrimethoxysilane, 2-mercaptoethyltriethoxysilane, 3-mercaptopropyltriethoxysilane, 4-mercaptobutyltriethoxysilane, 2-mercaptoethyltripropoxysilane, 3-mercaptopropyltripropoxysilane, 4-mercaptobutyltripropoxysilane, 2-mercaptoethylmethyldimethoxysilane, 3-mercaptopropylmethyldimethoxysilane, 4-mercaptobutylmethyldimethoxysilane, 2-mercaptoethylmethyldiethoxysilane, 3-mercaptopropylmethyldiethoxysilane, and 4-mercaptobutylmethyldiethoxysilane.

Examples of the alkoxysilane compounds containing a substituted amino group include compounds represented by the following formula (4):

[Chem. 45]

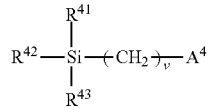

(4)

wherein v represents an integer of 1 to 10; $R^{41}$, $R^{42}$ and $R^{43}$ each independently represent an alkyl group or an alkoxy group, and at least one of $R^{41}$, $R^{42}$, and $R^{43}$ is an alkoxy group; and $A^4$ represents a substituted amino group.

$R^{41}$, $R^{42}$, and $R^{43}$ each represent an alkyl group or an alkoxy group.

Examples of the alkyl groups for $R^{41}$, $R^{42}$, and $R^{43}$ include a methyl group, an ethyl group, a n-propyl group, an isopropyl group, a n-butyl group, a sec-butyl group, and a tert-butyl group. The alkyl group is preferably a C1-10 alkyl group, more preferably a C1-3 alkyl group, and still more preferably a methyl group or an ethyl group.

Examples of the alkoxy groups for $R^{41}$, $R^{42}$, and $R^{43}$ include a methoxy group, an ethoxy group, a n-propoxy group, an isopropoxy group, a n-butoxy group, a sec-butoxy group, a tert-butoxy group, and a 2-ethylhexanoxy group. The alkoxy group is preferably a C1-10 alkoxy group, more preferably a C1-3 alkoxy group, and still more preferably a methoxy group or an ethoxy group.

At least one of $R^{41}$, $R^{42}$, and $R^{43}$ is an alkoxy group. For enhanced fuel economy, at least two of $R^{41}$, $R^{42}$, and $R^{43}$ are preferably alkoxy groups; more preferably, the three $R^{41}$, $R^{42}$, and $R^{43}$ are alkoxy groups.

$A^4$ in the formula (4) represents a substituted amino group. The substituted amino group for $A^4$ is preferably a group represented by the following formula (4-A):

[Chem. 46]

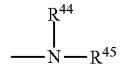

(4-A)

wherein $R^{44}$ and $R^{45}$ each represent a hydrogen atom or a hydrocarbyl group optionally containing a nitrogen atom and/or an oxygen atom, or $R^{44}$ and $R^{45}$ are joined together to form a hydrocarbylene group optionally containing a nitrogen atom and/or an oxygen atom as a hetero atom, or $R^{44}$ and $R^{45}$ together form a single group bonded to the nitrogen atom via a double bond.

$R^{44}$ and $R^{45}$ each represent a hydrogen atom or a hydrocarbyl group optionally containing a nitrogen atom and/or an oxygen atom, or $R^{44}$ and $R^{45}$ are joined together to form a hydrocarbylene group optionally containing a nitrogen atom and/or an oxygen atom, or $R^{44}$ and $R^{45}$ together form a single group bonded to the nitrogen atom via a double bond.

Examples of the hydrocarbyl groups for $R^{44}$ and $R^{45}$ include alkyl groups, such as a methyl group, an ethyl group, a n-propyl group, an isopropyl group, a n-butyl group, a sec-butyl group, or a tert-butyl group; alkenyl groups, such as a vinyl group, an allyl group, a 1-propenyl group, or a 1-methylethenyl group; alkynyl groups, such as an ethynyl group or a propargyl group; aryl groups, such as a phenyl group, a tolyl group, or a xylyl group; and aralkyl groups, such as a benzyl group.

Examples of the hydrocarbyl groups containing a nitrogen atom for $R^{44}$ and $R^{45}$ include dialkylaminoalkyl groups, such as a dimethylaminomethyl group, a dimethylaminoethyl group, a dimethylaminopropyl group, a diethylaminomethyl group, a diethylaminoethyl group, or a diethylaminopropyl group.

Examples of the hydrocarbyl groups containing an oxygen atom for $R^{44}$ and $R^{45}$ include alkoxyalkyl groups, such as a methoxymethyl group, a methoxyethyl group, a methoxypropyl group, an ethoxymethyl group, an ethoxyethyl group, or an ethoxypropyl group; monooxacycloalkyl groups, such as a 2-oxiranyl group, a 2-oxetanyl group, or a 2-tetrahydrofuranyl group; dioxacycloalkyl groups, such as a 2-dioxolanyl group; alkyl groups substituted with a monooxacycloalkyl group, such as a glycidyl group or a tetrahydrofurfuryl group; and a 3,4-epoxycyclohexyl group.

Herein, the monooxacycloalkyl group refers to a group obtained by replacing one $CH_2$ of a cycloalkyl group with an oxygen atom. The dioxacycloalkyl group refers to a group obtained by replacing two $CH_2s$ of a cycloalkyl group with oxygen atoms.

The hydrocarbyl group optionally containing a nitrogen atom and/or an oxygen atom for $R^{44}$ and $R^{45}$ preferably has 1 to 10 carbon atoms, and more preferably has 1 to 6 carbon atoms.

Examples of the groups formed by joining $R^{44}$ and $R^{45}$ include hydrocarbylene groups, hydrocarbylene groups containing a nitrogen atom, and hydrocarbylene groups containing an oxygen atom. Examples of the hydrocarbylene groups include alkylene groups, such as a trimethylene group, a tetramethylene group, a pentamethylene group, or a hexamethylene group. Examples of the hydrocarbylene groups containing a nitrogen atom include a group represented by —$CH_2CH_2$—NH—$CH_2$—, a group represented by —$CH_2CH_2$—N=CH—, a group represented by —CH=CH—N=CH—, and a group represented by —$CH_2CH_2$—NH—$CH_2CH_2$—. Examples of the hydrocarbylene groups containing an oxygen atom include a group represented by —$CH_2CH_2$—O—$CH_2CH_2$—.

The group formed by joining $R^{44}$ and $R^{45}$ preferably has 2 to 20 carbon atoms, and more preferably has 2 to 12 carbon atoms.

Examples of the single groups which are formed of $R^{44}$ and $R^{45}$ and bonded to the nitrogen atom via a double bond include hydrocarbylidene groups, such as an ethylidene group, a propylidene group, a butylidene group, a 1-methylethylidene group, a 1-methylpropylidene group, or a 1,3-dimethylbutylidene group, and a 4-N,N-dimethylaminobenzylidene group.

The single group which is formed of $R^{44}$ and $R^{45}$ and bonded to the nitrogen atom via a double bond preferably has 2 to 20 carbon atoms, and more preferably has 2 to 12 carbon atoms.

Preferably, $R^{44}$ and $R^{45}$ are each a hydrocarbyl group, or $R^{44}$ and $R^{45}$ are joined together to form a hydrocarbylene group, or $R^{34}$ and $R^{35}$ together form a single group which is a hydrocarbylidene group bonded to the nitrogen atom via a double bond; more preferably, $R^{44}$ and $R^{45}$ are each a hydrocarbyl group, and still more preferably an alkyl group. The alkyl group is preferably a methyl group or an ethyl group.

v represents a number of 1 to 10, and is preferably a number of 2 to 4, and more preferably 3.

Examples of the compounds represented by the formula (4) in which $R^{44}$ and $R^{45}$ are alkyl groups include:
[3-(dialkylamino)propyl]trialkoxysilanes, such as [3-(dimethylamino) propyl]trimethoxysilane,
[3-(diethylamino)propyl]trimethoxysilane,
[3-(ethylmethylamino)propyl]trimethoxysilane,
[3-(dimethylamino)propyl]triethoxysilane,
[3-(diethylamino)propyl]triethoxysilane, or
[3-(ethylmethylamino)propyl]triethoxysilane;
[3-(dialkylamino)propyl]alkyldialkoxysilanes, such as [3-(dimethylamino)propyl]methyldimethoxysilane,
[3-(diethylamino)propyl]methyldimethoxysilane,
[3-(ethylmethylamino)propyl]methyldimethoxysilane,
[3-(dimethylamino)propyl]ethyldimethoxysilane,
[3-(diethylamino)propyl]ethyldimethoxysilane,
[3-(ethylmethylamino)propyl]ethyldimethoxysilane,
[3-(dimethylamino)propyl]methyldiethoxysilane,
[3-(diethylamino)propyl]methyldiethoxysilane,
[3-(ethylmethylamino)propyl]methyldiethoxysilane,
[3-(dimethylamino)propyl]ethyldiethoxysilane,
[3-(diethylamino)propyl]ethyldiethoxysilane, or
[3-(ethylmethylamino)propyl]ethyldiethoxysilane; and
[3-(dialkylamino)propyl]dialkylalkoxysilanes, such as
[3-(dimethylamino)propyl]dimethylmethoxysilane,
[3-(diethylamino)propyl]dimethylmethoxysilane,
[3-(diethylamino)propyl]diethylmethoxysilane,
[3-(diethylamino)propyl]diethylmethoxysilane,
[3-(dimethylamino)propyl]dimethylethoxysilane,
[3-(diethylamino)propyl]dimethylethoxysilane,
[3-(dimethylamino)propyl]diethylethoxysilane, or
[3-(diethylamino)propyl]diethylethoxysilane.

Examples of the compounds represented by the formula (4) in which $R^{44}$ and $R^{45}$ are alkoxyalkyl groups include:
{3-[bis(alkoxyalkyl)amino]propyl}trialkoxysilanes, such as
{3-[bis(methoxymethyl)amino]propyl}trimethoxysilane,
{3-[bis(ethoxymethyl)amino]propyl}trimethoxysilane,
{3-[bis(methoxyethyl)amino]propyl}trimethoxysilane,
{3-[bis(ethoxyethyl)amino]propyl}trimethoxysilane,
{3-[bis(methoxymethyl)amino]propyl}triethoxysilane,
{3-[bis(ethoxymethyl)amino]propyl}triethoxysilane,
{3-[bis(methoxyethyl)amino]propyl}triethoxysilane, or
{3-[bis(ethoxyethyl)amino]propyl}triethoxysilane;
{3-[bis(alkoxyalkyl)amino]propyl}alkyldialkoxysilanes,
such as {3-[bis(methoxymethyl)amino]propyl}methyldimethoxysilane,
{3-[bis(ethoxymethyl)amino]propyl}methyldimethoxysilane,
{3-[bis(methoxyethyl)amino]propyl}methyldimethoxysilane,
{3-[bis(ethoxyethyl)amino]propyl}methyldimethoxysilane,
{3-[bis(methoxymethyl)amino]propyl}ethyldimethoxysilane,
{3-[bis(ethoxymethyl)amino]propyl}ethyldimethoxysilane,
{3-[bis(methoxyethyl)amino]propyl}ethyldimethoxysilane,
{3-[bis(ethoxyethyl)amino]propyl}ethyldimethoxysilane,
{3-[bis(methoxymethyl)amino]propyl}methyldiethoxysilane,
{3-[bis(ethoxymethyl)amino]propyl}methyldiethoxysilane,
{3-[bis(methoxyethyl)amino]propyl}methyldiethoxysilane,
{3-[bis(ethoxyethyl)amino]propyl}methyldiethoxysilane,
{3-[bis(methoxymethyl)amino]propyl}ethyldiethoxysilane,
{3-[bis(ethoxymethyl)amino]propyl}ethyldiethoxysilane, {3-[bis(methoxyethyl)amino]propyl}ethyldiethoxysilane, or
{3-[bis(ethoxyethyl)amino]propyl}ethyldiethoxysilane; and
{3-[bis(alkoxyalkyl)amino]propyl}dialkylalkoxysilanes, such as
{3-[bis(methoxymethyl)amino]propyl}dimethylmethoxysilane,
{3-[bis(ethoxymethyl)amino]propyl}dimethylmethoxysilane,
{3-[bis(methoxyethyl)amino]propyl}dimethylmethoxysilane,
{3-[bis(ethoxyethyl)amino]propyl}dimethylmethoxysilane,
{3-[bis(methoxymethyl)amino]propyl}diethylmethoxysilane,
{3-[bis(ethoxymethyl)amino]propyl}diethylmethoxysilane,
{3-[bis(methoxyethyl)amino]propyl}diethylmethoxysilane,
{3-[bis(ethoxyethyl)amino]propyl}diethylmethoxysilane,
{3-[bis(methoxymethyl)amino]propyl}dimethylethoxysilane,
{3-[bis(ethoxymethyl)amino]propyl}dimethylethoxysilane,
{3-[bis(methoxyethyl)amino]propyl}dimethylethoxysilane,
{3-[bis(ethoxyethyl)amino]propyl}dimethylethoxysilane,
{3-[bis(methoxymethyl)amino]propyl}diethylethoxysilane,
{3-[bis(ethoxymethyl)amino]propyl}diethylethoxysilane,
{3-[bis(methoxyethyl)amino]propyl}diethylethoxysilane, or
{3-[bis(ethoxyethyl)amino]propyl}diethylethoxysilane.

Examples of the compounds represented by the formula (4) in which $R^{44}$ and $R^{45}$ are oxiranyl groups include
{3-[di(oxiranyl)amino]propyl}trimethoxysilane,
{3-[di(oxiranyl)amino]propyl}triethoxysilane,
{3-[di(oxiranyl)amino]propyl}methyldimethoxysilane,
{3-[di(oxiranyl)amino]propyl}ethyldimethoxysilane,
{3-[di(oxiranyl)amino]propyl}methyldiethoxysilane,
{3-[di(oxiranyl)amino]propyl}ethyldiethoxysilane,
{3-[di(oxiranyl)amino]propyl}dimethylmethoxysilane,
{3-[di(oxiranyl)amino]propyl}diethylmethoxysilane,
{3-[di(oxiranyl)amino]propyl}dimethylethoxysilane, and
{3-[di(oxiranyl)amino]propyl}diethylethoxysilane.

Examples of the compounds represented by the formula (4) in which $R^{44}$ and $R^{45}$ are tetrahydrofuranyl groups include
{3-[di(tetrahydrofuranyl)amino]propyl}trimethoxysilane,
{3-[di(tetrahydrofuranyl)amino]propyl}triethoxysilane,
{3-[di(tetrahydrofuranyl)amino]propyl}methyldimethoxysilane,
{3-[di(tetrahydrofuranyl)amino]propyl}ethyldimethoxysilane,
{3-[di(tetrahydrofuranyl)amino]propyl}methyldiethoxysilane,
{3-[di(tetrahydrofuranyl)amino]propyl}ethyldiethoxysilane,
{3-[di(tetrahydrofuranyl)amino]propyl}dimethylmethoxysilane,
{3-[di(tetrahydrofuranyl)amino]propyl}diethylmethoxysilane,
{3-[di(tetrahydrofuranyl)amino]propyl}dimethylethoxysilane, and
{3-[di(tetrahydrofuranyl)amino]propyl}diethylethoxysilane.

Examples of the compounds represented by the formula (4) in which $R^{44}$ and $R^{45}$ are glycidyl groups include
{3-[di(glycidyl)amino]propyl}trimethoxysilane,
{3-[di(glycidyl)amino]propyl}triethoxysilane,
{3-[di(glycidyl)amino]propyl}methyldimethoxysilane,
{3-[di(glycidyl)amino]propyl}ethyldimethoxysilane,
{3-[di(glycidyl)amino]propyl}methyldiethoxysilane,
{3-[di(glycidyl)amino]propyl}ethyldiethoxysilane,
{3-[di(glycidyl)amino]propyl}dimethylmethoxysilane,
{3-[di(glycidyl)amino]propyl}diethylmethoxysilane,
{3-[di(glycidyl)amino]propyl}dimethylethoxysilane, and
{3-[di(glycidyl)amino]propyl}diethylethoxysilane.

Examples of the compounds represented by the formula (4) in which $R^{44}$ and $R^{45}$ are tetrahydrofurfuryl groups include
{3-[di(tetrahydrofurfuryl)amino]propyl}trimethoxysilane,
{3-[di(tetrahydrofurfuryl)amino]propyl}triethoxysilane,
{3-[di(tetrahydrofurfuryl)amino]propyl}-methyldimethoxysilane,
{3-[di(tetrahydrofurfuryl)amino]propyl}ethyldimethoxysilane,
{3-[di(tetrahydrofurfuryl)amino]propyl}methyldiethoxysilane,
{3-[di(tetrahydrofurfuryl)amino]propyl}ethyldiethoxysilane,
{3-[di(tetrahydrofurfuryl)amino]propyl}-dimethylmethoxysilane,
{3-[di(tetrahydrofurfuryl)amino]propyl}diethylmethoxysilane,
{3-[di(tetrahydrofurfuryl)amino]propyl}dimethylethoxysilane, and
{3-[di(tetrahydrofurfuryl)amino]propyl}diethylethoxysilane.

Examples of the compounds represented by the formula (4) in which $R^{44}$ and $R^{45}$ are joined together to form a group include
3-(1-piperidinyl)propyltrimethoxysilane,
3-(1-piperidinyl)propyltriethoxysilane,
3-(1-piperidinyl)propylmethyldimethoxysilane,
3-(1-piperidinyl)propylethyldimethoxysilane,
3-(1-piperidinyl)propylmethyldiethoxysilane,
3-(1-piperidinyl)propylethyldiethoxysilane,
3-(1-hexamethyleneimino)propyltrimethoxysilane,
3-(1-hexamethyleneimino)propyltriethoxysilane,
3-(1-hexamethyleneimino)propylmethyldimethoxysilane,
3-(1-hexamethyleneimino)propylethyldimethoxysilane,
3-(1-hexamethyleneimino)propylmethyldiethoxysilane,
3-(1-hexamethyleneimino)propylethyldiethoxysilane,
3-morpholinopropyltrimethoxysilane,
3-morpholinopropyltriethoxysilane,
3-morpholinopropylmethyldimethoxysilane,
3-morpholinopropylethyldimethoxysilane,
3-morpholinopropylmethyldiethoxysilane, and
3-morpholinopropylethylethoxysilane.

Examples of the compounds represented by the formula (4) in which $R^{44}$ and $R^{45}$ together form a single group bonded to the nitrogen atom via a double bond include N-(1,3-dimethylbutylidene)-3-(trimethoxysilyl)-1-propaneamine and N-(1,3-dimethylbutylidene)-3-(triethoxysilyl)-1-propaneamine.

The compound represented by the formula (4) is preferably a [3-(dialkylamino)propyl]trialkoxysilane, more preferably [3-(dimethylamino)propyl]trimethoxysilane, [3-(diethylamino)propyl]trimethoxysilane, [3-(dimethylamino)propyl]triethoxysilane, or [3-(diethylamino)propyl]triethoxysilane, and still more preferably [3-(diethylamino)propyl]trimethoxysilane.

For enhanced fuel economy, the content of the monomer unit derived from the compound represented by the formula (1) per 100% by mass of the conjugated diene polymer (A) is preferably 0.01% by mass or more, more preferably 0.02% by mass or more, and still more preferably 0.05% by mass or more. For enhanced economic efficiency and abrasion resistance, the content is preferably 20% by mass or less, more preferably 2% by mass or less, and still more preferably 1% by mass or less.

In the monomer unit derived from the compound represented by the formula (1), the groups represented by $X^1$, $X^2$, and $X^3$ may have been converted to hydroxy groups by hydrolysis or the like.

For enhanced fuel economy and abrasion resistance, the content of the monomer unit derived from the compound represented by the formula (2) per 100% by mass of the conjugated diene polymer (A) is preferably 0.01% by mass or more, more preferably 0.02% by mass or more, and still more preferably 0.05% by mass or more. For enhanced economic efficiency and abrasion resistance, the content is preferably 20% by mass or less, more preferably 2% by mass or less, and still more preferably 1% by mass or less.

For enhanced abrasion resistance, the conjugated diene polymer (A) according to the first aspect of the present invention may contain a constituent unit derived from a vinyl aromatic hydrocarbon (vinyl aromatic hydrocarbon unit). Examples of the vinyl aromatic hydrocarbons include styrene, α-methylstyrene, vinyltoluene, vinylnaphthalene, divinylbenzene, trivinylbenzene, and divinylnaphthalene, and preferably styrene.

The content of the vinyl aromatic hydrocarbon unit based on 100% by mass of a total of the conjugated diene unit and the vinyl aromatic hydrocarbon unit is 0% by mass or more (the content of the conjugated diene unit: 100% by mass or less), preferably 10% by mass or more (the content of the conjugated diene unit: 90% by mass or less), and more preferably 15% by mass or more (the content of the conjugated diene unit: 85% by mass or less). For enhanced fuel economy, the content of the vinyl aromatic hydrocarbon unit is preferably 50% by mass or less (the content of the conjugated diene unit: 50% by mass or more), and more preferably 45% by mass or less (the content of the conjugated diene unit: 55% by mass or more).

For enhanced abrasion resistance, the Mooney viscosity ($ML_{1+4}$) of the conjugated diene polymer (A) is preferably 10 or more, and more preferably 20 or more. For enhanced processability, the Mooney viscosity ($ML_{1+4}$) is preferably 200 or less, and more preferably 150 or less. The Mooney viscosity ($ML_{1+4}$) is measured at 100° C. in accordance with JIS K 6300 (1994).

For enhanced fuel economy, the vinyl bond content of the conjugated diene polymer (A) based on 100 mol % of the conjugated diene unit is preferably 70 mol % or less, and more preferably 60 mol % or less. For enhanced wet grip performance, the vinyl bond content of the conjugated diene polymer (A) is preferably 20 mol % or more, more preferably 40 mol % or more, and still more preferably 50 mol % or more. The vinyl bond content is determined from an absorption intensity at around 910 $cm^{-1}$, which is an absorption peak of a vinyl group, by infrared spectrometry.

For enhanced fuel economy, the conjugated diene polymer (A) preferably has a molecular weight distribution of 1 to 5, and more preferably 1 to 2. The molecular weight distribution is determined by measuring the number average molecular weight (Mn) and the weight average molecular weight (Mw) by gel permeation chromatography (GPC) and dividing Mw by Mn.

The conjugated diene polymer (A) may be suitably produced by a production process including the following steps A and B.

(Step A): a step of polymerizing a monomer component including a conjugated diene, a compound represented by the aforementioned formula (1), and a compound represented by the aforementioned formula (2) in the presence of an alkali metal catalyst in a hydrocarbon solvent to provide a polymer that has a polymer chain containing a monomer unit derived from the conjugated diene, a monomer unit derived from the compound represented by the formula (1), and a monomer unit derived from the compound represented by the formula (2) and has an alkali metal derived from the alkali metal catalyst at least at one end of the polymer chain.

(Step B): a step of reacting the polymer obtained in the step A with the aforementioned compound (G) or an alkoxysilane compound.

Examples of alkali metal catalysts that can be used in the step A include alkali metals, organic alkali metal compounds, complexes of alkali metals and polar compounds, and alkali metal-containing oligomers. Examples of the alkali metals include lithium, sodium, potassium, rubidium, and cesium. Examples of the organic alkali metal compounds include ethyllithium, n-propyllithium, iso-propyllithium, n-butyllithium, sec-butyllithium, t-octyllithium, n-decyllithium, phenyllithium, 2-naphthyllithium, 2-butylphenyllithium, 4-phenylbutyllithium, cyclohexyllithium, 4-cyclopentyllithium, dimethylaminopropyllithium, diethylaminopropyllithium, t-butyldimethylsilyloxypropyllithium, N-morpholinopropyllithium, lithium hexamethyleneimide, lithium pyrrolidide, lithium piperidide, lithium heptamethyleneimide, lithium dodecamethyleneimide, 1,4-dilithio-2-butene, sodium naphthalenide, sodium biphenylide, and potassium naphthalenide. Examples of the complexes of alkali metals and polar compounds include potassium-tetrahydrofuran complexes and potassium-diethoxyethane complexes. Examples of the alkali metal-containing oligomers include sodium salts of α-methylstyrene tetramers. Organic lithium compounds or organic sodium compounds are preferred, and C2-20 organic lithium compounds or C2-20 organic sodium compounds are more preferred.

The hydrocarbon solvent used in the step A is a solvent that does not deactivate an organic alkali metal compound catalyst, and examples thereof include aliphatic hydrocarbons, aromatic hydrocarbons, and alicyclic hydrocarbons.

Examples of the aliphatic hydrocarbons include propane, n-butane, iso-butane, n-pentane, iso-pentane, n-hexane, propene, 1-butene, iso-butene, trans-2-butene, cis-2-butene, 1-pentene, 2-pentene, 1-hexene, and 2-hexene. Examples of the aromatic hydrocarbons include benzene, toluene, xylene, and ethylbenzene. Examples of the alicyclic hydrocarbons include cyclopentane and cyclohexane. One or more kinds of these are used. The hydrocarbon solvent may be a mixture of different components, such as industrial hexane. C2-12 hydrocarbons are preferred.

In the step A, a monomer component including a conjugated diene, a compound represented by the formula (1), and a compound represented by the formula (2) is polymerized in the presence of an alkali metal catalyst in a hydrocarbon solvent to produce a polymer including a monomer unit derived from the conjugated diene, a monomer unit derived from the compound represented by the formula (1), and a monomer unit derived from the compound represented by the formula (2). Examples of the conjugated dienes include 1,3-butadiene, isoprene, 1,3-pentadiene, 2,3-dimethyl-1,3-butadiene, and 1,3-hexadiene. One or more kinds of these are used. The conjugated diene is preferably 1,3-butadiene or isoprene.

For enhanced fuel economy, the amount of the compound represented by the formula (1) based on 100% by mass of the total monomer component used in the polymerization is preferably 0.01% by mass or more, more preferably 0.02% by mass or more, and still more preferably 0.05% by mass or more. For enhanced economic efficiency and abrasion resistance, the amount is preferably 20% by mass or less, more preferably 2% by mass or less, still more preferably 1% by mass or less, and particularly preferably 0.5% by mass or less.

For enhanced fuel economy and abrasion resistance, the amount of the compound represented by the formula (2) based on 100% by mass of the total monomer component used in the polymerization is preferably 0.01% by mass or more, more preferably 0.02% by mass or more, and still more preferably 0.05% by mass or more. For enhanced economic efficiency and abrasion resistance, the amount is preferably 20% by mass or less, more preferably 2% by mass or less, still more preferably 1% by mass or less, and particularly preferably 0.5% by mass or less.

For enhanced abrasion resistance, the combined amount of the conjugated diene, the compound represented by the formula (1), the compound represented by the formula (2), and a vinyl aromatic hydrocarbon used in the polymerization reaction is preferably 99.9% by mass or more, more preferably 99.95% by mass or more, and still more preferably 100% by mass, based on 100% by mass of the total monomer component used in the polymerization.

In the step A, polymerization may be performed by combining a vinyl aromatic hydrocarbon with the conjugated diene, the compound represented by the formula (1), and the compound represented by the formula (2). Examples of the vinyl aromatic hydrocarbons include styrene, α-methylstyrene, vinyltoluene, vinylnaphthalene, divinylbenzene, trivinylbenzene, and divinylnaphthalene. Preferred is styrene.

In the case of using a vinyl aromatic hydrocarbon, for enhanced strength, the amount of the vinyl aromatic hydrocarbon based on 100% by mass in total of the conjugated diene and the vinyl aromatic hydrocarbon is preferably 10% by mass or more (the amount of the conjugated diene: 90% by mass or less), and more preferably 15% by mass or more (the amount of the conjugated diene: 85% by mass or less). For enhanced fuel economy, the amount of the vinyl aromatic hydrocarbon is preferably 50% by mass or less (the amount of the conjugated diene: 50% by mass or more), and more preferably 45% by mass or less (the amount of the conjugated diene: 55% by mass or more).

For enhanced strength, the combined amount of the conjugated diene, the compound represented by the formula (1), the compound represented by the formula (2), and the vinyl aromatic hydrocarbon used in the polymerization reaction is preferably 99.9% by mass or more, more preferably 99.95% by mass or more, and still more preferably 100% by mass, based on 100% by mass of total monomer.

The polymerization reaction may be performed in the presence of an agent for controlling the vinyl bond content of the conjugated diene unit, and an agent for controlling the distribution of the conjugated diene unit and monomer units derived from monomers other than the conjugated diene in the conjugated diene polymer chain (hereinafter, referred to collectively as "controlling agents"). Examples of the agents include ether compounds, tertiary amines, and phosphine compounds. Examples of the ether compounds include cyclic ethers, such as tetrahydrofuran, tetrahydropyran, or 1,4-dioxane; aliphatic monoethers, such as diethyl ether or dibutyl ether; aliphatic diethers, such as ethylene glycol dimethyl ether, ethylene glycol diethyl ether, ethylene glycol dibutyl ether, diethylene glycol diethyl ether, or diethylene glycol dibutyl ether; and aromatic ethers, such as diphenyl ether or anisole. Examples of the tertiary amines include triethylamine, tripropylamine, tributylamine, N,N,N',N'-tetramethylethylenediamine, N,N-diethylaniline, pyridine, and quinoline. Examples of the phosphine compounds include trimethylphosphine, triethylphosphine, and triphenylphosphine. One or more kinds of these may be used.

The polymerization temperature in the step A is usually 25 to 100° C., and preferably 35 to 90° C.

The polymerization temperature is more preferably 50 to 80° C. The polymerization time is usually 10 minutes to 5 hours.

The step A may be a multistage step. For example, the step A may include the following steps a1, a2, and a3:

(Step a1): a step of polymerizing a conjugated diene, a compound represented by the formula (1), and a vinyl aromatic hydrocarbon in the presence of an alkali metal catalyst in a hydrocarbon solvent to provide a conjugated diene polymer having an alkali metal derived from the catalyst at a polymer chain end;

(Step a2): a step of adding a compound represented by the formula (2) to the hydrocarbon solution obtained in the step a1, and reacting the polymer chain end of the conjugated diene polymer obtained in the step a1 with the compound represented by the formula (2) to provide a conjugated diene polymer having at the polymer chain end a structure in which the alkali metal derived from the alkali metal catalyst is bonded to a monomer unit derived from the compound represented by the formula (2); and (Step a3): a step of adding a conjugated diene and a vinyl aromatic hydrocarbon to the hydrocarbon solution obtained in the step a2 to polymerize the conjugated diene and the vinyl aromatic hydrocarbon with the polymer chain end of the conjugated diene polymer obtained in the step a2.

In the step B, the amount of the compound (G) or alkoxysilane compound to be reacted with the polymer prepared in the step A is usually 0.1 to 3 mol, preferably 0.5 to 2 mol, and more preferably 0.7 to 1.5 mol per mol of the alkali metal derived from the organic alkali metal catalyst.

The conjugated diene polymer (B) according to the second aspect of the present invention includes a monomer unit derived from a conjugated diene, a monomer unit derived from a compound represented by the following formula (5), and a monomer unit derived from a compound represented by the following formula (6):

[Chem. 47]

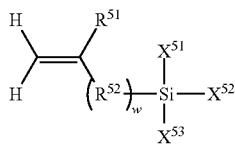

(5)

wherein $R^{51}$ represents a hydrogen atom or a hydrocarbyl group; w represents 0 or 1; $R^{52}$ represents a hydrocarbylene group; and $X^{51}$, $X^{52}$, and $X^{53}$ each independently represent a substituted amino group or an optionally substituted hydrocarbyl group, and at least one of $X^{51}$, $X^{52}$, and $X^{53}$ is a substituted amino group,

[Chem. 48]

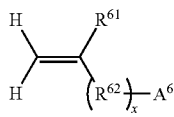

(6)

wherein $R^{61}$ represents a hydrogen atom or a hydrocarbyl group; x represents 0 or 1; $R^{62}$ represents a hydrocarbylene group; and $A^6$ represents a substituted amino group or a nitrogen-containing heterocyclic group.

Herein, the hydrocarbyl group refers to a hydrocarbon residue. The hydrocarbylene group refers to a divalent hydrocarbon residue. The nitrogen-containing heterocyclic group refers to a group obtained by removing one hydrogen atom from a carbon atom on a heterocyclic ring of a compound having a nitrogen-containing heterocyclic ring, and the nitrogen-containing heterocyclic ring refers to a heterocyclic ring that contains a nitrogen atom as a hetero atom included in the ring.

Examples of the conjugated dienes include 1,3-butadiene, isoprene, 1,3-pentadiene, 2,3-dimethyl-1,3-butadiene, and 1,3-hexadiene, and one or more kinds of them are used. The conjugated diene is preferably 1,3-butadiene or isoprene.

$R^{51}$ in the formula (5) represents a hydrogen atom or a hydrocarbyl group.

Examples of the hydrocarbyl groups for $R^{51}$ include alkyl groups and alkenyl groups. Examples of the alkyl groups include a methyl group, an ethyl group, a n-propyl group, an isopropyl group, a n-butyl group, a sec-butyl group, and a tert-butyl group, and preferably a methyl group. Examples of the alkenyl groups include a vinyl group, an allyl group, a 1-propenyl group, and a 1-methylethenyl group, and preferably a vinyl group.

$R^{51}$ is preferably a hydrogen atom, a methyl group, or a vinyl group.

Examples of the hydrocarbylene groups for $R^{52}$ include alkylene groups, arylene groups, and groups in which an arylene group and an alkylene group are bonded.

Examples of the alkylene groups include a methylene group, an ethylene group, and a trimethylene group, and preferably a methylene group or an ethylene group.

Examples of the arylene groups include a phenylene group, a naphthylene group, and a biphenylene group, and preferably a phenylene group.

Examples of the groups in which an arylene group and an alkylene group are bonded include groups in which a phenylene group and an alkylene group are bonded, groups in which a naphthylene group and an alkylene group are bonded, and groups in which a biphenylene group and an alkylene group are bonded.

Preferably, the group in which an arylene group and an alkylene group are bonded is such that a carbon atom in the alkylene group is bonded to the silicon atom in the formula (5).

Examples of the groups in which a phenylene group and an alkylene group are bonded (phenylene-alkylene groups) include para-phenylene-alkylene groups (for example, groups represented by the following formula (5a)), meta-phenylene-alkylene groups (for example, groups represented by the following formula (5b)), and ortho-phenylene-alkylene groups (for example, groups represented by the following formula (5c)), depending on the position of a carbon atom on the benzene ring from which a hydrogen atom has been removed and the position of the phenylene group to which the alkylene group is bonded,

[Chem. 49]

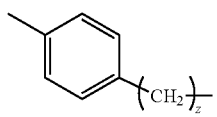

(5a)

-continued

[Chem. 50]

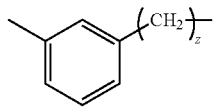

(5b)

[Chem. 51]

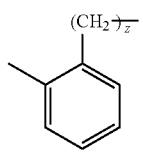

(5c)

wherein z represents an integer of 1 to 10.

The group in which an arylene group and an alkylene group are bonded is preferably a group in which a phenylene group and an alkylene group are bonded, more preferably a group represented by the formula (5a) or a group represented by the formula (5b), and still more preferably a para-phenylene-methylene group (a group represented by the formula (5a) with z=1), a meta-phenylene-methylene group (a group represented by the formula (5b) with z=1), a para-phenylene-ethylene group (a group represented by the formula (5a) with z=2), or a meta-phenylene-ethylene group (a group represented by the formula (5b) with z=2).

In the case where $R^{51}$ is a hydrogen atom or a methyl group and w is 1, $R^{52}$ is preferably a group in which an arylene group and an alkylene group are bonded or an arylene group, more preferably a group in which a phenylene group and an alkylene group are bonded or a phenylene group, and still more preferably a phenylene group.

In the case where $R^{51}$ is a vinyl group and w is 1, $R^{52}$ is preferably an alkylene group, and more preferably a methylene group or an ethylene group.

In the formula (5), preferably, $R^{51}$ is a hydrogen atom and w is 0.

Examples of the optionally substituted hydrocarbyl groups for $X^{51}$, $X^{52}$, and $X^{53}$ include hydrocarbyl groups optionally containing at least one selected from the group consisting of an oxygen atom, a nitrogen atom, and a silicon atom.

Examples of the hydrocarbyl groups for $X^{51}$, $X^{52}$, and $X^{53}$ include alkyl groups, alkenyl groups, alkynyl groups, aryl groups, and aralkyl groups. Examples of the alkyl groups include a methyl group, an ethyl group, a n-propyl group, an isopropyl group, a n-butyl group, a sec-butyl group, and a tert-butyl group. Examples of the alkenyl groups include a vinyl group, an allyl group, a 1-propenyl group, and a 1-methylethenyl group. Examples of the alkynyl groups include an ethynyl group and a propargyl group. Examples of the aryl groups include a phenyl group, a tolyl group, and a xylyl group. Examples of the aralkyl groups include a benzyl group. The hydrocarbyl group is preferably an alkyl group.

Examples of the hydrocarbyl groups containing an oxygen atom for $X^{51}$, $X^{52}$, and $X^{53}$ include alkoxyalkyl groups, such as a methoxymethyl group, a methoxyethyl group, an ethoxymethyl group, or an ethoxyethyl group.

Examples of the hydrocarbyl groups containing a nitrogen atom for $X^{51}$, $X^{52}$, and $X^{53}$ include dialkylaminoalkyl groups, such as a dimethylaminomethyl group, a dimethylaminoethyl group, a diethylaminomethyl group, or a diethylaminoethyl group.

Examples of the hydrocarbyl groups containing a silicon atom for $X^{51}$, $X^{52}$, and $X^{53}$ include trialkylsilylalkyl groups, such as a trimethylsilylmethyl group, a trimethylsilylethyl group, a triethylsilylmethyl group, or a triethylsilylethyl group.

The optionally substituted hydrocarbyl group for $X^{51}$, $X^{52}$, and $X^{53}$ preferably has 1 to 10 carbon atoms, and more preferably has 1 to 4 carbon atoms.

The optionally substituted hydrocarbyl group for $X^{51}$, $X^{52}$, and $X^{53}$ is preferably an alkyl group or an alkoxyalkyl group. The alkyl group is preferably a C1-4 alkyl group, and more preferably a methyl group or an ethyl group. The alkoxyalkyl group is preferably a C2-4 alkoxyalkyl group.

The substituted amino group for $X^{51}$, $X^{52}$, and $X^{53}$ is preferably a group represented by the following formula (5-X):

[Chem. 52]

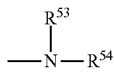

(5-X)

wherein $R^{53}$ and $R^{54}$ each represent a hydrocarbyl group or a trihydrocarbylsilyl group, or $R^{53}$ and $R^{54}$ are joined together to form a hydrocarbylene group optionally containing a nitrogen atom and/or an oxygen atom as a hetero atom, or $R^{53}$ and $R^{54}$ together form a single group bonded to the nitrogen atom via a double bond.

Examples of the hydrocarbyl groups for $R^{53}$ and $R^{54}$ include alkyl groups, alkenyl groups, alkynyl groups, aryl groups, and aralkyl groups. Examples of the alkyl groups include a methyl group, an ethyl group, a n-propyl group, an isopropyl group, a n-butyl group, a sec-butyl group, and a tert-butyl group. Examples of the alkenyl groups include a vinyl group, an allyl group, a 1-propenyl group, and a 1-methylethenyl group. Examples of the alkynyl groups include an ethynyl group and a propargyl group. Examples of the aryl groups include a phenyl group, a tolyl group, and a xylyl group. Examples of the aralkyl groups include a benzyl group.

The hydrocarbyl group for $R^{53}$ and $R^{54}$ preferably has 1 to 10 carbon atoms, more preferably has 1 to 4 carbon atoms, and still more preferably has 1 to 2 carbon atoms.

The hydrocarbyl group for $R^{53}$ and $R^{54}$ is preferably an alkyl group, and more preferably a linear alkyl group.

Examples of the trihydrocarbylsilyl groups for $R^{53}$ and $R^{54}$ include trialkylsilyl groups, such as a trimethylsilyl group, a triethylsilyl group, a triisopropylsilyl group, or a tert-butyldimethylsilyl group.

The trihydrocarbylsilyl group for $R^{53}$ and $R^{54}$ is preferably a C3-9 trialkylsilyl group, more preferably a trialkylsilyl group in which an alkyl group bonded to the silicon atom is a C1-3 alkyl group, and still more preferably a trimethylsilyl group.

Examples of the hydrocarbylene groups which are formed by joining $R^{53}$ and $R^{54}$ and optionally contain a nitrogen atom and/or an oxygen atom as a hetero atom include hydrocarbylene groups, hydrocarbylene groups containing a nitrogen atom, and hydrocarbylene groups containing an oxygen atom. Examples of the hydrocarbylene groups include alkylene groups, such as an ethylene group, a trimethylene group, a tetramethylene group, a pentamethylene group, or a hexamethylene group. Examples of the hydrocarbylene groups containing a nitrogen atom include a group represented by —$CH_2CH_2$—NH—$CH_2$—, a group represented by —$CH_2CH_2$—N=CH—, a group represented by —CH=CH—N=CH—, and a group represented by —$CH_2CH_2$—NH—$CH_2CH_2$—. Examples of the hydrocarbylene groups containing an oxygen atom include a group represented by —$CH_2CH_2$—O—$CH_2CH_2$—.

The hydrocarbylene group which is formed by joining $R^{53}$ and $R^{54}$ and optionally contains a nitrogen atom and/or an oxygen atom as a hetero atom preferably has 2 to 20 carbon atoms, more preferably has 2 to 7 carbon atoms, and still more preferably has 4 to 6 carbon atoms.

The hydrocarbylene group which is formed by joining $R^{53}$ and $R^{54}$ and optionally contains a nitrogen atom and/or an oxygen atom as a hetero atom is preferably a hydrocarbylene group, more preferably an alkylene group, and still more preferably a polymethylene group.

Examples of the single groups which are formed of $R^{53}$ and $R^{54}$ and bonded to the nitrogen atom via a double bond include hydrocarbylidene groups, such as an ethylidene group, a propylidene group, a butylidene group, a 1-methylethylidene group, a 1-methylpropylidene group, or a 1,3-dimethylbutylidene group.

The single group which is formed of $R^{53}$ and $R^{54}$ and bonded to the nitrogen atom via a double bond preferably has 2 to 20 carbon atoms, and more preferably has 2 to 6 carbon atoms.

Preferably, $R^{53}$ and $R^{54}$ are each an alkyl group or a trialkylsilyl group, or $R^{13}$ and $R^{14}$ are joined together to form an alkylene group; more preferably, $R^{53}$ and $R^{54}$ are each an alkyl group.

Examples of the groups represented by the formula (5-X) include non-cyclic amino groups and cyclic amino groups.

Examples of the non-cyclic amino groups include dialkylamino groups and bis(trialkylsilyl)amino groups. Examples of the dialkylamino groups include a dimethylamino group, a diethylamino group, a di(n-propyl)amino group, a di(isopropyl)amino group, a di(n-butyl)amino group, a di(sec-butyl)amino group, a di(tert-butyl)amino group, and an ethylmethylamino group. Examples of the bis(trialkylsilyl)amino groups include a bis(trimethylsilyl)amino group, and a bis(t-butyldimethylsilyl)amino group.

Other examples of the non-cyclic amino groups include an ethylideneamino group, a 1-methylpropylideneamino group, a 1,3-dimethylbutylideneamino group, a 1-methylethylideneamino group, and a 4-N,N-dimethylaminobenzylideneamino group.

Examples of the cyclic amino groups include 1-polymethyleneimino groups, such as a 1-aziridinyl group, a 1-azetidinyl group, a 1-pyrrolidinyl group, a 1-piperidinyl group, a 1-hexamethyleneimino group, a 1-heptamethyleneimino group, a 1-octamethyleneimino group, a 1-decamethyleneimino group, or a 1-dodecamethyleneimino group. Other examples thereof include a 1-pyrrolyl group, a 1-pyrazolidinyl group, a 1-imidazolidinyl group, a 1-pyrazolyl group, a 1-imidazolyl group, a 4,5-dihydro-1-imidazolyl group, a 1-piperazinyl group, and a morpholino group.

The group represented by the formula (5-X) is preferably a non-cyclic amino group, and more preferably a dialkylamino group. The dialkylamino group is preferably a dimethylamino group, a diethylamino group, a di(n-propyl)amino group, or a di(n-butyl)amino group, and more preferably a dimethylamino group or a diethylamino group.

In the formula (5), at least one of $X^{51}$, $X^{52}$, and $X^{53}$ is a substituted amino group; preferably, two or more, more preferably two of $X^{51}$, $X^{52}$, and $X^{53}$ are substituted amino groups.

Examples of the compounds represented by the formula (5) in which $R^{51}$ is a hydrogen atom, and one of $X^{51}$, $X^{52}$, and $X^{53}$ is a dialkylamino group include the following:
compounds in which w is 0:
(dimethylamino)dimethylvinylsilane,
(diethylamino)dimethylvinylsilane,
(di-n-propylamino)dimethylvinylsilane,
(di-n-butylamino)dimethylvinylsilane,
(dimethylamino)diethylvinylsilane,
(diethylamino)diethylvinylsilane,
(di-n-propylamino)diethylvinylsilane, and
(di-n-butylamino)diethylvinylsilane; and
compounds in which w is 1:
(dimethylamino)dimethyl-4-vinylphenylsilane,
(dimethylamino)dimethyl-3-vinylphenylsilane,
(diethylamino)dimethyl-4-vinylphenylsilane,
(diethylamino)dimethyl-3-vinylphenylsilane,
(di-n-propylamino)dimethyl-4-vinylphenylsilane,
(di-n-propylamino)dimethyl-3-vinylphenylsilane,
(di-n-butylamino)dimethyl-4-vinylphenylsilane,
(di-n-butylamino)dimethyl-3-vinylphenylsilane,
(dimethylamino)diethyl-4-vinylphenylsilane,
(dimethylamino)diethyl-3-vinylphenylsilane,
(diethylamino)diethyl-4-vinylphenylsilane,
(diethylamino)diethyl-3-vinylphenylsilane,
(di-n-propylamino)diethyl-4-vinylphenylsilane,
(di-n-propylamino)diethyl-3-vinylphenylsilane,
(di-n-butylamino)diethyl-4-vinylphenylsilane, and
(di-n-butylamino)diethyl-3-vinylphenylsilane.

Examples of the compounds represented by the formula (5) in which $R^{51}$ is a hydrogen atom, and two of $X^{51}$, $X^{52}$, and $X^{53}$ are dialkylamino groups include the following:
compounds in which w is 0:
bis(dimethylamino)methylvinylsilane,
bis(diethylamino)methylvinylsilane,
bis(di-n-propylamino)methylvinylsilane,
bis(di-n-butylamino)methylvinylsilane,
bis(dimethylamino)ethylvinylsilane,
bis(diethylamino)ethylvinylsilane,
bis(di-n-propylamino)ethylvinylsilane, and
bis(di-n-butylamino)ethylvinylsilane; and
compounds in which w is 1:
bis(dimethylamino)methyl-4-vinylphenylsilane,
bis(dimethylamino)methyl-3-vinylphenylsilane,
bis(diethylamino)methyl-4-vinylphenylsilane,
bis(diethylamino)methyl-3-vinylphenylsilane,
bis(di-n-propylamino)methyl-4-vinylphenylsilane,
bis(di-n-propylamino)methyl-3-vinylphenylsilane,
bis(di-n-butylamino)methyl-4-vinylphenylsilane,
bis(di-n-butylamino)methyl-3-vinylphenylsilane,
bis(dimethylamino)ethyl-4-vinylphenylsilane,
bis(dimethylamino)ethyl-3-vinylphenylsilane,
bis(diethylamino)ethyl-4-vinylphenylsilane,
bis(diethylamino)ethyl-3-vinylphenylsilane,
bis(di-n-propylamino)ethyl-4-vinylphenylsilane,
bis(di-n-propylamino)ethyl-3-vinylphenylsilane,
bis(di-n-butylamino)ethyl-4-vinylphenylsilane, and
bis(di-n-butylamino)ethyl-3-vinylphenylsilane.

Examples of the compounds represented by the formula (5) in which $R^{51}$ is a methyl group, and two of $X^{51}$, $X^{52}$, and $X^{53}$ are dialkylamino groups include the following:
compounds in which w is 1:
bis(dimethylamino)methyl-4-isopropenylphenylsilane,
bis(dimethylamino)methyl-3-isopropenylphenylsilane,
bis(diethylamino)methyl-4-isopropenylphenylsilane,
bis(diethylamino)methyl-3-isopropenylphenylsilane,
bis(di-n-propylamino)methyl-4-isopropenylphenylsilane,
bis(di-n-propylamino)methyl-3-isopropenylphenylsilane,
bis(di-n-butylamino)methyl-4-isopropenylphenylsilane,
bis(di-n-butylamino)methyl-3-isopropenylphenylsilane,
bis(dimethylamino)ethyl-4-isopropenylphenylsilane,
bis(dimethylamino)ethyl-3-isopropenylphenylsilane,
bis(diethylamino)ethyl-4-isopropenylphenylsilane,
bis(diethylamino)ethyl-3-isopropenylphenylsilane,
bis(di-n-propylamino)ethyl-4-isopropenylphenylsilane,
bis(di-n-propylamino)ethyl-3-isopropenylphenylsilane,
bis(di-n-butylamino)ethyl-4-isopropenylphenylsilane, and
bis(di-n-butylamino)ethyl-3-isopropenylphenylsilane.

Examples of the compounds represented by the formula (5) in which $R^{51}$ is a vinyl group, and two of $X^{51}$, $X^{52}$, and $X^{53}$ are dialkylamino groups include the following:
compounds in which w is 0:
bis(dimethylamino)methyl(1-methylene-2-propenyl)silane,
bis(diethylamino)methyl(1-methylene-2-propenyl)silane,
bis(di-n-propylamino)methyl(1-methylene-2-propenyl)silane,
bis(di-n-butylamino)methyl(1-methylene-2-propenyl)silane,
bis(dimethylamino)ethyl(1-methylene-2-propenyl)silane,
bis(diethylamino)ethyl(1-methylene-2-propenyl)silane,
bis(di-n-propylamino)ethyl(1-methylene-2-propenyl)silane, and
bis(di-n-butylamino)ethyl(1-methylene-2-propenyl)silane.

Examples of the compounds represented by the formula (5) in which $R^{51}$ is a hydrogen atom, and the three $X^{51}$, $X^{52}$, and $X^{53}$ are dialkylamino groups include the following:
compounds in which w is 0:
tris(dimethylamino)vinylsilane,
tris(diethylamino)vinylsilane,
tris(di-n-propylamino)vinylsilane, and
tris(di-n-butylamino)vinylsilane; and
compounds in which w is 1:
tris(dimethylamino)-4-vinylphenylsilane,
tris(dimethylamino)-3-vinylphenylsilane,
tris(diethylamino)-4-vinylphenylsilane,
tris(diethylamino)-3-vinylphenylsilane,
tris(di-n-propylamino)-4-vinylphenylsilane,
tris(di-n-propylamino)-3-vinylphenylsilane,
tris(di-n-butylamino)-4-vinylphenylsilane, and
tris(di-n-butylamino)-3-vinylphenylsilane.

Examples of the compounds represented by the formula (5) in which $R^{51}$ is a methyl group, and the three $X^{51}$, $X^{52}$, and $X^{53}$ are dialkylamino groups include the following:
compounds in which w is 1:
tris(dimethylamino)-4-isopropenylphenylsilane,
tris(dimethylamino)-3-isopropenylphenylsilane,
tris(diethylamino)-4-isopropenylphenylsilane,
tris(diethylamino)-3-isopropenylphenylsilane,
tris(di-n-propylamino)-4-isopropenylphenylsilane,
tris(di-n-propylamino)-3-isopropenylphenylsilane,
tris(di-n-butylamino)-4-isopropenylphenylsilane, and
tris(di-n-butylamino)-3-isopropenylphenylsilane.

Examples of the compounds represented by the formula (5) in which $R^{51}$ is a vinyl group, and the three $X^{51}$, $X^{52}$, and $X^{53}$ are dialkylamino groups include the following:
compounds in which w is 0:
tris(dimethylamino)(1-methylene-2-propenyl)silane,
tris(diethylamino)(1-methylene-2-propenyl)silane,
tris(di-n-propylamino)(1-methylene-2-propenyl)silane, and
tris(di-n-butylamino)(1-methylene-2-propenyl)silane.

The compound represented by the formula (5) is preferably a compound in which two of $X^{51}$, $X^{52}$, and $X^{53}$ are dialkylamino groups, more preferably a compound in which $R^{51}$ is a hydrogen atom and w is 0, still more preferably a compound in which the remaining one of $X^{51}$, $X^{52}$, and $X^{53}$ is an alkyl group or an alkoxyalkyl group, and particularly preferably
bis(dimethylamino)methylvinylsilane,
bis(diethylamino)methylvinylsilane,
bis(di-n-propylamino)methylvinylsilane,
bis(di-n-butylamino)methylvinylsilane,
bis(dimethylamino)ethylvinylsilane,
bis(diethylamino)ethylvinylsilane,
bis(di-n-propylamino)ethylvinylsilane, or
bis(di-n-butylamino)ethylvinylsilane.

$R^{61}$ in the formula (6) represents a hydrogen atom or a hydrocarbyl group.

Examples of the hydrocarbyl groups for $R^{61}$ include alkyl groups and alkenyl groups.

Examples of the alkyl groups include a methyl group, an ethyl group, a n-propyl group, an isopropyl group, a n-butyl group, a sec-butyl group, and a tert-butyl group, and preferably a methyl group. Examples of the alkenyl groups include a vinyl group, an allyl group, a 1-propenyl group, and a 1-methylethenyl group, and preferably a vinyl group.

$R^{61}$ is preferably a hydrogen atom, a methyl group, or a vinyl group.

Examples of the hydrocarbylene groups for $R^{62}$ include alkylene groups, arylene groups, and groups in which an arylene group and an alkylene group are bonded.

Examples of the alkylene groups include a methylene group, an ethylene group, and a trimethylene group, and preferably a methylene group or an ethylene group.

Examples of the arylene groups include a phenylene group, a naphthylene group, and a biphenylene group, and preferably a phenylene group.

Examples of the groups in which an arylene group and an alkylene group are bonded include groups in which a phenylene group and an alkylene group are bonded, groups in which a naphthylene group and an alkylene group are bonded, and groups in which a biphenylene group and an alkylene group are bonded, and preferably groups in which a phenylene group and an alkylene group are bonded.

Preferably, the group in which an arylene group and an alkylene group are bonded is such that a carbon atom in the arylene group is bonded to the carbon atom to which $R^{61}$ in the formula (6) is bonded.

Examples of the groups in which a phenylene group and an alkylene group are bonded (phenylene-alkylene groups) include para-phenylene-alkylene groups (for example, groups represented by the following formula (6a)), meta-phenylene-alkylene groups (for example, groups represented by the following formula (6b)), and ortho-phenylene-alkylene groups (for example, groups represented by the following formula (6c)), depending on the position of a carbon atom on the benzene ring from which a hydrogen atom has been removed and the position of the phenylene group to which the alkylene group is bonded,

[Chem. 53]

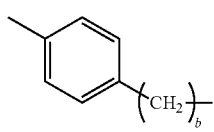

(6a)

[Chem. 54]

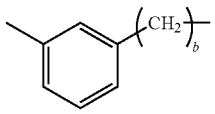

(6b)

[Chem. 55]

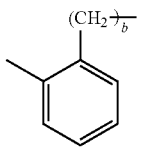

(6c)

wherein b represents an integer of 1 to 10.

The group in which an arylene group and an alkylene group are bonded is preferably a group in which a phenylene group and an alkylene group are bonded, more preferably a group represented by the formula (6a) or a group represented by the formula (6b), and still more preferably a para-phenylene-methylene group (a group represented by the formula (6a) with b=1), a meta-phenylene-methylene group (a group represented by the formula (6b) with b=1), a para-phenylene-ethylene group (a group represented by the formula (6a) with b=2), or a meta-phenylene-ethylene group (a group represented by the formula (6b) with b=2).

In the case where $R^{61}$ is a hydrogen atom or a methyl group and x is 1, $R^{62}$ is preferably a group in which an arylene group and an alkylene group are bonded or an arylene group, more preferably a group in which a phenylene group and an alkylene group are bonded or a phenylene group, and still more preferably a group represented by the following formula (6-Y), and particularly preferably a group represented by the following formula (6-Ya) or a group represented by the following formula (6-Yb). In the formula, y represents 0 to 5, and is preferably 0 to 2,

[Chem. 56]

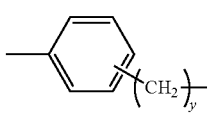

(6-Y)

wherein y represents an integer of 0 to 5; and when y is an integer of 1 to 5, $(CH_2)_y$ represents a substituent on the benzene ring and is bonded to $A^6$, and when y is 0, $(CH_2)_y$ represents a bond between the benzene ring and $A^6$,

[Chem. 57]

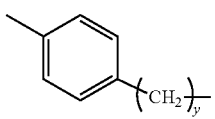

(6-Ya)

[Chem. 58]

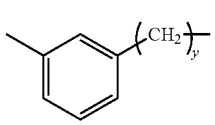

(6-Yb)

wherein y represents an integer of 0 to 5; and when y is an integer of 1 to 5, $(CH_2)_y$ is bonded to $A^6$, and when y is 0, $(CH_2)_y$ represents a bond between the benzene ring and $A^6$.

In the case where $R^{61}$ is a vinyl group and x is 1, $R^{62}$ is preferably an alkylene group, and more preferably a methylene group or an ethylene group.

$A^6$ represents a substituted amino group or a nitrogen-containing heterocyclic group.

The substituted amino group for $A^6$ is preferably a group represented by the following formula (6-X):

[Chem. 59]

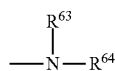

(6-X)

wherein $R^{63}$ and $R^{64}$ each represent a hydrocarbyl group or a trihydrocarbylsilyl group, or $R^{63}$ and $R^{64}$ are joined together to form a hydrocarbylene group optionally containing a nitrogen atom and/or an oxygen atom as a hetero atom, or $R^{63}$ and $R^{64}$ together form a single group bonded to the nitrogen atom via a double bond.

Examples of the hydrocarbyl groups for $R^{63}$ and $R^{64}$ include alkyl groups, alkenyl groups, alkynyl groups, aryl groups, and aralkyl groups. Examples of the alkyl groups include a methyl group, an ethyl group, a n-propyl group, an isopropyl group, a n-butyl group, a sec-butyl group, and a tert-butyl group. Examples of the alkenyl groups include a vinyl group, an allyl group, a 1-propenyl group, and a 1-methylethenyl group. Examples of the alkynyl groups include an ethynyl group and a propargyl group. Examples of the aryl groups include a phenyl group, a tolyl group, and a xylyl group. Examples of the aralkyl groups include a benzyl group.

The hydrocarbyl group for $R^{63}$ and $R^{64}$ preferably has 1 to 10 carbon atoms, more preferably has 1 to 4 carbon atoms, and still more preferably has 1 to 2 carbon atoms.

The hydrocarbyl group for $R^{63}$ and $R^{64}$ is preferably an alkyl group or an alkenyl group, more preferably an alkyl group, and still more preferably a linear alkyl group.

Examples of the trihydrocarbylsilyl groups for $R^{63}$ and $R^{64}$ include trialkylsilyl groups, such as a trimethylsilyl group, a triethylsilyl group, a triisopropylsilyl group, or a tert-butyldimethylsilyl group.

The trihydrocarbylsilyl group for $R^{63}$ and $R^{64}$ is preferably a C3-9 trialkylsilyl group, more preferably a trialkylsilyl group in which an alkyl group bonded to the silicon atom is a C1-4 alkyl group, and still more preferably a trimethylsilyl group.

Examples of the hydrocarbylene groups which are formed by joining $R^{63}$ and $R^{64}$ and optionally contain a nitrogen atom and/or an oxygen atom as a hetero atom include hydrocarbylene groups, hydrocarbylene groups containing a nitrogen atom, and hydrocarbylene groups containing an oxygen atom. Examples of the hydrocarbylene groups include alkylene groups, such as an ethylene group, a trimethylene group, a tetramethylene group, a pentamethylene group, or a hexamethylene group. Examples of the hydrocarbylene groups containing a nitrogen atom include a group represented by —$CH_2CH_2$—NH—$CH_2$—, a group represented by —$CH_2CH_2$—N=CH—, a group represented by —CH=CH—N=CH—, and a group represented by —$CH_2CH_2$—NH—$CH_2CH_2$—. Examples of the hydrocarbylene groups containing an oxygen atom include a group represented by —$CH_2CH_2$—O—$CH_2CH_2$—.

The hydrocarbylene group which is formed by joining $R^{63}$ and $R^{64}$ and optionally contains a nitrogen atom and/or an oxygen atom as a hetero atom preferably has 2 to 20 carbon atoms, more preferably has 2 to 7 carbon atoms, and still more preferably has 4 to 6 carbon atoms.

The hydrocarbylene group which is formed by joining $R^{63}$ and $R^{64}$ and optionally contains a nitrogen atom and/or an oxygen atom as a hetero atom is preferably a hydrocarbylene group, more preferably an alkylene group, and still more preferably a polymethylene group.

Examples of the single groups which are formed of $R^{63}$ and $R^{64}$ and bonded to the nitrogen atom via a double bond include hydrocarbylidene groups, such as an ethylidene group, a propylidene group, a butylidene group, a 1-methylethylidene group, a 1-methylpropylidene group, or a 1,3-dimethylbutylidene group.

The single group which is formed of $R^{63}$ and $R^{64}$ and bonded to the nitrogen atom via a double bond preferably has 2 to 20 carbon atoms, and more preferably has 2 to 6 carbon atoms.

Preferably, $R^{63}$ and $R^{64}$ are each a hydrocarbyl group or a trihydrocarbylsilyl group, or $R^{63}$ and $R^{64}$ are joined together to form a hydrocarbylene group.

Examples of the groups represented by the formula (6-X) include non-cyclic amino groups and cyclic amino groups.

Examples of the non-cyclic amino groups include dialkylamino groups and bis(trialkylsilyl)amino groups. Examples of the dialkylamino groups include a dimethylamino group, a diethylamino group, a di(n-propyl)amino group, a di(isopropyl)amino group, a di(n-butyl)amino group, a di(sec-butyl)amino group, a di(tert-butyl)amino group, and an ethylmethylamino group. Examples of the bis(trialkylsilyl)amino groups include a bis(trimethylsilyl)amino group and a bis(tert-butyldimethylsilyl)amino group.

Other examples of the non-cyclic amino groups include an ethylideneamino group, a 1-methylpropylideneamino group, a 1,3-dimethylbutylideneamino group, a 1-methylethylideneamino group, and a 4-N,N-dimethylaminobenzylideneamino group.

Examples of the cyclic amino groups include a 1-aziridinyl group, a 1-azetidinyl group, a 1-pyrrolidinyl group, a 1-piperidinyl group, a 1-hexamethyleneimino group, a 1-imidazolyl group, a 4,5-dihydro-1-imidazolyl group, a 1-pyrrolyl group, a 1-pyrazolyl group, a 1-imidazolidinyl group, a 1-piperazinyl group, and a morpholino group.

The group represented by the formula (6-X) is preferably a group in which $R^{63}$ and $R^{64}$ are hydrocarbyl groups, a group in which $R^{63}$ and $R^{64}$ are trihydrocarbylsilyl groups, or a group in which $R^{63}$ and $R^{64}$ are joined together to form a hydrocarbylene group. The group represented by the formula (6-X) is more preferably a group in which $R^{63}$ and $R^{64}$ are linear alkyl groups, a group in which $R^{23}$ and $R^{24}$ are trialkylsilyl groups, or a group in which $R^{63}$ and $R^{64}$ are joined together to form a polymethylene group.

The group represented by the formula (6-X) is more preferably a dimethylamino group, a diethylamino group, a di(n-propyl)amino group, a di(n-butyl)amino group, a bis(trimethylsilyl)amino group, a bis(tert-butyldimethylsilyl)amino group, a 1-pyrrolidinyl group, a 1-piperidinyl group, or a 1-hexamethyleneimino group, and particularly preferably a 1-pyrrolidinyl group.

Examples of the nitrogen-containing heterocyclic groups for $A^6$ include nitrogen-containing aliphatic heterocyclic groups and nitrogen-containing aromatic heterocyclic groups. Herein, the nitrogen-containing aliphatic heterocyclic group refers to a group obtained by removing one hydrogen atom from a carbon atom on a heterocyclic ring of a compound having a nitrogen-containing aliphatic heterocyclic ring, and the nitrogen-containing aliphatic heterocyclic ring refers to an aliphatic heterocyclic ring containing a nitrogen atom as a hetero atom included in the ring. The nitrogen-containing aromatic heterocyclic group refers to a group obtained by removing one hydrogen atom from a carbon atom on a heterocyclic ring of a compound having a nitrogen-containing aromatic heterocyclic ring, and the nitrogen-containing aromatic heterocyclic ring refers to an aromatic heterocyclic ring containing a nitrogen atom as a hetero atom included in the ring.

Examples of the nitrogen-containing aliphatic heterocyclic groups for $A^6$ include groups only containing a nitrogen atom as a hetero atom included in the ring, groups containing a nitrogen atom and an oxygen atom as hetero atoms included in the ring, and groups containing a nitrogen atom and a sulfur atom as hetero atoms included in the ring.

Examples of the nitrogen-containing aliphatic heterocyclic groups only containing a nitrogen atom as a hetero atom included in the ring include groups containing an aziridine ring, groups containing an azetidine ring, groups containing a pyrrolidine ring, groups containing a piperidine ring, groups containing a hexamethyleneimine ring, groups containing an imidazolidine ring, groups containing a piperazine ring, and groups containing a pyrazolidine ring.

Examples of the groups containing an aziridine ring include N-alkyl-2-aziridinyl groups.

Examples of the groups containing an azetidine ring include N-alkyl-2-azetidinyl groups and N-alkyl-3-azetidinyl groups.

Examples of the groups containing a pyrrolidine ring include N-alkyl-2-pyrrolidinyl groups and N-alkyl-3-pyrrolidinyl groups.

Examples of the groups containing a piperidine ring include N-alkyl-2-piperidinyl groups, N-alkyl-3-piperidinyl groups, and N-alkyl-4-piperidinyl groups.

Examples of the groups containing a hexamethyleneimine ring include N-alkyl-2-hexamethyleneimino groups, N-alkyl-3-hexamethyleneimino groups, and N-alkyl-4-hexamethyleneimino groups.

Examples of the groups containing an imidazolidine ring include 1,3-dialkyl-2-imidazolidyl groups and 1,3-dialkyl-4-imidazolidyl groups.

Examples of the groups containing a piperazine ring include 1,4-dialkyl-2-piperazinyl groups.

Examples of the groups containing a pyrazolidine ring include 1,2-dialkyl-3-pyrazolidyl groups and 1,2-dialkyl-4-pyrazolidyl groups.

Examples of the nitrogen-containing aliphatic heterocyclic groups containing a nitrogen atom and an oxygen atom as hetero atoms included in the ring include groups containing a morpholine ring and groups containing an isooxazolidine ring.

Examples of the groups containing a morpholine ring include N-alkyl-2-morpholino groups and N-alkyl-3-morpholino groups.

Examples of the groups containing an isooxazolidine ring include N-alkyl-3-isooxazolidinyl groups, N-alkyl-4-isooxazolidinyl groups, and N-alkyl-5-isooxazolidinyl groups.

Examples of the nitrogen-containing aliphatic heterocyclic groups containing a nitrogen atom and a sulfur atom as hetero atoms included in the ring include groups containing a thiomorpholine ring and groups containing an isothiazolidine ring.

Examples of the groups containing a thiomorpholine ring include N-alkyl-2-thiomorpholino groups and N-alkyl-3-thiomorpholino groups.

Examples of the groups containing an isothiazolidine ring include N-alkyl-3-isothiazolidinyl groups, N-alkyl-4-isothiazolidinyl groups, and N-alkyl-5-isothiazolidinyl groups.

The nitrogen-containing aliphatic heterocyclic group for $A^6$ is preferably a group only containing a nitrogen atom as a hetero atom included in the ring. The nitrogen-containing aliphatic heterocyclic group preferably has 4 to 10 carbon atoms.

Examples of the nitrogen-containing aromatic heterocyclic groups for $A^6$ include groups only containing a nitrogen atom as a hetero atom included in the ring, groups containing a nitrogen atom and an oxygen atom as hetero atoms included in the ring, and groups containing a nitrogen atom and a sulfur atom as hetero atoms included in the ring.

Examples of the nitrogen-containing aromatic heterocyclic groups only containing a nitrogen atom as a hetero atom included in the ring include groups containing a pyrrole ring, groups containing an imidazole ring, groups containing a pyrazole ring, groups containing a pyridine ring, groups containing a pyridazine ring, groups containing a pyrimidine ring, groups containing a pyrazine ring, groups containing a quinoline ring, groups containing an isoquinoline ring, groups containing a cinnoline ring, groups containing a quinazoline ring, and groups containing a phthalazine ring.

Examples of the groups containing a pyrrole ring include a 2-pyrrolyl group, a 3-pyrrolyl group, a 2-(N-methylpyrrolyl) group, and a 3-(N-methylpyrrolyl) group.

Examples of the groups containing an imidazole ring include a 2-imidazolyl group, a 4-imidazolyl group, a 5-imidazolyl group, a 2-(N-methylimidazolyl) group, a 4-(N-methylimidazolyl) group, and a 5-(N-methylimidazolyl) group.

Examples of the groups containing a pyrazole ring include a 3-pyrazolyl group, a 4-pyrazolyl group, a 5-pyrazolyl group, a 3-(N-methylpyrazolyl) group, a 4-(N-methylpyrazolyl) group, and a 5-(N-methylpyrazolyl) group.

Examples of the groups containing a pyridine ring include a 2-pyridyl group, a 3-pyridyl group, and a 4-pyridyl group.

Examples of the groups containing a pyridazine ring include a 3-pyridazyl group and a 4-pyridazyl group.

Examples of the groups containing a pyrimidine ring include a 2-pyrimidyl group, a 4-pyrimidyl group, and a 5-pyrimidyl group.

Examples of the groups containing a pyrazine ring include a 2-pyrazyl group.

Examples of the groups containing a quinoline ring include a 2-quinolyl group, a 3-quinolyl group, a 4-quinolyl group, a 5-quinolyl group, a 6-quinolyl group, a 7-quinolyl group, and an 8-quinolyl group.

Examples of the groups containing an isoquinoline ring include a 1-isoquinolyl group, a 3-isoquinolyl group, a 4-isoquinolyl group, a 5-isoquinolyl group, a 6-isoquinolyl group, a 7-isoquinolyl group, and an 8-isoquinolyl group.

Examples of the groups containing a cinnoline ring include a 3-cinnolinyl group, a 4-cinnolinyl group, a 5-cinnolinyl group, a 6-cinnolinyl group, a 7-cinnolinyl group, and an 8-cinnolinyl group Examples of the groups containing a quinazoline ring include a 2-quinazolinyl group, a 4-quinazolinyl group, a 5-quinazolinyl group, a 6-quinazolinyl group, a 7-quinazolinyl group, and an 8-quinazolinyl group.

Examples of the groups containing a phthalazine ring include a 1-phthalazinyl group, a 5-phthalazinyl group, and a 6-phthalazinyl group.

The nitrogen-containing aromatic heterocyclic group only containing a nitrogen atom as a hetero atom included in the ring is preferably a group containing an imidazole ring, a group containing a pyridine ring, or a group containing a quinoline ring.

Examples of the nitrogen-containing aromatic heterocyclic groups containing a nitrogen atom and an oxygen atom as hetero atoms included in the ring include groups containing an oxazole ring and groups containing an isooxazole ring.

Examples of the groups containing an oxazole ring include a 2-oxazolyl group, a 4-oxazolyl group, and a 5-oxazolyl group.

Examples of the groups containing an isooxazole ring include a 3-isooxazolyl group, a 4-isooxazolyl group, and a 5-isooxazolyl group.

The nitrogen-containing aromatic heterocyclic group containing a nitrogen atom and an oxygen atom as hetero atoms included in the ring is preferably a group containing an oxazole ring.

Examples of the nitrogen-containing aromatic heterocyclic groups containing a nitrogen atom and a sulfur atom as hetero atoms included in the ring include groups containing a thiazole ring and groups containing an isothiazole ring.

Examples of the groups containing a thiazole ring include a 2-thiazolyl group, a 4-thiazolyl group, and a 5-thiazolyl group.

Examples of the groups containing an isothiazole ring include a 3-isothiazolyl group, a 4-isothiazolyl group, and a 5-isothiazolyl group.

The nitrogen-containing aromatic heterocyclic group containing a nitrogen atom and a sulfur atom as hetero atoms included in the ring is preferably a group containing a thiazole ring.

The nitrogen-containing heterocyclic group for $A^6$ is preferably a nitrogen-containing aromatic heterocyclic group, more preferably a nitrogen-containing aromatic heterocyclic group only containing a nitrogen atom as a hetero atom included in the ring, still more preferably a group containing an imidazole ring, a group containing a pyridine ring, or a group containing a quinoline ring, and particularly preferably a group containing a pyridine ring.

Examples of the compounds represented by the formula (6) in which $R^{61}$ is a hydrogen atom, x is 0, and $A^6$ is a substituted amino group include the following:
1-vinylpyrrolidine,
1-vinylpiperidine,
1-vinylhexamethyleneimine,
1-vinylpiperazine,
1-vinylpyrrole,
1-vinylimidazole,
1-vinylpyrazole, and
vinylquinoline.

Examples of the compounds represented by the formula (6) in which $R^{61}$ is a hydrogen atom, x is 1, $R^{62}$ is a group represented by the formula (6-Y), and $A^6$ is a substituted amino group include the following:
compounds in which y in the formula (6-Y) is 0:
4-N,N-dimethylaminostyrene,
3-N,N-dimethylaminostyrene,
4-N,N-diethylaminostyrene,
3-N,N-diethylaminostyrene,
4-N,N-di-n-propylaminostyrene,
3-N,N-di-n-propylaminostyrene,
4-N,N-di-n-butylaminostyrene,
3-N,N-di-n-butylaminostyrene,
4-N,N-diallylaminostyrene,
3-N,N-diallylaminostyrene,
4-N,N-bis(trimethylsilyl)aminostyrene,
3-N,N-bis(trimethylsilyl)aminostyrene,
4-N,N-bis(tert-butyldimethylsilyl)aminostyrene,
3-N,N-bis(tert-butyldimethylsilyl)aminostyrene,
4-(1-aziridinyl)styrene,
3-(1-aziridinyl)styrene,
4-(1-pyrrolidinyl)styrene,
3-(1-pyrrolidinyl)styrene,
4-(1-piperidinyl)styrene,
3-(1-piperidinyl)styrene,
4-(1-hexamethyleneimino)styrene, and
3-(1-hexamethyleneimino)styrene;
compounds in which y in the formula (6-Y) is 1:
4-N,N-dimethylaminomethylstyrene,
3-N,N-dimethylaminomethylstyrene,
4-N,N-diethylaminomethylstyrene,
3-N,N-diethylaminomethylstyrene,
4-N,N-di-n-propylaminomethylstyrene,
3-N,N-di-n-propylaminomethylstyrene,
4-N,N-di-n-butylaminomethylstyrene,
3-N,N-di-n-butylaminomethylstyrene,
4-N,N-diallylaminomethylstyrene,
3-N,N-diallylaminomethylstyrene,
4-N,N-bis(trimethylsilyl)aminomethylstyrene,
3-N,N-bis(trimethylsilyl)aminomethylstyrene,
4-N,N-bis(tert-butyldimethylsilyl)aminomethylstyrene,
3-N,N-bis(tert-butyldimethylsilyl)aminomethylstyrene,
4-(1-aziridinyl)methylstyrene,
3-(1-aziridinyl)methylstyrene,
4-(1-pyrrolidinyl)methylstyrene,
3-(1-pyrrolidinyl)methylstyrene,
4-(1-piperidinyl)methylstyrene,
3-(1-piperidinyl)methylstyrene,
4-(1-hexamethyleneimino)methylstyrene, and
3-(1-hexamethyleneimino)methylstyrene; and
compounds in which y in the formula (6-Y) is 2:
4-N,N-dimethylaminoethylstyrene,
3-N,N-dimethylaminoethylstyrene,
4-N,N-diethylaminoethylstyrene,
3-N,N-diethylaminoethylstyrene,
4-N,N-di-n-propylaminoethylstyrene,
3-N,N-di-n-propylaminoethylstyrene,
4-N,N-di-n-butylaminoethylstyrene,
3-N,N-di-n-butylaminoethylstyrene,
4-N,N-diallylaminoethylstyrene,
3-N,N-diallylaminoethylstyrene,
4-N,N-bis(trimethylsilyl)aminoethylstyrene,
3-N,N-bis(trimethylsilyl)aminoethylstyrene,
4-N,N-bis(tert-butyldimethylsilyl)aminoethylstyrene,
3-N,N-bis(tert-butyldimethylsilyl)aminoethylstyrene,
4-(1-aziridinyl)ethylstyrene,
3-(1-aziridinyl)ethylstyrene,
4-(1-pyrrolidinyl)ethylstyrene,
3-(1-pyrrolidinyl)ethylstyrene,
4-(1-piperidinyl)ethylstyrene,
3-(1-piperidinyl)ethylstyrene,
4-(1-hexamethyleneimino)ethylstyrene, and
3-(1-hexamethyleneimino)ethylstyrene.

Examples of the compounds represented by the formula (6) in which $R^{61}$ is a methyl group, x is 0, and $A^6$ is a substituted amino group include the following:
1-isopropenylpyrrolidine,
1-isopropenylpiperidine,
1-isopropenylhexamethyleneimine,
1-isopropenylpiperazine,
1-isopropenylpyrrole, 1-isopropenylimidazole,
1-isopropenylpyrazole, and
isopropenylquinoline.

Examples of the compounds represented by the formula (6) in which $R^{61}$ is a methyl group, x is 1, $R^{62}$ is a group represented by the formula (6-Y), and $A^6$ is a substituted amino group include the following:

compounds in which y in the formula (6-Y) is 0:
4-N,N-dimethylaminoisopropenylbenzene,
3-N,N-dimethylaminoisopropenylbenzene,
4-N,N-diethylaminoisopropenylbenzene,
3-N,N-diethylaminoisopropenylbenzene,
4-N,N-di-n-propylaminoisopropenylbenzene,
3-N,N-di-n-propylaminoisopropenylbenzene,
4-N,N-di-n-butylaminoisopropenylbenzene,
3-N,N-di-n-butylaminoisopropenylbenzene,
4-N,N-diallylaminoisopropenylbenzene,
3-N,N-diallylaminoisopropenylbenzene,
4-N,N-bis(trimethylsilyl)aminoisopropenylbenzene,
3-N,N-bis(trimethylsilyl)aminoisopropenylbenzene,
4-N,N-bis(tert-butyldimethylsilyl)aminoisopropenylbenzene,
3-N,N-bis(tert-butyldimethylsilyl)aminoisopropenylbenzene,
4-(1-aziridinyl)isopropenylbenzene,
3-(1-aziridinyl)isopropenylbenzene,
4-(1-pyrrolidinyl)isopropenylbenzene,
3-(1-pyrrolidinyl)isopropenylbenzene,
4-(1-piperidinyl)isopropenylbenzene,
3-(1-piperidinyl)isopropenylbenzene,
4-(1-hexamethyleneimino)isopropenylbenzene, and
3-(1-hexamethyleneimino)isopropenylbenzene;
compounds in which y in the formula (6-Y) is 1:
4-N,N-dimethylaminomethylisopropenylbenzene,
3-N,N-dimethylaminomethylisopropenylbenzene,
4-N,N-diethylaminomethylisopropenylbenzene,
3-N,N-diethylaminomethylisopropenylbenzene,
4-N,N-di-n-propylaminomethylisopropenylbenzene,
3-N,N-di-n-propylaminomethylisopropenylbenzene,
4-N,N-di-n-butylaminomethylisopropenylbenzene,
3-N,N-di-n-butylaminomethylisopropenylbenzene,
4-N,N-diallylaminomethylisopropenylbenzene,
3-N,N-diallylaminomethylisopropenylbenzene,
4-N,N-bis(trimethylsilyl)aminomethylisopropenylbenzene,
3-N,N-bis(trimethylsilyl)aminomethylisopropenylbenzene,
4-N,N-bis(tert-butyldimethylsilyl)aminomethylisopropenylbenzene,
3-N,N-bis(tert-butyldimethylsilyl)aminomethylisopropenylbenzene,
4-(1-aziridinyl)methylisopropenylbenzene,
3-(1-aziridinyl)methylisopropenylbenzene,
4-(1-pyrrolidinyl)methylisopropenylbenzene,
3-(1-pyrrolidinyl)methylisopropenylbenzene,
4-(1-piperidinyl)methylisopropenylbenzene,
3-(1-piperidinyl)methylisopropenylbenzene,
4-(1-hexamethyleneimino)methylisopropenylbenzene, and
3-(1-hexamethyleneimino)methylisopropenylbenzene; and
compounds in which y in the formula (6-Y) is 2:
4-N,N-dimethylaminoethylisopropenylbenzene,
3-N,N-dimethylaminoethylisopropenylbenzene,
4-N,N-diethylaminoethylisopropenylbenzene,
3-N,N-diethylaminoethylisopropenylbenzene,
4-N,N-di-n-propylaminoethylisopropenylbenzene,
3-N,N-di-n-propylaminoethylisopropenylbenzene,
4-N,N-di-n-butylaminoethylisopropenylbenzene,
3-N,N-di-n-butylaminoethylisopropenylbenzene,
4-N,N-diallylaminoethylisopropenylbenzene,
3-N,N-diallylaminoethylisopropenylbenzene,
4-N,N-bis(trimethylsilyl)aminoethylisopropenylbenzene,
3-N,N-bis(trimethylsilyl)aminoethylisopropenylbenzene,
4-N,N-bis(tert-butyldimethylsilyl)aminoethylisopropenylbenzene,
3-N,N-bis(tert-butyldimethylsilyl)aminoethylisopropenylbenzene,
4-(1-aziridinyl)ethylisopropenylbenzene,
3-(1-aziridinyl)ethylisopropenylbenzene,
4-(1-pyrrolidinyl)ethylisopropenylbenzene,
3-(1-pyrrolidinyl)ethylisopropenylbenzene,
4-(1-piperidinyl)ethylisopropenylbenzene,
3-(1-piperidinyl)ethylisopropenylbenzene,
4-(1-hexamethyleneimino)ethylisopropenylbenzene, and
3-(1-hexamethyleneimino)ethylisopropenylbenzene.

Examples of the compounds represented by the formula (6) in which $R^{61}$ is a vinyl group, x is 0, and A is a substituted amino group include the following:
2-N,N-dimethylamino-1,3-butadiene,
2-N,N-diethylamino-1,3-butadiene,
2-N,N-di-n-propylamino-1,3-butadiene,
2-N,N-di-n-butylamino-1,3-butadiene,
2-N,N-diallylamino-1,3-butadiene,
2-N,N-bis(trimethylsilyl)amino-1,3-butadiene,
2-N,N-bis(tert-butyldimethylsilyl)amino-1,3-butadiene,
2-(1-aziridinyl)-1,3-butadiene,
2-(1-pyrrolidinyl)-1,3-butadiene,
2-(1-piperidinyl)-1,3-butadiene,
2-(1-hexamethyleneimino)-1,3-butadiene,
2-(1-pyrrolyl)-1,3-butadiene,
2-(1-imidazolyl)-1,3-butadiene, and
2-(1-pyrazolyl)-1,3-butadiene.

Examples of the compounds represented by the formula (6) in which $R^{61}$ is a vinyl group, x is 1, $R^{62}$ is an alkylene group, and $A^6$ is a substituted amino group include the following:

compounds in which $R^{62}$ is a methylene group:
2-N,N-dimethylaminomethyl-1,3-butadiene,
2-N,N-diethylaminomethyl-1,3-butadiene,
2-N,N-di-n-propylaminomethyl-1,3-butadiene,
2-N,N-di-n-butylaminomethyl-1,3-butadiene,
2-N,N-diallylaminomethyl-1,3-butadiene,
2-N,N-bis(trimethylsilyl)aminomethyl-1,3-butadiene,
2-N,N-bis(tert-butyldimethylsilyl)aminomethyl-1,3-butadiene,
2-(1-aziridinyl)methyl-1,3-butadiene,
2-(1-pyrrolidinyl)methyl-1,3-butadiene,
2-(1-piperidinyl)methyl-1,3-butadiene,
2-(1-hexamethyleneimino)methyl-1,3-butadiene,
1-(2-methylene-3-butenyl)pyrrole,
1-(2-methylene-3-butenyl)imidazole, and
1-(2-methylene-3-butenyl)pyrazole; and
compounds in which $R^{62}$ is an ethylene group:
5-N,N-dimethylamino-3-methylene-1-pentene,
5-N,N-diethylamino-3-methylene-1-pentene,
5-N,N-di-n-propylamino-3-methylene-1-pentene,
5-N,N-di-n-butylamino-3-methylene-1-pentene,
5-N,N-diallylamino-3-methylene-1-pentene,
5-N,N-bis(trimethylsilyl)amino-3-methylene-1-pentene,
5-N,N-bis(tert-butyldimethylsilyl)amino-3-methylene-1-pentene,
5-(1-aziridinyl)-3-methylene-1-pentene,
5-(1-pyrrolidinyl)-3-methylene-1-pentene,
5-(1-piperidinyl)-3-methylene-1-pentene,
5-(1-hexamethyleneimino)-3-methylene-1-pentene,
1-(3-methylene-4-pentenyl)pyrrole,
1-(3-methylene-4-pentenyl)imidazole, and
1-(3-methylene-4-pentenyl)pyrazole.

Examples of the compounds represented by the formula (6) in which $R^{61}$ is a hydrogen atom, x is 1, $R^{62}$ is a group represented by the formula (6-Y), and $A^6$ is a nitrogen-containing aliphatic heterocyclic group include the following:

compounds in which y in the formula (6-Y) is 0:
4-N-methyl-2-aziridinylstyrene,
4-N-methyl-2-pyrrolidinylstyrene,
4-N-methyl-3-pyrrolidinylstyrene,
4-N-methyl-2-hexamethyleneiminostyrene,
4-N-methyl-3-hexamethyleneiminostyrene, and
4-N-methyl-4-hexamethyleneiminostyrene;
compounds in which y in the formula (6-Y) is 1:
4-N-methyl-2-aziridinylmethylstyrene,
4-N-methyl-2-pyrrolidinylmethylstyrene,
4-N-methyl-3-pyrrolidinylmethylstyrene,
4-N-methyl-2-hexamethyleneiminomethylstyrene,
4-N-methyl-3-hexamethyleneiminomethylstyrene, and
4-N-methyl-4-hexamethyleneiminomethylstyrene; and
compounds in which y in the formula (6-Y) is 2:
4-N-methyl-2-aziridinylethylstyrene,
4-N-methyl-2-pyrrolidinylethylstyrene,
4-N-methyl-3-pyrrolidinylethylstyrene,
4-N-methyl-2-hexamethyleneiminoethylstyrene,
4-N-methyl-3-hexamethyleneiminoethylstyrene, and
4-N-methyl-4-hexamethyleneiminoethylstyrene.

Examples of the compounds represented by the formula (6) in which $R^{61}$ is a methyl group, x is 1, $R^{62}$ is a group represented by the formula (6-Y), and $A^6$ is a nitrogen-containing aliphatic heterocyclic group include the following:

compounds in which y in the formula (6-Y) is 0:
4-N-methyl-2-aziridinylisopropenylbenzene,
4-N-methyl-2-pyrrolidinylisopropenylbenzene,
4-N-methyl-3-pyrrolidinylisopropenylbenzene,
4-N-methyl-2-hexamethyleneiminoisopropenylbenzene,
4-N-methyl-3-hexamethyleneiminoisopropenylbenzene, and
4-N-methyl-4-hexamethyleneiminoisopropenylbenzene;
compounds in which y in the formula (6-Y) is 1:
4-N-methyl-2-aziridinylmethylisopropenylbenzene,
4-N-methyl-2-pyrrolidinylmethylisopropenylbenzene,
4-N-methyl-3-pyrrolidinylmethylisopropenylbenzene,
4-N-methyl-2-hexamethyleneiminomethylisopropenylbenzene,
4-N-methyl-3-hexamethyleneiminomethylisopropenylbenzene, and
4-N-methyl-4-hexamethyleneiminomethylisopropenylbenzene; and
compounds in which y in the formula (6-Y) is 2:
4-N-methyl-2-aziridinylethylisopropenylbenzene,
4-N-methyl-2-pyrrolidinylethylisopropenylbenzene,
4-N-methyl-3-pyrrolidinylethylisopropenylbenzene,
4-N-methyl-2-hexamethyleneiminoethylisopropenylbenzene,
4-N-methyl-3-hexamethyleneiminoethylisopropenylbenzene, and
4-N-methyl-4-hexamethyleneiminoethylisopropenylbenzene.

Examples of the compounds represented by the formula (6) in which $R^{61}$ is a vinyl group, x is 0, and $A^6$ is a nitrogen-containing aliphatic heterocyclic group include the following:
N-methyl-2-(1-methylene-2-propenyl)aziridine,
N-methyl-2-(1-methylene-2-propenyl)pyrrolidine,
N-methyl-3-(1-methylene-2-propenyl)pyrrolidine,
N-methyl-2-(1-methylene-2-propenyl)hexamethyleneimine,
N-methyl-3-(1-methylene-2-propenyl)hexamethyleneimine, and
N-methyl-4-(1-methylene-2-propenyl)hexamethyleneimine.

Examples of the compounds represented by the formula (6) in which $R^{61}$ is a vinyl group, x is 1, $R^{62}$ is an alkylene group, and $A^6$ is a nitrogen-containing aliphatic heterocyclic group include the following:

compounds in which $R^{62}$ is a methylene group:
N-methyl-2-(2-methylene-3-butenyl)aziridine,
N-methyl-2-(2-methylene-3-butenyl)pyrrolidine,
N-methyl-3-(2-methylene-3-butenyl)pyrrolidine,
N-methyl-2-(2-methylene-3-butenyl)hexamethyleneimine,
N-methyl-3-(2-methylene-3-butenyl)hexamethyleneimine, and
N-methyl-4-(2-methylene-3-butenyl)hexamethyleneimine; and
compounds in which $R^{62}$ is an ethylene group:
N-methyl-2-(3-methylene-4-pentenyl)aziridine,
N-methyl-2-(3-methylene-4-pentenyl)pyrrolidine,
N-methyl-3-(3-methylene-4-pentenyl)pyrrolidine,
N-methyl-2-(3-methylene-4-pentenyl)hexamethyleneimine,
N-methyl-3-(3-methylene-4-pentenyl)hexamethyleneimine, and
N-methyl-4-(3-methylene-4-pentenyl)hexamethyleneimine.

Examples of the compounds represented by the formula (6) in which $R^{61}$ is a hydrogen atom, x is 0, and $A^6$ is a nitrogen-containing aromatic heterocyclic group include the following:
N-methyl-2-vinylimidazole,
N-methyl-4-vinylimidazole,
N-methyl-5-vinylimidazole,
2-vinylpyridine,
3-vinylpyridine,
4-vinylpyridine,
2-vinylquinoline,
3-vinylquinoline, and
4-vinylquinoline.

Examples of the compounds represented by the formula (6) in which $R^{61}$ is a methyl group, x is 0, and $A^6$ is a nitrogen-containing aromatic heterocyclic group include the following:
N-methyl-2-isopropenylimidazole,
N-methyl-4-isopropenylimidazole,
N-methyl-5-isopropenylimidazole,
2-isopropenylpyridine,
3-isopropenylpyridine,
4-isopropenylpyridine,
2-isopropenylquinoline,
3-isopropenylquinoline, and
4-isopropenylquinoline.

Examples of the compounds represented by the formula (6) in which $R^{61}$ is a vinyl group, x is 0, and $A^6$ is a nitrogen-containing aromatic heterocyclic group include the following:
N-methyl-2-(1-methylene-2-propenyl)imidazole,
N-methyl-4-(1-methylene-2-propenyl)imidazole,
N-methyl-5-(1-methylene-2-propenyl)imidazole,
2-(1-methylene-2-propenyl)pyridine,
3-(1-methylene-2-propenyl)pyridine,
4-(1-methylene-2-propenyl)pyridine,
2-(1-methylene-2-propenyl)quinoline,
3-(1-methylene-2-propenyl)quinoline, and
4-(1-methylene-2-propenyl)quinoline.

Examples of the compounds represented by the formula (6) in which $R^{61}$ is a vinyl group, x is 1, $R^{62}$ is an alkylene group, and $A^6$ is a nitrogen-containing aromatic heterocyclic group include the following:

compounds in which $R^{62}$ is a methylene group:
N-methyl-2-(2-methylene-3-butenyl)imidazole,
N-methyl-4-(2-methylene-3-butenyl)imidazole,
N-methyl-5-(2-methylene-3-butenyl)imidazole,
2-(2-methylene-3-butenyl)pyridine,
3-(2-methylene-3-butenyl)pyridine,
4-(2-methylene-3-butenyl)pyridine,
2-(2-methylene-3-butenyl)quinoline,
3-(2-methylene-3-butenyl)quinoline, and
4-(2-methylene-3-butenyl)quinoline; and compounds in which $R^{62}$ is an ethylene group:
N-methyl-2-(3-methylene-4-pentenyl)imidazole,
N-methyl-4-(3-methylene-4-pentenyl)imidazole,
N-methyl-5-(3-methylene-4-pentenyl)imidazole,
2-(3-methylene-4-pentenyl)pyridine,
3-(3-methylene-4-pentenyl)pyridine,
4-(3-methylene-4-pentenyl)pyridine,
2-(3-methylene-4-pentenyl)quinoline,
3-(3-methylene-4-pentenyl)quinoline, and
4-(3-methylene-4-pentenyl)quinoline.

The compound represented by the formula (6) is preferably a compound in which $R^{61}$ is a hydrogen atom, x is 1, $R^{62}$ is a group represented by the formula (6-Y), and $A^6$ is a substituted amino group, more preferably a compound in which $R^{61}$ is a hydrogen atom, x is 1, $R^{62}$ is a group represented by the formula (6-Y), and $A^6$ is a group represented by the formula (6-X), and still more preferably a compound in which $R^{63}$ and $R^{64}$ in the formula (6-X) are C1-2 linear alkyl groups, a compound in which $R^{63}$ and $R^{64}$ in the formula (6-X) are trimethylsilyl groups, or a compound in which $R^{63}$ and $R^{64}$ in the formula (6-X) are joined together to form a C4-6 polymethylene group.

The compound represented by the formula (6) is particularly preferably
4-N,N-bis(trimethylsilyl)aminostyrene,
3-N,N-bis(trimethylsilyl)aminostyrene,
4-N,N-dimethylaminomethylstyrene,
3-N,N-dimethylaminomethylstyrene,
4-(1-pyrrolidinyl)ethylstyrene, or
3-(1-pyrrolidinyl)ethylstyrene.

For enhanced fuel economy, the content of the monomer unit derived from the compound represented by the formula (5) per 100% by mass of the conjugated diene polymer (B) is preferably 0.01% by mass or more, more preferably 0.02% by mass or more, and still more preferably 0.05% by mass or more. For enhanced economic efficiency and abrasion resistance, the content is preferably 20% by mass or less, more preferably 2% by mass or less, still more preferably 1% by mass or less, and particularly preferably 0.5% by mass or less.

In the monomer unit derived from the compound represented by the formula (5), the groups represented by $X^{51}$, $X^{52}$, and $X^{53}$ may have been converted to hydroxy groups by hydrolysis or the like.

For enhanced fuel economy and abrasion resistance, the content of the monomer unit derived from the compound represented by the formula (6) per 100% by mass of the conjugated diene polymer (B) is preferably 0.01% by mass or more, more preferably 0.02% by mass or more, and still more preferably 0.05% by mass or more. For enhanced economic efficiency and abrasion resistance, the content is preferably 20% by mass or less, more preferably 2% by mass or less, still more preferably 1% by mass or less, and particularly preferably 0.5% by mass or less.

For enhanced abrasion resistance, the conjugated diene polymer (B) according to the second aspect of the present invention may contain a constituent unit derived from a vinyl aromatic hydrocarbon (vinyl aromatic hydrocarbon unit). Examples of the vinyl aromatic hydrocarbons include styrene, α-methylstyrene, vinyltoluene, vinylnaphthalene, divinylbenzene, trivinylbenzene, and divinylnaphthalene, and preferably styrene.

The content of the vinyl aromatic hydrocarbon unit based on 100% by mass of a total of the conjugated diene unit and the vinyl aromatic hydrocarbon unit is 0% by mass or more (the content of the conjugated diene unit: 100% by mass or less), preferably 10% by mass or more (the content of the conjugated diene unit: 90% by mass or less), and more preferably 15% by mass or more (the content of the conjugated diene unit: 85% by mass or less). For enhanced fuel economy, the content of the vinyl aromatic hydrocarbon unit is preferably 50% by mass or less (the content of the conjugated diene unit: 50% by mass or more), and more preferably 45% by mass or less (the content of the conjugated diene unit: 55% by mass or more).

For enhanced abrasion resistance, the Mooney viscosity ($ML_{1+4}$) of the conjugated diene polymer (B) is preferably 10 or more, and more preferably 20 or more. For enhanced processability, the Mooney viscosity ($ML_{1+4}$) is preferably 200 or less, and more preferably 150 or less. The Mooney viscosity ($ML_{1+4}$) is measured at 100° C. in accordance with JIS K 6300 (1994).

For enhanced fuel economy, the vinyl bond content of the conjugated diene polymer (B) based on 100 mol % of the conjugated diene unit is preferably 80 mol % or less, and more preferably 70 mol % or less. For enhanced wet grip performance, the vinyl bond content of the conjugated diene polymer (B) is preferably 10 mol % or more, more preferably 15 mol % or more, still more preferably 20 mol % or more, and particularly preferably 40 mol % or more. The vinyl bond content is determined from an absorption intensity at around 910 $cm^{-1}$, which is an absorption peak of a vinyl group, by infrared spectrometry.

For enhanced fuel economy, the conjugated diene polymer (B) preferably has a molecular weight distribution of 1 to 5, and more preferably 1 to 2. The molecular weight distribution is determined by measuring the number average molecular weight (Mn) and the weight average molecular weight (Mw) by gel permeation chromatography (GPC) and dividing Mw by Mn.

The conjugated diene polymer (B) may be suitably produced by polymerizing a monomer component including a conjugated diene, a monomer represented by the aforementioned formula (5) and a monomer represented by the aforementioned formula (6) in the presence of an alkali metal catalyst in a hydrocarbon solvent.

Examples of the alkali metal catalysts include alkali metals, organic alkali metal compounds, complexes of alkali metals and polar compounds, and alkali metal-containing oligomers. Examples of the alkali metals include lithium, sodium, potassium, rubidium, and cesium. Examples of the organic alkali metal compounds include ethyllithium, n-propyllithium, iso-propyllithium, n-butyllithium, sec-butyllithium, t-octyllithium, n-decyllithium, phenyllithium, 2-naphthyllithium, 2-butylphenyllithium, 4-phenylbutyllithium, cyclohexyllithium, 4-cyclopentyllithium, dimethylaminopropyllithium, diethylaminopropyllithium, t-butyldimethylsilyloxypropyllithium, N-morpholinopropyllithium, lithium hexamethyleneimide, lithium pyrrolidide, lithium piperidide, lithium heptamethyleneimide, lithium dodecamethyleneimide, 1,4-dilithio-2-butene, sodium naphthalenide, sodium biphenylide, and potassium naphthalenide. Examples of the complexes of alkali metals and polar compounds include potassium-tetrahydrofuran complexes and potassium-diethoxyethane complexes. Examples of the alkali metal-containing oligomers include sodium salts of α-methylstyrene tetramers. Organic lithium compounds or organic sodium compounds are preferred, and C2-20 organic lithium compounds or C2-20 organic sodium compounds are more preferred.

The hydrocarbon solvent is a solvent that does not deactivate an organic alkali metal compound catalyst, and examples thereof include aliphatic hydrocarbons, aromatic hydrocarbons, and alicyclic hydrocarbons.

Examples of the aliphatic hydrocarbons include propane, n-butane, iso-butane, n-pentane, iso-pentane, n-hexane, propene, 1-butene, iso-butene, trans-2-butene, cis-2-butene, 1-pentene, 2-pentene, 1-hexene, and 2-hexene.

Examples of the aromatic hydrocarbons include benzene, toluene, xylene, and ethylbenzene. Examples of the alicyclic hydrocarbons include cyclopentane and cyclohexane. One or more kinds of these are used. The hydrocarbon solvent may be a mixture of different components, such as industrial hexane. C2-12 hydrocarbons are preferred.

A monomer component including a conjugated diene, a compound represented by the formula (5), and a compound represented by the formula (6) is polymerized in the presence of an alkali metal catalyst in a hydrocarbon solvent to produce a polymer including a monomer unit derived from the conjugated diene, a monomer unit derived from the compound represented by the formula (5), and a monomer unit derived from the compound represented by the formula (6). Examples of the conjugated dienes include 1,3-butadiene, isoprene, 1,3-pentadiene, 2,3-dimethyl-1,3-butadiene, and 1,3-hexadiene. One or more kinds of these are used. The conjugated diene is preferably 1,3-butadiene or isoprene.

For enhanced fuel economy, the amount of the compound represented by the formula (5) based on 100% by mass of the total monomer component used in the polymerization is preferably 0.01% by mass or more, more preferably 0.02% by mass or more, and still more preferably 0.05% by mass or more. For enhanced economic efficiency and abrasion resistance, the amount is preferably 20% by mass or less, more preferably 2% by mass or less, still more preferably 1% by mass or less, and particularly preferably 0.5% by mass or less.

For enhanced fuel economy and abrasion resistance, the amount of the compound represented by the formula (6) based on 100% by mass of the total monomer component used in the polymerization is preferably 0.01% by mass or more, more preferably 0.02% by mass or more, and still more preferably 0.05% by mass or more. For enhanced economic efficiency and abrasion resistance, the amount is preferably 20% by mass or less, more preferably 2% by mass or less, still more preferably 1% by mass or less, and particularly preferably 0.5% by mass or less.

The polymerization may be performed by combining a vinyl aromatic hydrocarbon with the conjugated diene, the compound represented by the formula (5), and the compound represented by the formula (6). Examples of the vinyl aromatic hydrocarbons include styrene, α-methylstyrene, vinyltoluene, vinylnaphthalene, divinylbenzene, trivinylbenzene, and divinylnaphthalene. Preferred is styrene.

In the case of using a vinyl aromatic hydrocarbon, for enhanced strength, the amount of the vinyl aromatic hydrocarbon based on 100% by mass in total of the conjugated diene and the vinyl aromatic hydrocarbon is preferably 10% by mass or more (the amount of the conjugated diene: 90% by mass or less), and more preferably 15% by mass or more (the amount of the conjugated diene: 85% by mass or less). For enhanced fuel economy, the amount of the vinyl aromatic hydrocarbon is preferably 50% by mass or less (the amount of the conjugated diene: 50% by mass or more), and more preferably 45% by mass or less (the amount of the conjugated diene: 55% by mass or more).

For enhanced strength, the combined amount of the conjugated diene, the compound represented by the formula (5), the compound represented by the formula (6), and the vinyl aromatic hydrocarbon used in the polymerization reaction is preferably 99.9% by mass or more, more preferably 99.95% by mass or more, and still more preferably 100% by mass, based on 100% by mass of total monomer.

The polymerization reaction may be performed in the presence of an agent for controlling the vinyl bond content of the conjugated diene unit, and an agent for controlling the distribution of the conjugated diene unit and monomer units derived from monomers other than the conjugated diene in the conjugated diene polymer chain (hereinafter, referred to collectively as "controlling agents"). Examples of the agents include ether compounds, tertiary amines, and phosphine compounds. Examples of the ether compounds include cyclic ethers, such as tetrahydrofuran, tetrahydropyran, or 1,4-dioxane; aliphatic monoethers, such as diethyl ether or dibutyl ether; aliphatic diethers, such as ethylene glycol dimethyl ether, ethylene glycol diethyl ether, ethylene glycol dibutyl ether, diethylene glycol diethyl ether, or diethylene glycol dibutyl ether; and aromatic ethers, such as diphenyl ether or anisole. Examples of the tertiary amines include triethylamine, tripropylamine, tributylamine, N,N,N',N'-tetramethylethylenediamine, N,N-diethylaniline, pyridine, and quinoline. Examples of the phosphine compounds include trimethylphosphine, triethylphosphine, and triphenylphosphine. One or more kinds of these may be used.

The polymerization temperature is usually 25 to 100° C., and preferably 35 to 90° C. The polymerization temperature is more preferably 50 to 80° C. The polymerization time is usually 10 minutes to 5 hours.

In the methods of producing the conjugated diene polymers (A) and (B), a coupling agent may be optionally added to the hydrocarbon solution containing the conjugated diene polymer during the period from initiation of the polymerization of monomers in the presence of an alkali metal catalyst to termination of the polymerization. Examples of the coupling agents include compounds represented by the following formula (7):

$$R^{71}{}_a ML_{4-a} \qquad (7)$$

wherein $R^{71}$ represents an alkyl group, an alkenyl group, a cycloalkenyl group, or an aryl group; M represents a silicon atom or a tin atom; L represents a halogen atom or a hydrocarbyloxy group; and a represents an integer of 0 to 2.

Examples of the coupling agents represented by the formula (7) include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

In view of enhancing the processability of the conjugated diene polymer, the amount of the coupling agent to be added per mol of the alkali metal derived from then alkali metal catalyst is preferably 0.03 mol or more, more preferably 0.05 mol or more. For enhanced fuel economy, the amount is preferably 0.4 mol or less, and more preferably 0.3 mol or less.

The conjugated diene polymer can be recovered from the hydrocarbon solution of the conjugated diene polymer by a known recovery method, for example, (1) a method of adding a coagulating agent to the hydrocarbon solution of the conjugated diene polymer, or (2) a method of adding steam to the hydrocarbon solution of the conjugated diene polymer. The recovered conjugated diene polymer may be dried with a known dryer, such as a band dryer or an extrusion-type dryer.

The conjugated diene polymers (A) and (B) can be used as a rubber component. Other rubbers and additives (e.g. silica) may be added to the conjugated diene polymer (A) or (B) to prepare a rubber composition of the present invention.

The amount of the conjugated diene polymer (A) or (B) per 100% by mass of the rubber component is 5% by mass or more, preferably 20% by mass or more, and more preferably 40% by mass or more. If the amount is less than 5% by mass, the effect of improving fuel economy tends not to be achieved. The amount of the conjugated diene polymer (A) or (B) is preferably 90% by mass or less, and more preferably 80% by mass or less. If the amount is more than 90% by mass, abrasion resistance tends to decrease, and cost tends to be high.

Non-limiting examples of materials that may be included in the rubber component, other than the conjugated diene polymers (A) and (B), include natural rubber (NR), polyisoprene rubber (IR), polybutadiene rubber (BR), styrene butadiene rubber (SBR), acrylonitrile butadiene rubber (NBR), chloroprene rubber (CR), and butyl rubber (IIR). These rubbers may be used alone, or in combination of two or more. NR or BR is preferred among these because they provide well-balanced fuel economy, wet grip performance, and abrasion resistance.

The rubber component is not particularly limited, and those common in the tire industry may be used.

The amount of NR based on 100% by mass of the rubber component is preferably 5% by mass or more, and more preferably 15% by mass or more. An amount of less than 5% by mass tends to fail to provide sufficient fuel economy. The amount of NR is preferably 60% by mass or less, and more preferably 40% by mass or less. An amount of more than 60% by mass tends to deteriorate processability.

The amount of BR based on 100% by mass of the rubber component is preferably 5% by mass or more, and more preferably 15% by mass or more. An amount of less than 5% by mass tends to fail to provide sufficient abrasion resistance. The amount of BR is preferably 60% by mass or less, and more preferably 40% by mass or less. An amount of more than 60% by mass tends to deteriorate fuel economy.

The rubber compositions of the present invention include silica as a reinforcing agent. Examples of the silicas include dry silica (anhydrous silicic acid), wet silica (hydrous silicic acid), colloidal silica, precipitated silica, calcium silicate, and aluminum silicate. One or more kinds of these can be used. The silica preferably has a BET specific surface area of 50 to 250 m²/g. The BET specific surface area is measured in accordance with ASTM D1993-03. Examples of commercially available silicas include Ultrasil VN3-G (trade name) produced by Degussa; VN3, AQ, ER, and RS-150 (trade names) produced by Tosoh Silica Corporation; and Zeosil 1115 MP, 1165 MP (trade names) produced by Rhodia.

The amount of silica relative to 100 parts by mass of the rubber component is 5 to 150 parts by mass. For enhanced fuel economy, the amount is preferably 30 parts by mass or more, and more preferably 50 parts by mass or more. For enhanced abrasion resistance and strength, the amount is preferably 120 parts by mass or less, and more preferably 100 parts by mass or less.

The rubber compositions of the present invention include a silane coupling agent containing a mercapto group as a silane coupling agent. Silica can be well dispersed in the rubber composition which includes the silane coupling agent containing a mercapto group together with the conjugated diene polymer and silica. Thus, the rubber composition can have markedly improved fuel economy, wet grip performance, and abrasion resistance.

The silane coupling agent containing a mercapto group may suitably be a silane coupling agent represented by the following formula (1) and/or a silane coupling agent containing a linking unit A represented by the following formula (II) and a linking unit B represented by the following formula (III),

[Chem. 60]

$$R^{102}-\underset{\underset{R^{103}}{|}}{\overset{\overset{R^{101}}{|}}{Si}}-R^{104}-SH \qquad (I)$$

wherein $R^{101}$ to $R^{103}$ each represent a branched or unbranched C1-12 alkyl group, a branched or unbranched C1-12 alkoxy group, or a group represented by —O—$(R^{111}$—O$)_b$—$R^{112}$ where b $R^{111}$s each represent a branched or unbranched C1-30 divalent hydrocarbon group, and b $R^{111}$s may be the same as or different from one another; $R^{112}$ represents a branched or unbranched C1-30 alkyl group, a branched or unbranched C2-30 alkenyl group, a C6-30 aryl group, or a C7-30 aralkyl group; and b represents an integer of 1 to 30, and $R^{101}$ to $R^{103}$ may be the same as or different from one another; and $R^{104}$ represents a branched or unbranched C1-6 alkylene group,

[Chem. 61]

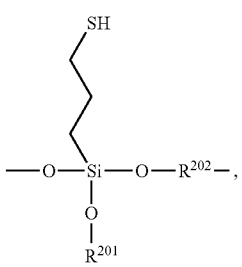

(II)

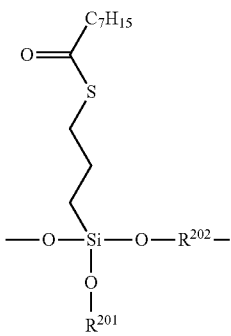

(III)

wherein $R^{201}$ represents a hydrogen atom, a halogen atom, a branched or unbranched C1-30 alkyl group, a branched or unbranched C2-30 alkenyl group, a branched or unbranched C2-30 alkynyl group, or the alkyl group in which a terminal hydrogen atom is replaced with a hydroxy group or a carboxyl group; $R^{202}$ represents a branched or unbranched C1-30 alkylene group, a branched or unbranched C2-30 alkenylene group, or a branched or unbranched C2-30 alkynylene group, provided that $R^{201}$ and $R^{202}$ together may form a cyclic structure.

The following describes the silane coupling agent represented by the formula (1).

$R^{101}$ to $R^{103}$ each represent a branched or unbranched C1-12 alkyl group, a branched or unbranched C1-12 alkoxy group, or a group represented by $—O—(R^{111}—O)_z—R^{112}$. In view of achieving the effects of the present invention well, preferably at least one of $R^{101}$ to $R^{103}$ is a group represented by $—O—(R^{111}—O)_z—R^{112}$. More preferably two of $R^{101}$ to $R^{103}$ are groups represented by $—O—(R^{111}—O)_z—R^{112}$ and the remaining one is a branched or unbranched C1-12 alkoxy group.

Examples of the branched or unbranched C1-12 (preferably C1-5) alkyl groups for $R^{101}$ to $R^{103}$ include a methyl group, an ethyl group, a n-propyl group, an isopropyl group, a n-butyl group, an iso-butyl group, a sec-butyl group, a tert-butyl group, a pentyl group, a hexyl group, a heptyl group, a 2-ethylhexyl group, an octyl group, and a nonyl group.

Examples of the branched or unbranched C1-12 (preferably C1-5) alkoxy groups for $R^{101}$ to $R^{103}$ include a methoxy group, an ethoxy group, a n-propoxy group, an isopropoxy group, a n-butoxy group, an iso-butoxy group, a sec-butoxy group, a tert-butoxy group, a pentyloxy group, a hexyloxy group, a heptyloxy group, a 2-ethylhexyloxy group, an octyloxy group, and a nonyloxy group.

$R^{111}$ in the group represented by $—O—(R^{111}—O)_z—R^{112}$ for $R^{101}$ to $R^{103}$ represents a branched or unbranched C1-30 (preferably C1-15, more preferably C1-3) divalent hydrocarbon group.

Examples of the hydrocarbon groups include branched or unbranched C1-30 alkylene groups, branched or unbranched C2-30 alkenylene groups, branched or unbranched C2-30 alkynylene groups, and C6-30 arylene groups. Branched or unbranched C1-30 alkylene groups are preferred among the examples.

Examples of the branched or unbranched C1-30 (preferably C1-15, more preferably C1-3) alkylene groups for $R^{111}$ include a methylene group, an ethylene group, a propylene group, a butylene group, a pentylene group, a hexylene group, a heptylene group, an octylene group, a nonylene group, a decylene group, a undecylene group, a dodecylene group, a tridecylene group, a tetradecylene group, a pentadecylene group, a hexadecylene group, a heptadecylene group, and an octadecylene group.

Examples of the branched or unbranched C2-30 (preferably C2-15, more preferably C2-3) alkenylene groups for $R^{111}$ include a vinylene group, a 1-propenylene group, a 2-propenylene group, a 1-butenylene group, a 2-butenylene group, a 1-pentenylene group, a 2-pentenylene group, a 1-hexenylene group, a 2-hexenylene group, and a 1-octenylene group.

Examples of the branched or unbranched C2-30 (preferably C2-15, more preferably C2-3) alkynylene groups for $R^{111}$ include an ethynylene group, a propynylene group, a butynylene group, a pentynylene group, a hexynylene group, a heptynylene group, an octynylene group, a nonynylene group, a decynylene group, a undecynylene group, and a dodecynylene group.

Examples of the C6-30 (preferably C6-15) arylene groups for $R^{111}$ include a phenylene group, a tolylene group, a xylylene group, and a naphthylene group.

z represents an integer of 1 to 30 (preferably 2 to 20, more preferably 3 to 7, and still more preferably 5 or 6).

$R^{112}$ represents a branched or unbranched C1-30 alkyl group, a branched or unbranched C2-30 alkenyl group, a C6-30 aryl group, or a C7-30 aralkyl group. $R^{112}$ is especially preferably a branched or unbranched C1-30 alkyl group.

Examples of the branched or unbranched C1-30 (preferably C3-25, more preferably C10-15) alkyl groups for $R^{112}$ include a methyl group, an ethyl group, a n-propyl group, an isopropyl group, a n-butyl group, an iso-butyl group, a sec-butyl group, a tert-butyl group, a pentyl group, a hexyl group, a heptyl group, a 2-ethylhexyl group, an octyl group, a nonyl group, a decyl group, a undecyl group, a dodecyl group, a tridecyl group, a tetradecyl group, a pentadecyl group, and an octadecyl group.

Examples of the branched or unbranched C2-30 (preferably C3-25, more preferably C10-15) alkenyl groups for $R^{112}$ include a vinyl group, a 1-propenyl group, a 2-propenyl group, a 1-butenyl group, a 2-butenyl group, a 1-pentenyl group, a 2-pentenyl group, a 1-hexenyl group, a 2-hexenyl group, a 1-octenyl group, a decenyl group, a undecenyl group, a dodecenyl group, a tridecenyl group, a tetradecenyl group, a pentadecenyl group, and an octadecenyl group.

Examples of the C6-30 (preferably C10-20) aryl groups for $R^{112}$ include a phenyl group, a tolyl group, a xylyl group, a naphthyl group, and a biphenyl group.

Examples of the C7-30 (preferably C10-20) aralkyl groups for $R^{112}$ include a benzyl group and a phenethyl group.

Specific examples of the group represented by $—O—(R^{111}—O)_z—R^{112}$ include groups represented by $—O—(C_2H_4—O)_5—C_{11}H_{23}$, $—O—(C_2H_4—O)_5—C_{12}H_{25}$, $—O—(C_2H_4—O)_5—C_{13}H_{27}$, $—O—(C_2H_4—O)_5—C_{14}H_{29}$, $—O—(C_2H_4—O)_5—C_{15}H_{31}$, $—O—(C_2H_4—O)_3—C_{13}H_{27}$, $—O—(C_2H_4—O)_4—C_{13}H_{27}$, $—O—(C_2H_4—O)_6—C_{13}H_{27}$ and $—O—(C_2H_4—O)_7—C_{13}H_{27}$. Preferred among the examples are groups represented by $—O—(C_2H_4—O)_5—C_{11}H_{23}$, $—O—(C_2H_4—O)_5—C_{13}H_{27}$, $—O—(C_2H_4—O)_5—C_{15}H_{31}$, and $—O—(C_2H_4—O)_6—C_{13}H_{27}$.

Examples of the branched or unbranched C1-6 (preferably C1-5) alkylene groups for $R^{104}$ include groups as mentioned for the branched or unbranched C1-30 alkylene group for $R^{111}$.

Examples of the silane coupling agents represented by the formula (1) include 3-mercaptopropyltrimethoxysilane, 3-mercaptopropyltriethoxysilane, 2-mercaptoethyltrimethoxysilane, 2-mercaptoethyltriethoxysilane, and a compound represented by the following formula (Si363 produced by Evonik Degussa). The compound represented by the following formula may be suitably used. These compounds may be used alone or two or more of these may be used in combination.

[Chem. 63]

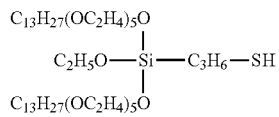

The following describes the silane coupling agent containing a linking unit A represented by the formula (II) and a linking unit B represented by the formula (III).

When the silane coupling agent containing a linking unit A represented by the formula (II) and a linking unit B represented by the formula (III) is used, the increase in viscosity during the processing is suppressed as compared to when polysulfide silane, such as bis-(3-triethoxysilylpropyl)tetrasulfide, is used. This is presumably because, since the sulfide moiety of the linking unit A is a C—S—C bond, the compound is thermally stabler than tetrasulfide and disulfide and thus Mooney viscosity is less likely to increase.

Further, the decrease in scorch time is suppressed as compared to the case where mercapto silane, such as 3-mercaptopropyltrimethoxysilane, is used. This is presumably because, though the linking unit B has a mercaptosilane structure, the —$C_7H_{15}$ moiety of the linking unit A covers the —SH group of the linking unit B, as a result of which the SH group is less likely to react with polymers and thus scorch is less likely to occur.

In view of enhancing the effects of suppressing the increase in viscosity during the processing and of suppressing the decrease in scorch time as mentioned above, the linking unit A content in the silane coupling agent having the aforementioned structure is preferably 30 mol % or more, and more preferably 50 mol % or more, whereas it is preferably 99 mol % or less, and more preferably 90 mol % or less. Also, the linking unit B content is preferably 1 mol % or more, more preferably 5 mol % or more, and still more preferably 10 mol % or more, whereas it is preferably 70 mol % or less, more preferably 65 mol % or less, and still more preferably 55 mol % or less. Moreover, the combined content of the linking units A and B is preferably 95 mol % or more, more preferably 98 mol % or more, and particularly preferably 100 mol %.

The linking unit A or B content refers to the amount including the linking unit A or B that is present at the end of the silane coupling agent, if any. In the case where the linking unit A or B is present at the end of the silane coupling agent, its form is not particularly limited as long as it forms a unit corresponding to the formula (II) representing the linking unit A or the formula (III) representing the linking unit B.

Examples of the halogen atoms for $R^{201}$ include chlorine, bromine, and fluorine.

Examples of the branched or unbranched C1-30 alkyl groups for $R^{201}$ include a methyl group, an ethyl group, a n-propyl group, an isopropyl group, a n-butyl group, an iso-butyl group, a sec-butyl group, a tert-butyl group, a pentyl group, a hexyl group, a heptyl group, a 2-ethylhexyl group, an octyl group, a nonyl group, and a decyl group. The alkyl group preferably has 1 to 12 carbon atoms.

Examples of the branched or unbranched C2-30 alkenyl groups for $R^{201}$ include a vinyl group, a 1-propenyl group, a 2-propenyl group, a 1-butenyl group, a 2-butenyl group, a 1-pentenyl group, a 2-pentenyl group, a 1-hexenyl group, a 2-hexenyl group, and a 1-octenyl group. The alkenyl group preferably has 2 to 12 carbon atoms.

Examples of the branched or unbranched C2-30 alkynyl groups for $R^{201}$ include an ethynyl group, a propynyl group, a butynyl group, a pentynyl group, a hexynyl group, a heptynyl group, an octynyl group, a nonynyl group, a decynyl group, a undecynyl group, and a dodecynyl group. The alkynyl group preferably has 2 to 12 carbon atoms.

Examples of the branched or unbranched C1-30 alkylene groups for $R^{202}$ include an ethylene group, a propylene group, a butylene group, a pentylene group, a hexylene group, a heptylene group, an octylene group, a nonylene group, a decylene group, a undecylene group, a dodecylene group, a tridecylene group, a tetradecylene group, a pentadecylene group, a hexadecylene group, a heptadecylene group, and an octadecylene group. The alkylene group preferably has 1 to 12 carbon atoms.

Examples of the branched or unbranched C2-30 alkenylene groups for $R^{202}$ include a vinylene group, a 1-propenylene group, a 2-propenylene group, a 1-butenylene group, a 2-butenylene group, a 1-pentenylene group, a 2-pentenylene group, a 1-hexenylene group, a 2-hexenylene group, and a 1-octenylene group. The alkenylene group preferably has 2 to 12 carbon atoms.

Examples of the branched or unbranched C2-30 alkynylene groups for $R^{202}$ include an ethynylene group, a propynylene group, a butynylene group, a pentynylene group, a hexynylene group, a heptynylene group, an octynylene group, a nonynylene group, a decynylene group, a undecynylene group, and a dodecynylene group. The alkynylene group preferably has 2 to 12 carbon atoms.

In the silane coupling agent containing a linking unit A represented by the formula (II) and a linking unit B represented by the formula (III), the total number of repetitions (x+y) of the number of repetitions (x) of the linking unit A and the number of repetitions (y) of the linking unit B is preferably in the range of 3 to 300. When the total number of repetitions falls within the range mentioned above, the —$C_7H_{15}$ moiety of the linking unit A covers the mercaptosilane of the linking unit B, which can not only suppress the decrease in scorch time, but also ensure good reactivity to silica and the rubber component.

Examples of the silane coupling agents containing a linking unit A represented by the formula (II) and a linking unit B represented by the formula (III) include NXT-Z30, NXT-Z45, and NXT-Z60 (produced by Momentive Performance Materials). These may be used alone, or two or more of these may be used in combination.

The amount of the silane coupling agent containing a mercapto group relative to 100 parts by mass of silica is preferably 0.5 parts by mass or more, more preferably 1.5 parts by mass or more, and still more preferably 2.5 parts by mass or more. If the amount is less than 0.5 parts by mass, it may be difficult to sufficiently disperse silica. The amount of the silane coupling agent containing a mercapto group is preferably 20 parts by mass or less, more preferably 15 parts by mass or less, and still more preferably 10 parts by mass or less. If the amount is more than 20 parts by mass, an effect commensurate with the increase in cost tends not to be produced.

The rubber compositions of the present invention may contain additives in addition to the above agents. Known additives may be used. Examples thereof include vulcanizing agents such as sulfur; vulcanization accelerators such as thiazole vulcanization accelerators, thiuram vulcanization accelerators, sulfenamide vulcanization accelerators, and guanidine vulcanization accelerators; vulcanization activators, such as stearic acid or zinc oxide; organic peroxides, such as dicumyl peroxide or ditertiary butyl peroxide; reinforcing agents such as carbon black; fillers, such as calcium carbonate, talc, alumina, clay, aluminum hydroxide, or mica; extender oils; processing aids; antioxidants; and lubricants.

Examples of the sulfurs include powdered sulfur, precipitated sulfur, colloidal sulfur, insoluble sulfur, and highly dispersible sulfur. The amount of sulfur is preferably 0.1 to 15 parts by mass, more preferably 0.3 to 10 parts by mass, and still more preferably 0.5 to 5 parts by mass relative to 100 parts by mass of the rubber component.

Examples of the vulcanization accelerators include thiazole vulcanization accelerators, such as 2-mercaptobenzothiazole, dibenzothiazyl disulfide, or N-cyclohexyl-2-benzothiazyl sulfenamide; thiuram vulcanization accelerators, such as tetramethylthiuram monosulfide or tetramethylthiuram disulfide; sulfenamide vulcanization accelerators, such as N-cyclohexyl-2-benzothiazole sulfenamide, N-t-butyl-2-benzothiazole sulfenamide, N-oxyethylene-2-benzothiazole sulfenamide, N-oxyethylene-2-benzothiazole sulfenamide, or N,N'-diisopropyl-2-benzothiazole sulfenamide; and guanidine vulcanization accelerators, such as diphenylguanidine, diorthotolylguanidine, or orthotolylbiguanidine. The amount of vulcanization accelerator is preferably 0.1 to 5 parts by mass, and more preferably 0.2 to 3 parts by mass relative to 100 parts by mass of the rubber component.

The carbon black may be furnace black, acetylene black, thermal black, channel black, graphite or the like. Examples of the carbon blacks include channel carbon black, such as EPC, MPC, or CC; furnace carbon black, such as SAF, ISAF, HAF, MAF, FEF, SRF, GPF, APF, FF, CF, SCF, or ECF; thermal carbon black, such as FT or MT; and acetylene carbon black. One or more kinds of these may be used.

The carbon black has a nitrogen adsorption specific surface area ($N_2SA$) of preferably 5 to 200 $m^2/g$ and a dibutyl phthalate (DBP) absorption of preferably 5 to 300 ml/100 g. The nitrogen adsorption specific surface area is measured in accordance with ASTM D4820-93. The DBP absorption is measured in accordance with ASTM D2414-93. Examples of commercially available carbon blacks include Diablack N339 (trade name) produced by Mitsubishi Chemical Corporation, Seast 6, Seast 7HM, and Seast KH (trade names) produced by Tokai Carbon Co., Ltd., and CK3, Special Black 4A (trade names) produced by Degussa.

The amount of carbon black relative to 100 parts by mass of the rubber component is preferably 1 to 50 parts by mass. For enhanced abrasion resistance and strength, the amount is more preferably 3 parts by mass or more, and still more preferably 4 parts by mass or more. For enhanced fuel economy, the amount is more preferably 30 parts by mass or less, and still more preferably 10 parts by mass or less.

The amount of reinforcing agent relative to 100 parts by mass of the rubber component is preferably 10 to 150 parts by mass. For enhanced abrasion resistance and strength, the amount is more preferably 20 parts by mass or more, and still more preferably 30 parts by mass or more. For enhanced fuel economy, the amount is more preferably 120 parts by mass or less, and still more preferably 100 parts by mass or less.

Moreover, the mass ratio of the amount of silica to the amount of carbon black, which are used as reinforcing agents, [(the amount of silica):(the amount of carbon black)] is preferably 2:1 to 50:1. For enhanced fuel economy and reinforcement, the mass ratio is more preferably 5:1 to 20:1.

Examples of the extender oils include aromatic mineral oil (viscosity gravity constant (V. G. C. value): 0.900 to 1.049), naphthenic mineral oil (V. G. C. value: 0.850 to 0.899), and paraffinic mineral oil (V. G. C. value: 0.790 to 0.849). The extender oil preferably has a polycyclic aromatic content of less than 3% by mass, and more preferably less than 1% by mass. The polycyclic aromatic content is measured in accordance with the Institute of Petroleum (IP, U.K.) 346/92 method. The extender oil preferably has an aromatic compound content (CA) of 20% by mass or more. One or more kinds of these extender oils may be used.

The rubber compositions of the present invention may be prepared according to a known method, such as, for example, by kneading components with a known mixer, such as a roll mill or a Banbury mixer.

With regard to the kneading conditions when additives other than vulcanizing agents and vulcanization accelerators are mixed, the kneading temperature is usually 50 to 200° C., preferably 80 to 190° C., and the kneading time is usually 30 seconds to 30 minutes, preferably 1 minute to 30 minutes. When a vulcanizing agent and a vulcanization accelerator are mixed, the kneading temperature is usually 100° C. or lower, and preferably ranges from room temperature to 80° C. The composition containing a vulcanizing agent and a vulcanization accelerator is usually used after it is vulcanized by press vulcanization or the like. The vulcanization temperature is usually 120 to 200° C., and preferably 140 to 180° C.

The rubber compositions of the present invention can offer well-balanced, high levels of fuel economy, wet grip performance, and abrasion resistance.

The rubber compositions of the present invention are used in treads (cap treads) for tires.

The pneumatic tires of the present invention can be formed from the rubber compositions by a conventional method. Specifically, the unvulcanized rubber composition optionally containing various additives is extruded and processed into the shape of a tread for tires, and then formed in a conventional manner on a tire building machine and assembled with other tire components to build a raw tire. Then, the raw tire is heated and pressed in a vulcanizer, whereby a pneumatic tire of the present invention can be formed.

The pneumatic tires of the present invention can be suitably used as tires for passenger vehicles.

Examples

The present invention is more specifically described by reference to, but not limited to, examples.
<Production of Copolymer 1>

A stainless steel polymerization reactor (internal volume: 20 L) equipped with a stirring device was cleaned and dried, and the interior of the reactor was purged with dry nitrogen. Then 10.2 kg of industrial hexane (density 680 kg/m³), 608 g of 1,3-butadiene, 192 g of styrene, 2.06 g of 4-N,N-dimethylaminomethylstyrene, 6.1 ml of tetrahydrofuran, and 4.0 ml of ethylene glycol diethyl ether were charged into the polymerization reactor. Next, 2.74 g of bis(diethylamino)methylvinylsilane and a solution of n-butyllithium in n-hexane (n-butyllithium content: 15.90 mmol) were charged into the polymerization reactor and a polymerization reaction was initiated.

The copolymerization reaction of 1,3-butadiene, styrene, 4-N,N-dimethylaminomethylstyrene, and bis(diethylamino)methylvinylsilane was performed for 3 hours at a stirring rate of 130 rpm and a temperature within the polymerization reactor of 65° C. while 1,3-butadiene and styrene were continuously fed into the polymerization reactor. The amount of 1,3-butadiene fed was 912 g, and the amount of styrene fed was 288 g. Based on the total amount of monomers charged and fed into the polymerization reactor, the amount of 4-N,N-dimethylaminomethylstyrene was 0.10% by mass, and the amount of bis(diethylamino)methylvinylsilane was 0.14% by mass.

The resulting polymerization reaction solution was then stirred at a stirring rate of 130 rpm, followed by adding 12.80 mmol of N-(3-dimethylaminopropyl)acrylamide and stirring the mixture for 15 minutes.

To the polymer solution was added 20 ml of a hexane solution containing 0.8 ml of methanol, and the resulting polymer solution was stirred for 5 minutes. Thereafter, to the polymer solution were added 8.0 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.), and 4.0 g of pentaerythrityl tetrakis(3-laurylthiopropionate) (trade name: Sumilizer TP-D, produced by Sumitomo Chemical Co., Ltd.). Then the polymer solution was evaporated at an ordinary temperature over 24 hours, and further dried at 55° C. for 12 hours under reduced pressure to obtain a copolymer 1.

<Production of Copolymer 2>

A stainless steel polymerization reactor (internal volume: 20 L) equipped with a stirring device was cleaned and dried, and the interior of the reactor was purged with dry nitrogen. Then 10.2 kg of industrial hexane (density 680 kg/m$^3$), 608 g of 1,3-butadiene, 192 g of styrene, 2.04 g of 4-N,N-dimethylaminomethylstyrene, 6.1 ml of tetrahydrofuran, and 4.1 ml of ethylene glycol diethyl ether were charged into the polymerization reactor. Next, a n-hexane solution containing 15.89 mmol of n-butyllithium was charged into the polymerization reactor and a polymerization reaction was initiated.

The copolymerization reaction of 1,3-butadiene, styrene, and 4-N,N-dimethylaminomethylstyrene was performed for 3 hours at a stirring rate of 130 rpm and a temperature within the polymerization reactor of 65° C. while 1,3-butadiene and styrene were continuously fed into the polymerization reactor. The amount of 1,3-butadiene fed was 912 g, and the amount of styrene fed was 288 g. Based on the total amount of monomers charged and fed into the polymerization reactor, the amount of 4-N,N-dimethylaminomethylstyrene was 0.10% by mass.

To the polymer solution was added 20 ml of a hexane solution containing 0.8 ml of methanol, and the resulting polymer solution was stirred for 5 minutes. Thereafter, to the polymer solution were added 8.0 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.), and 4.0 g of pentaerythrityl tetrakis(3-laurylthiopropionate) (trade name: Sumilizer TP-D, produced by Sumitomo Chemical Co., Ltd.). Then the polymer solution was evaporated at an ordinary temperature over 24 hours, and further dried at 55° C. for 12 hours under reduced pressure to obtain a copolymer 2.

<Production of Copolymer 3>

A stainless steel polymerization reactor (internal volume: 20 L) equipped with a stirring device was cleaned and dried, and the interior of the reactor was purged with dry nitrogen. Then 10.2 kg of industrial hexane (density 680 kg/m$^3$), 608 g of 1,3-butadiene, 192 g of styrene, 6.1 ml of tetrahydrofuran, and 4.4 ml of ethylene glycol diethyl ether were charged into the polymerization reactor. Next, 2.63 g of bis(diethylamino)methylvinylsilane and a solution of n-butyllithium in n-hexane (n-butyllithium content: 14.68 mmol) were charged into the polymerization reactor and a polymerization reaction was initiated.

The copolymerization reaction of 1,3-butadiene, styrene, and bis(diethylamino)methylvinylsilane was performed for 3 hours at a stirring rate of 130 rpm and a temperature within the polymerization reactor of 65° C. while 1,3-butadiene and styrene were continuously fed into the polymerization reactor. The amount of 1,3-butadiene fed was 912 g, and the amount of styrene fed was 288 g. Based on the total amount of monomers charged and fed into the polymerization reactor, the amount of bis(diethylamino)methylvinylsilane was 0.13% by mass.

To the polymer solution was added 20 ml of a hexane solution containing 0.8 ml of methanol, and the resulting polymer solution was stirred for 5 minutes. Thereafter, to the polymer solution were added 8.0 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 4.0 g of pentaerythrityl tetrakis(3-laurylthiopropionate) (trade name: Sumilizer TP-D, produced by Sumitomo Chemical Co., Ltd.). Then the polymer solution was evaporated at an ordinary temperature over 24 hours, and further dried at 55° C. for 12 hours under reduced pressure to obtain a copolymer 3.

<Production of Copolymer 4>

A stainless steel polymerization reactor (internal volume: 20 L) was cleaned and dried, and the interior of the reactor was purged with dry nitrogen. Then 10.2 kg of industrial hexane (density 680 kg/m$^3$), 547 g of 1,3-butadiene, 173 g of styrene, 6.07 ml of tetrahydrofuran, and 4.12 ml of ethylene glycol diethyl ether were charged into the polymerization reactor. Next, a n-hexane solution containing 13.31 mmol of n-butyllithium was charged into the polymerization reactor and a polymerization reaction was initiated.

The copolymerization reaction of 1,3-butadiene and styrene was performed for 3 hours at a stirring rate of 130 rpm and a temperature within the polymerization reactor of 65° C. while 1,3-butadiene and styrene were continuously fed into the polymerization reactor. The amount of 1,3-butadiene fed was 821 g, and the amount of styrene fed was 259 g.

The resulting polymerization reaction solution was then stirred at a stirring rate of 130 rpm, followed by adding 11.25 mmol of N-(3-dimethylaminopropyl)acrylamide and stirring the mixture for 15 minutes.

To the polymerization reaction solution was added 20 ml of a hexane solution containing 1.12 ml of methanol, and the polymerization reaction solution was further stirred for 5 minutes.

To the polymer solution were added 8.0 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 4.0 g of pentaerythrityl tetrakis(3-laurylthiopropionate) (trade name: Sumilizer TP-D, produced by Sumitomo Chemical Co., Ltd.). Then the polymer solution was evaporated at an ordinary temperature over 24 hours, and further dried at 55° C. for 12 hours under reduced pressure to obtain a copolymer 4.

<Production of Copolymer 5>

A stainless steel polymerization reactor (internal volume: 20 L) equipped with a stirring device was cleaned and dried, and the interior of the reactor was purged with dry nitrogen. Then 10.2 kg of industrial hexane (density 680 kg/m$^3$), 608 g of 1,3-butadiene, 192 g of styrene, 3.37 g of 4-N,N-bis(trimethylsilyl)aminostyrene, 6.1 ml of tetrahydrofuran, and 4.0 ml of ethylene glycol diethyl ether were charged into the polymerization reactor. Next, 2.74 g of bis(diethylamino)methylvinylsilane and a solution of n-butyllithium in n-hexane (n-butyllithium content: 15.55 mmol) were charged into the polymerization reactor and a polymerization reaction was initiated.

The copolymerization reaction of 1,3-butadiene, styrene, 4-N,N-bis(trimethylsilyl)aminostyrene, and bis(diethylamino)methylvinylsilane was performed for 3 hours at a stirring rate of 130 rpm and a temperature within the polymerization reactor of 65° C. while 1,3-butadiene and styrene were continuously fed into the polymerization reactor. The amount of 1,3-butadiene fed was 912 g, and the amount of styrene fed was 288 g. Based on the total amount of monomers charged and fed into the polymerization reactor, the amount of 4-N,N-bis(trimethylsilyl)aminostyrene was 0.17% by mass, and the amount of bis(diethylamino)methylvinylsilane was 0.14% by mass.

The resulting polymerization reaction solution was then stirred at a stirring rate of 130 rpm, followed by adding 12.80 mmol of N-(3-dimethylaminopropyl)acrylamide and stirring the mixture for 15 minutes.

To the polymer solution was added 20 ml of a hexane solution containing 0.8 ml of methanol, and the resulting polymer solution was stirred for 5 minutes. Thereafter, to the polymer solution were added 8.0 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 4.0 g of pentaerythrityl tetrakis(3-laurylthiopropionate) (trade name: Sumilizer TP-D, produced by Sumitomo Chemical Co., Ltd.). Then the polymer solution was evaporated at an ordinary temperature over 24 hours, and further dried at 55° C. for 12 hours under reduced pressure to obtain a copolymer 5.

<Production of Copolymer 6>

A stainless steel polymerization reactor (internal volume: 5 L) equipped with a stirring device was cleaned and dried, and the interior of the reactor was purged with dry nitrogen. Then 2.55 kg of industrial hexane (density 680 kg/m$^3$), 137 g of 1,3-butadiene, 43 g of styrene, 0.70 g of 4-N,N-bis(trimethylsilyl)aminostyrene, 1.52 ml of tetrahydrofuran, and 1.18 ml of ethylene glycol diethyl ether were charged into the polymerization reactor. Next, a n-hexane solution containing 3.81 mmol of n-butyllithium was charged into the polymerization reactor and a polymerization reaction was initiated.

The copolymerization reaction of 1,3-butadiene, styrene, and 4-N,N-bis(trimethylsilyl)aminostyrene was performed for 2 hours at a stirring rate of 130 rpm and a temperature within the polymerization reactor of 65° C. while 1,3-butadiene and styrene were continuously fed into the polymerization reactor. The amount of 1,3-butadiene fed was 205 g, and the amount of styrene fed was 65 g. Based on the total amount of monomers charged and fed into the polymerization reactor, the amount of 4-N,N-bis(trimethylsilyl)aminostyrene was 0.16% by mass.

To the polymer solution was added 10 ml of a hexane solution containing 0.5 ml of methanol, and the resulting polymer solution was stirred for 5 minutes. Thereafter, to the polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then the polymer solution was evaporated at an ordinary temperature over 24 hours, and further dried at 55° C. for 12 hours under reduced pressure to obtain a copolymer 6.

<Production of Copolymer 7>

A stainless steel polymerization reactor (internal volume: 20 L) equipped with a stirring device was cleaned and dried, and the interior of the reactor was purged with dry nitrogen. Then 10.2 kg of industrial hexane (density 680 kg/m$^3$), 608 g of 1,3-butadiene, 192 g of styrene, 2.58 g of a mixture of 3-(1-pyrrolidinyl)ethylstyrene and 4-(1-pyrrolidinyl)ethylstyrene, 6.1 ml of tetrahydrofuran, and 4.1 ml of ethylene glycol diethyl ether were charged into the polymerization reactor. Next, 2.74 g of bis(diethylamino)methylvinylsilane and a solution of n-butyllithium in n-hexane (n-butyllithium content: 15.04 mmol) were charged into the polymerization reactor and a polymerization reaction was initiated.

The copolymerization reaction of 1,3-butadiene, styrene, 3-(1-pyrrolidinyl)ethylstyrene, 4-(1-pyrrolidinyl)ethylstyrene, and bis(diethylamino)methylvinylsilane was performed for 3 hours at a stirring rate of 130 rpm and a temperature within the polymerization reactor of 65° C. while 1,3-butadiene and styrene were continuously fed into the polymerization reactor. The amount of 1,3-butadiene fed was 912 g, and the amount of styrene fed was 288 g. Based on the total amount of monomers charged and fed into the polymerization reactor, the amount of the mixture of 3-(1-pyrrolidinyl)ethylstyrene and 4-(1-pyrrolidinyl)ethylstyrene was 0.13% by mass, and the amount of bis(diethylamino)methylvinylsilane was 0.14% by mass.

The resulting polymerization reaction solution was then stirred at a stirring rate of 130 rpm, followed by adding 12.8 mmol of [3-(diethylamino)propyl)trimethoxysilane and stirring the mixture for 15 minutes. To the resulting polymer solution was added 20 ml of a hexane solution containing 0.8 ml of methanol, and the polymer solution was further stirred for 5 minutes.

To the polymer solution were added 8.0 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 4.0 g of pentaerythrityl tetrakis(3-laurylthiopropionate) (trade name: Sumilizer TP-D, produced by Sumitomo Chemical Co., Ltd.). Then the polymer solution was evaporated at an ordinary temperature over 24 hours, and further dried at 55° C. for 12 hours under reduced pressure to obtain a copolymer 7.

<Production of Copolymer 8>

A stainless steel polymerization reactor (internal volume: 20 L) equipped with a stirring device was cleaned and dried, and the interior of the reactor was purged with dry nitrogen. Then 10.2 kg of hexane (density 680 kg/m$^3$), 574 g of 1,3-butadiene, 173 g of styrene, 6.1 ml of tetrahydrofuran, and 4.7 ml of ethylene glycol diethyl ether were charged into the polymerization reactor. Next, a n-hexane solution containing 15.38 mmol of n-butyllithium was charged into the polymerization reactor and a polymerization reaction was initiated.

The copolymerization reaction of 1,3-butadiene and styrene was performed for 3 hours at a stirring rate of 130 rpm and a temperature within the polymerization reactor of 65° C. while 1,3-butadiene and styrene were continuously fed into the polymerization reactor. The amount of 1,3-butadiene fed was 821 g, and the amount of styrene fed was 259 g.

The resulting polymer solution was then stirred at a stirring rate of 130 rpm, followed by adding 12.80 mmol of [3-(diethylamino)propyl]trimethoxysilane and stirring the mixture for 15 minutes. To the polymer solution was added 20 ml of a hexane solution containing 0.8 ml of methanol, and the resulting polymer solution was further stirred for 5 minutes.

To the polymer solution were added 8.0 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 4.0 g of pentaerythrityl tetrakis(3-laurylthiopropionate) (trade name: Sumilizer TP-D, produced by Sumitomo Chemical Co., Ltd.). Then the polymer solution was evaporated at an ordinary temperature over 24 hours, and further dried at 55° C. for 12 hours under reduced pressure to obtain a copolymer 8.

<Production of Copolymer 9>

A stainless steel polymerization reactor (internal volume: 20 L) equipped with a stirring device was cleaned and dried, and the interior of the reactor was purged with dry nitrogen. Then 10.2 kg of industrial hexane (density 680 kg/m$^3$), 608 g of 1,3-butadiene, 192 g of styrene, 6.1 ml of tetrahydrofuran, and 4.4 ml of ethylene glycol diethyl ether were charged into the polymerization reactor. Next, 2.63 g of bis(diethylamino)methylvinylsilane and a solution of n-butyllithium in n-hexane (n-butyllithium content: 14.68 mmol) were charged into the polymerization reactor and a polymerization reaction was initiated.

The copolymerization reaction of 1,3-butadiene, styrene, and bis(diethylamino)methylvinylsilane was performed for 3 hours at a stirring rate of 130 rpm and a temperature within the polymerization reactor of 65° C. while 1,3-butadiene and styrene were continuously fed into the polymerization reactor. The amount of 1,3-butadiene fed was 912 g, and the amount of styrene fed was 288 g. Based on the total amount of monomers charged and fed into the polymerization reactor, the amount of bis(diethylamino)methylvinylsilane was 0.13% by mass.

To the polymer solution was added 20 ml of a hexane solution containing 0.8 ml of methanol, and the resulting polymer solution was stirred for 5 minutes. Thereafter, to the polymer solution were added 8.0 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 4.0 g of pentaerythrityl tetrakis(3-laurylthiopropionate) (trade name: Sumilizer TP-D, produced by Sumitomo Chemical Co., Ltd.). Then the polymer solution was evaporated at an ordinary temperature over 24 hours, and further dried at 55° C. for 12 hours under reduced pressure to obtain a copolymer 9.

<Production of Copolymer 10>

A stainless steel polymerization reactor (internal volume: 5 L) equipped with a stirring device was cleaned and dried, and the interior of the reactor was purged with dry nitrogen. Then 2.55 kg of industrial hexane (density 680 kg/m$^3$), 137 g of 1,3-butadiene, 43 g of styrene, 0.53 g of a mixture of 3-(1-pyrrolidinyl)ethylstyrene and 4-(1-pyrrolidinyl)ethylstyrene, 1.52 ml of tetrahydrofuran, and 1.18 ml of ethylene glycol diethyl ether were charged into the polymerization reactor. Next, a n-hexane solution containing 3.73 mmol of n-butyllithium was charged into the polymerization reactor and a polymerization reaction was initiated.

The copolymerization reaction of 1,3-butadiene, styrene, 3-(1-pyrrolidinyl)ethylstyrene, and 4-(1-pyrrolidinyl)ethylstyrene was performed for 2 hours at a stirring rate of 130 rpm and a temperature within the polymerization reactor of 65° C. while 1,3-butadiene and styrene were continuously fed into the polymerization reactor. The amount of 1,3-butadiene fed was 205 g, and the amount of styrene fed was 65 g. Based on the total amount of monomers charged and fed into the polymerization reactor, the amount of the mixture of 3-(1-pyrrolidinyl)ethylstyrene and 4-(1-pyrrolidinyl)ethylstyrene was 0.12% by mass.

To the polymer solution was added 20 ml of a hexane solution containing 0.8 ml of methanol, and the resulting polymer solution was stirred for 5 minutes. Thereafter, to the polymer solution were added 8.0 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 4.0 g of pentaerythrityl tetrakis(3-laurylthiopropionate) (trade name: Sumilizer TP-D, produced by Sumitomo Chemical Co., Ltd.). Then the polymer solution was evaporated at an ordinary temperature over 24 hours, and further dried at 55° C. for 12 hours under reduced pressure to obtain a copolymer 10.

<Production of Copolymer 11>

A stainless steel polymerization reactor (internal volume: 20 L) equipped with a stirring device was cleaned and dried, and the interior of the reactor was purged with dry nitrogen. Then 10.2 kg of industrial hexane (density 680 kg/m$^3$), 608 g of 1,3-butadiene, 192 g of styrene, 1.41 g of 4-vinylpyridine, 6.1 ml of tetrahydrofuran, and 4.0 ml of ethylene glycol diethyl ether were charged into the polymerization reactor. Next, 2.88 g of bis(diethylamino)methylvinylsilane and a solution of n-butyllithium in n-hexane (n-butyllithium content: 17.84 mmol) were charged into the polymerization reactor and a polymerization reaction was initiated.

The copolymerization reaction of 1,3-butadiene, styrene, 4-vinylpyridine, and bis(diethylamino)methylvinylsilane was performed for 3 hours at a stirring rate of 130 rpm and a temperature within the polymerization reactor of 65° C. while 1,3-butadiene and styrene were continuously fed into the polymerization reactor. The amount of 1,3-butadiene fed was 912 g, and the amount of styrene fed was 288 g.

Based on the total amount of monomers charged and fed into the polymerization reactor, the amount of 4-vinylpyridine was 0.07% by mass, and the amount of bis(diethylamino)methylvinylsilane was 0.14% by mass.

The resulting polymerization reaction solution was then stirred at a stirring rate of 130 rpm, followed by adding 13.4 mmol of [3-(diethylamino)propyl]-trimethoxysilane and further stirring the mixture for 15 minutes. Then 20 ml of a hexane solution containing 0.8 ml of methanol was added to the polymer solution, and the resulting polymer solution was further stirred for 5 minutes.

To the polymer solution were added 8.0 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 4.0 g of pentaerythrityl tetrakis(3-laurylthiopropionate) (trade name: Sumilizer TP-D, produced by Sumitomo Chemical Co., Ltd.). Then the polymer solution was evaporated at an ordinary temperature over 24 hours, and further dried at 55° C. for 12 hours under reduced pressure to obtain a copolymer 11.

<Production of Copolymer 12>

A stainless steel polymerization reactor (internal volume: 20 L) equipped with a stirring device was cleaned and dried, and the interior of the reactor was purged with dry nitrogen. Then 10.2 kg of industrial hexane (density 680 kg/m$^3$), 608 g of 1,3-butadiene, 192 g of styrene, 1.41 g of 4-vinylpyridine, 6.1 ml of tetrahydrofuran, and 4.0 ml of ethylene glycol diethyl ether were charged into the polymerization reactor. Next, a n-hexane solution containing 18.52 mmol of n-butyllithium was charged into the polymerization reactor and a polymerization reaction was initiated.

The copolymerization reaction of 1,3-butadiene, styrene, and 4-vinylpyridine was performed for 3 hours at a stirring rate of 130 rpm and a temperature within the polymerization reactor of 65° C. while 1,3-butadiene and styrene were continuously fed into the polymerization reactor. The amount of 1,3-butadiene fed was 912 g, and the amount of styrene fed was 288 g. Based on the total amount of monomers charged and fed into the polymerization reactor, the amount of 4-vinylpyridine was 0.07% by mass.

To the polymer solution was added 20 ml of a hexane solution containing 0.8 ml of methanol, and the resulting polymer solution was stirred for 5 minutes. Thereafter, to the polymer solution were added 8.0 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 4.0 g of pentaerythrityl tetrakis(3-laurylthiopropionate) (trade name: Sumilizer TP-D, produced by Sumitomo Chemical Co., Ltd.). Then the polymer solution was evaporated at an ordinary temperature over 24 hours, and further dried at 55° C. for 12 hours under reduced pressure to obtain a copolymer 12.

<Production of Copolymer 13>

A stainless steel polymerization reactor (internal volume: 5 L) equipped with a stirring device was cleaned and dried, and the interior of the reactor was purged with dry nitrogen. Then 2.55 kg of industrial hexane (density 680 kg/m$^3$), 137 g of 1,3-butadiene, 43 g of styrene, 0.53 g of a mixture of 3-(1-pyrrolidinyl)ethylstyrene and 4-(1-pyrrolidinyl)ethylstyrene, 1.52 ml of tetrahydrofuran, and 1.18 ml of ethylene glycol diethyl ether were charged into the polymerization reactor. Next, 0.64 g of bis(diethylamino)methylvinylsilane and a solution of n-butyllithium in n-hexane (n-butyllithium content: 3.98 mmol) were charged into the polymerization reactor and a polymerization reaction was initiated.

The copolymerization reaction of 1,3-butadiene, styrene, bis(diethylamino)methylvinylsilane, 3-(1-pyrrolidinyl)ethylstyrene, and 4-(1-pyrrolidinyl)ethylstyrene was performed for 2 hours at a stirring rate of 130 rpm and a temperature within the polymerization reactor of 65° C. while 1,3-butadiene and styrene were continuously fed into the polymerization reactor. The amount of 1,3-butadiene fed was 205 g, and the amount of styrene fed was 65 g. Based on the total amount of monomers charged and fed into the polymerization reactor, the amount of the mixture of 3-(1-pyrrolidinyl)ethylstyrene and 4-(1-pyrrolidinyl)ethylstyrene was 0.12% by mass, and the amount of bis(diethylamino)methylvinylsilane was 0.14% by mass.

To the polymer solution was added 10 ml of a hexane solution containing 0.5 ml of methanol, and the resulting polymer solution was stirred for 5 minutes. Thereafter, to the polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then the polymer solution was evaporated at an ordinary temperature over 24 hours, and further dried at 55° C. for 12 hours under reduced pressure to obtain a copolymer 13.

<Production of Copolymer 14>

A stainless steel polymerization reactor (internal volume: 5 L) equipped with a stirring device was cleaned and dried, and the interior of the reactor was purged with dry nitrogen. Then 2.55 kg of industrial hexane (density 680 kg/m$^3$), 137 g of 1,3-butadiene, 43 g of styrene, 0.43 g of 4-N,N-dimethylaminomethylstyrene, 1.52 ml of tetrahydrofuran, and 1.18 ml of ethylene glycol diethyl ether were charged into the polymerization reactor. Next, 0.64 g of bis(diethylamino)methylvinylsilane and a solution of n-butyllithium in n-hexane (n-butyllithium content: 3.59 mmol) were charged into the polymerization reactor and a polymerization reaction was initiated.

The copolymerization reaction of 1,3-butadiene, styrene, bis(diethylamino)methylvinylsilane, and 4-N,N-dimethylaminomethylstyrene was performed for 2 hours at a stirring rate of 130 rpm and a temperature within the polymerization reactor of 65° C. while 1,3-butadiene and styrene were continuously fed into the polymerization reactor. The amount of 1,3-butadiene fed was 205 g, and the amount of styrene fed was 65 g. Based on the total amount of monomers charged and fed into the polymerization reactor, the amount of 4-N,N-dimethylaminomethylstyrene was 0.10% by mass, and the amount of bis(diethylamino)methylvinylsilane was 0.14% by mass.

To the polymer solution was added 10 ml of a hexane solution containing 0.5 ml of methanol, and the resulting polymer solution was stirred for 5 minutes. Thereafter, to the polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then the polymer solution was evaporated at an ordinary temperature over 24 hours, and further dried at 55° C. for 12 hours under reduced pressure to obtain a copolymer 14.

<Production of Copolymer 15>

A stainless steel polymerization reactor (internal volume: 5 L) equipped with a stirring device was cleaned and dried, and the interior of the reactor was purged with dry nitrogen. Then 2.55 kg of industrial hexane (density 680 kg/m$^3$), 137 g of 1,3-butadiene, 43 g of styrene, 1.52 ml of tetrahydrofuran, 1.18 ml of ethylene glycol diethyl ether, and 0.70 g of 4-N,N-bis(trimethylsilyl)aminostyrene were charged into the polymerization reactor. Next, a n-hexane solution containing 3.81 mmol of n-butyllithium was charged into the polymerization reactor and a polymerization reaction was initiated.

The copolymerization reaction of 1,3-butadiene, styrene, and 4-N,N-bis(trimethylsilyl)aminostyrene was performed for 2 hours at a stirring rate of 130 rpm and a temperature within the polymerization reactor of 65° C. while 1,3-butadiene and styrene were continuously fed into the polymerization reactor. The amount of 1,3-butadiene fed was 205 g, and the amount of styrene fed was 65 g. Based on the total amount of monomers charged and fed into the polymerization reactor, the amount of 4-N,N-bis(trimethylsilyl)aminostyrene was 0.16% by mass.

To the polymer solution was added 10 ml of a hexane solution containing 0.5 ml of methanol, and the resulting polymer solution was stirred for 5 minutes. Thereafter, to the polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then the polymer solution was evaporated at an ordinary temperature over 24 hours, and further dried at 55° C. for 12 hours under reduced pressure to obtain a copolymer 15.

The obtained copolymers 1 to 15 were analyzed by the methods mentioned below. Tables 1 to 3 show the results.

<Mooney Viscosity ($ML_{1+4}$)>

The Mooney viscosity of each copolymer was measured at 100° C. in accordance with JIS K6300 (1994).

<Vinyl Content (in Mol %)>

The vinyl content of each copolymer was determined from an absorption intensity at around 910 $cm^{-1}$, which is an absorption peak of a vinyl group, by infrared spectrometry.

<Styrene Content (in Mass %)>

The styrene content of each copolymer was determined from a refractive index in accordance with JIS K6383 (1995).

<Molecular Weight Distribution (Mw/Mn)>

The weight average molecular weight (Mw) and the number average molecular weight (Mn) were determined by gel permeation chromatography (GPC) under the following conditions (1) to (8) to determine the molecular weight distribution (Mw/Mn) of each copolymer.

(1) Apparatus: HLC-8220 produced by Tosoh Corporation
(2) Separation column: HM-H (two in series) produced by Tosoh Corporation
(3) Measurement temperature: 40° C.
(4) Carrier: tetrahydrofuran
(5) Flow rate: 0.6 mL/minute
(6) Injection amount: 5 μL
(7) Detector: differential refractometry
(8) Molecular weight standards: polystyrene standards

TABLE 1

|  | Copolymer | | | | | |
| --- | --- | --- | --- | --- | --- | --- |
|  | 1 | 2 | 3 | 4 | 5 | 6 |
| Mooney viscosity | 38 | 39 | 41 | 41 | 39 | 50 |
| Vinyl content (mol %) | 56 | 58 | 58 | 57 | 57 | 59 |
| Styrene content (mass %) | 25 | 25 | 24 | 24 | 25 | 24 |
| Mw/Mn | 1.2 | 1.1 | 1.1 | 1.1 | 1.1 | 1.1 |

TABLE 2

|  | Copolymer | | | | | |
| --- | --- | --- | --- | --- | --- | --- |
|  | 7 | 8 | 9 | 10 | 11 | 12 |
| Mooney viscosity | 52 | 49 | 41 | 41 | 47 | 36 |
| Vinyl content (mol %) | 57 | 58 | 57 | 59 | 57 | 57 |
| Styrene content (mass %) | 25 | 24 | 24 | 24 | 25 | 25 |
| Mw/Mn | 1.2 | 1.2 | 1.1 | 1.1 | 1.2 | 1.1 |

TABLE 3

|  | Copolymer | | |
| --- | --- | --- | --- |
|  | 13 | 14 | 15 |
| Mooney viscosity | 53 | 51 | 50 |
| Vinyl content (mol %) | 58 | 59 | 60 |
| Styrene content (mass %) | 23 | 24 | 26 |
| Mw/Mn | 1.1 | 1.2 | 1.0 |

The chemicals used in examples and comparative examples are listed below.

NR: RSS#3
BR: Ubepol BR150B produced by Ube Industries, Ltd.
Copolymers 1 to 15: prepared as above
Carbon black: Diablack N220 ($N_2SA$: 111 $m^2$/g, DBP absorption: 115 ml/100 g) produced by Mitsubishi Chemical Corporation
Silica: Ultrasil VN3 ($N_2SA$: 175 $m^2$/g) produced by Degussa
Silane coupling agent 1: NXT-Z45 (copolymer of linking unit A and linking unit B (linking unit A: 55 mol %, linking unit B: 45 mol %)) produced by Momentive
Silane coupling agent 2: Si363 (compound represented by the following formula, mercapto group content: 3.3%) produced by Degussa

[Chem. 64]

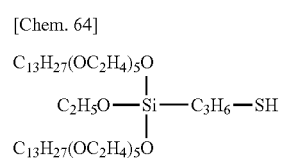

Silane coupling agent 3: Si69 (bis(3-triethoxysilylpropyl) tetrasulfide) produced by Degussa
Antioxidant: Antigene 3C produced by Sumitomo Chemical Co., Ltd.
Wax: Sunnoc N produced by Ouchi Shinko Chemical Industrial Co., Ltd.
Oil: X-140 produced by JX Nippon Oil & Energy Corporation
Stearic acid: stearic acid beads "Tsubaki" produced by NOF Corporation
Zinc oxide: Zinc oxide #1 produced by Mitsui Mining and Smelting Co., Ltd.
Sulfur: powdered sulfur produced by Tsurumi Chemical Industry Co., Ltd.
Vulcanization accelerator CZ: Soxinol CZ produced by Sumitomo Chemical Co., Ltd.
Vulcanization accelerator D: Soxinol D produced by Sumitomo Chemical Co., Ltd.

Examples and Comparative Examples

The materials in formulation amounts shown in Table 4 to 6, except the sulfur and the vulcanization accelerators, were kneaded in a 1.7-L Banbury mixer (produced by Kobe Steel, Ltd.) at a temperature of 150° C. for 5 minutes to obtain a kneaded mixture. Then, the sulfur and vulcanization accelerators were added to the kneaded mixture, and they were kneaded using an open roll mill at a temperature of 80° C. for 5 minutes, thereby providing an unvulcanized rubber composition. The unvulcanized rubber composition was press-vulcanized in a mold having a thickness of 0.5 mm at a temperature of 170° C. for 20 minutes to provide a vulcanized rubber composition.

Separately, the unvulcanized rubber composition was formed into a tread, which was then assembled with other tire components on a tire building machine to build a raw tire. The raw tire was vulcanized at a temperature of 170° C. for 12 minutes to prepare a test tire (size: 195/65R15).

The vulcanized rubber compositions and test tires thus prepared were evaluated by the tests mentioned below. Tables 4 to 6 show the results. Comparative Example 1 is taken as a standard comparative example in Table 4; Comparative Example 15 is taken as a standard comparative example in Table 5; and Comparative Example 31 is taken as a standard comparative example in Table 6.

<Evaluation Items and Test Methods>
<Rolling Resistance>

The rolling resistance was measured using a rolling resistance tester by running each test tire mounted on a 15×6 JJ rim at an internal pressure of 230 kPa, a load of 3.43 kN, and a speed of 80 km/h. The result is expressed as an index relative to that of the standard comparative example (=100). Higher indices indicate smaller rolling resistances, which in turn indicate better fuel economy.

<Wet Grip Performance>

The test tires of each example were mounted on all the wheels of a vehicle (domestic front-engine, front-wheel-drive (FF) vehicle, 2000 cc). The braking distance from an initial speed of 100 km/h was determined on a wet asphalt road. The result is expressed as an index. Higher indices indicate better wet-skid performance (wet-grip performance). The indices were calculated according to the following equation.

(Wet grip performance index)=(Braking distance in standard comparative example)/(Braking distance in each formulation)×100

<Abrasion Resistance>

The volume loss of each vulcanized rubber composition was measured using a laboratory abrasion and skid tester (LAT tester) at a load of 50 N, a speed of 20 km/h, and a slip angle of 5°. The values (abrasion resistance indices) in Tables 4 to 6 are relative to the volume loss of the standard comparative example (=100). Higher indices indicate better abrasion resistance.

TABLE 4

|  |  | Example | | | | Comparative Example | | | | | |
|---|---|---|---|---|---|---|---|---|---|---|---|
|  |  | 1 | 2 | 3 | 4 | 1 | 2 | 3 | 4 | 5 | 6 |
| Formulation (parts by mass) | NR | 20 | 20 | 20 | 20 | 20 | 20 | 20 | 20 | 20 | 20 |
|  | BR | 20 | 20 | 20 | 20 | 20 | 20 | 20 | 20 | 20 | 20 |
|  | Copolymer 1 | 60 | 60 | — | — | — | — | — | — | — | 60 |
|  | Copolymer 2 | — | — | — | — | — | — | — | 60 | — | — |
|  | Copolymer 3 | — | — | — | — | — | — | 60 | — | — | — |
|  | Copolymer 4 | — | — | — | — | — | 60 | — | — | — | — |
|  | Copolymer 5 | — | — | 60 | 60 | — | — | — | — | 60 | — |
|  | Copolymer 6 | — | — | — | — | 60 | — | — | — | — | — |
|  | Carbon black | 5 | 5 | 5 | 5 | 5 | 5 | 5 | 5 | 5 | 5 |
|  | Silica | 75 | 75 | 75 | 75 | 75 | 75 | 75 | 75 | 75 | 75 |
|  | Silane coupling agent 1 (NXT-Z45) | 3 | — | 3 | — | — | — | — | — | — | — |
|  | Silane coupling agent 2 (Si363) | — | 6 | — | 6 | — | — | — | — | — | — |
|  | Silane coupling agent 3 (Si69) | — | — | — | — | 6 | 6 | 6 | 6 | 6 | 6 |
|  | Antioxidant | 2 | 2 | 2 | 2 | 2 | 2 | 2 | 2 | 2 | 2 |
|  | Wax | 2 | 2 | 2 | 2 | 2 | 2 | 2 | 2 | 2 | 2 |
|  | Oil | 20 | 20 | 20 | 20 | 20 | 20 | 20 | 20 | 20 | 20 |
|  | Stearic acid | 2 | 2 | 2 | 2 | 2 | 2 | 2 | 2 | 2 | 2 |
|  | Zinc oxide | 2 | 2 | 2 | 2 | 2 | 2 | 2 | 2 | 2 | 2 |
|  | Sulfur | 1.5 | 1.5 | 1.5 | 1.5 | 1.5 | 1.5 | 1.5 | 1.5 | 1.5 | 1.5 |
|  | Vulcanization accelerator CZ | 1.5 | 1.5 | 1.5 | 1.5 | 1.5 | 1.5 | 1.5 | 1.5 | 1.5 | 1.5 |
|  | Vulcanization accelerator D | 1 | 1 | 1 | 1 | 1 | 1 | 1 | 1 | 1 | 1 |
| Evaluation | Rolling resistance index | 176 | 173 | 186 | 183 | 100 | 80 | 100 | 65 | 154 | 116 |
|  | Wet grip performance index | 145 | 144 | 156 | 152 | 100 | 85 | 99 | 68 | 152 | 118 |
|  | Abrasion resistance index | 110 | 109 | 118 | 116 | 100 | 96 | 98 | 93 | 105 | 100 |

|  |  | Comparative Example | | | | | | | |
|---|---|---|---|---|---|---|---|---|---|
|  |  | 7 | 8 | 9 | 10 | 11 | 12 | 13 | 14 |
| Formulation (parts by mass) | NR | 20 | 20 | 20 | 20 | 20 | 20 | 20 | 20 |
|  | BR | 20 | 20 | 20 | 20 | 20 | 20 | 20 | 20 |
|  | Copolymer 1 | — | — | — | — | — | — | — | — |
|  | Copolymer 2 | 60 | 60 | — | — | — | — | — | — |
|  | Copolymer 3 | — | — | 60 | 60 | — | — | — | — |
|  | Copolymer 4 | — | — | — | — | 60 | 60 | — | — |
|  | Copolymer 5 | — | — | — | — | — | — | — | — |
|  | Copolymer 6 | — | — | — | — | — | — | 60 | 60 |
|  | Carbon black | 5 | 5 | 5 | 5 | 5 | 5 | 5 | 5 |
|  | Silica | 75 | 75 | 75 | 75 | 75 | 75 | 75 | 75 |
|  | Silane coupling agent 1 (NXT-Z45) | 3 | — | 3 | — | 3 | — | 3 | — |
|  | Silane coupling agent 2 (Si363) | — | 6 | — | 6 | — | 6 | — | 6 |
|  | Silane coupling agent 3 (Si69) | — | — | — | — | — | — | — | — |
|  | Antioxidant | 2 | 2 | 2 | 2 | 2 | 2 | 2 | 2 |
|  | Wax | 2 | 2 | 2 | 2 | 2 | 2 | 2 | 2 |
|  | Oil | 20 | 20 | 20 | 20 | 20 | 20 | 20 | 20 |
|  | Stearic acid | 2 | 2 | 2 | 2 | 2 | 2 | 2 | 2 |
|  | Zinc oxide | 2 | 2 | 2 | 2 | 2 | 2 | 2 | 2 |
|  | Sulfur | 1.5 | 1.5 | 1.5 | 1.5 | 1.5 | 1.5 | 1.5 | 1.5 |
|  | Vulcanization accelerator CZ | 1.5 | 1.5 | 1.5 | 1.5 | 1.5 | 1.5 | 1.5 | 1.5 |
|  | Vulcanization accelerator D | 1 | 1 | 1 | 1 | 1 | 1 | 1 | 1 |
| Evaluation | Rolling resistance index | 80 | 76 | 98 | 95 | 89 | 85 | 110 | 103 |
|  | Wet grip performance index | 76 | 67 | 96 | 94 | 87 | 81 | 109 | 102 |
|  | Abrasion resistance index | 89 | 78 | 96 | 91 | 86 | 81 | 102 | 101 |

As shown in Table 4, the rubber compositions of the examples that include a conjugated diene polymer (A) (copolymer 1 or 5) containing specific monomer units and having an end modified by a specific compound (compound (G)); silica; and a silane coupling agent containing a mercapto group (silane coupling agent 1 or 2) show synergistic improvements in fuel economy, wet grip performance, and abrasion resistance and thus achieve high levels of these properties in a balanced manner, as compared with the rubber compositions of the comparative examples.

As shown in Table 5, the rubber compositions of the examples that include a conjugated diene polymer (A) (copolymer 7 or 11) containing specific monomer units and having an end modified by a specific compound (alkoxysilane compound); silica; and a silane coupling agent containing a mercapto group (silane coupling agent 1 or 2) show synergistic improvements in fuel economy, wet grip performance, and abrasion resistance and thus achieve high levels of these properties in a balanced manner, as compared with the rubber compositions of the comparative examples.

TABLE 5

|  |  | Example |  |  |  | Comparative Example |  |  |  |  |  |
|---|---|---|---|---|---|---|---|---|---|---|---|
|  |  | 5 | 6 | 7 | 8 | 15 | 16 | 17 | 18 | 19 | 20 |
| Formulation (parts by mass) | NR | 20 | 20 | 20 | 20 | 20 | 20 | 20 | 20 | 20 | 20 |
|  | BR | 20 | 20 | 20 | 20 | 20 | 20 | 20 | 20 | 20 | 20 |
|  | Copolymer 7 | 60 | 60 | — | — | — | 60 | — | — | — | — |
|  | Copolymer 11 | — | — | 60 | 60 | — | — | 60 | — | — | — |
|  | Copolymer 8 | — | — | — | — | — | — | — | 60 | — | — |
|  | Copolymer 9 | — | — | — | — | — | — | — | — | 60 | — |
|  | Copolymer 10 | — | — | — | — | — | — | — | — | — | 60 |
|  | Copolymer 12 | — | — | — | — | 60 | — | — | — | — | — |
|  | Carbon black | 5 | 5 | 5 | 5 | 5 | 5 | 5 | 5 | 5 | 5 |
|  | Silica | 75 | 75 | 75 | 75 | 75 | 75 | 75 | 75 | 75 | 75 |
|  | Silane coupling agent 1 (NXT-Z45) | 3 | — | 3 | — | — | — | — | — | — | — |
|  | Silane coupling agent 2 (Si363) | — | 6 | — | 6 | — | — | — | — | — | — |
|  | Silane coupling agent 3 (Si69) | — | — | — | — | 6 | 6 | 6 | 6 | 6 | 6 |
|  | Antioxidant | 2 | 2 | 2 | 2 | 2 | 2 | 2 | 2 | 2 | 2 |
|  | Wax | 2 | 2 | 2 | 2 | 2 | 2 | 2 | 2 | 2 | 2 |
|  | Oil | 20 | 20 | 20 | 20 | 20 | 20 | 20 | 20 | 20 | 20 |
|  | Stearic acid | 2 | 2 | 2 | 2 | 2 | 2 | 2 | 2 | 2 | 2 |
|  | Zinc oxide | 2 | 2 | 2 | 2 | 2 | 2 | 2 | 2 | 2 | 2 |
|  | Sulfur | 1.5 | 1.5 | 1.5 | 1.5 | 1.5 | 1.5 | 1.5 | 1.5 | 1.5 | 1.5 |
|  | Vulcanization accelerator CZ | 1.5 | 1.5 | 1.5 | 1.5 | 1.5 | 1.5 | 1.5 | 1.5 | 1.5 | 1.5 |
|  | Vulcanization accelerator D | 1 | 1 | 1 | 1 | 1 | 1 | 1 | 1 | 1 | 1 |
| Evaluation | Rolling resistance index | 140 | 138 | 180 | 175 | 100 | 110 | 167 | 78 | 96 | 78 |
|  | Wet grip performance index | 135 | 133 | 145 | 140 | 100 | 105 | 108 | 76 | 94 | 75 |
|  | Abrasion resistance index | 122 | 120 | 129 | 125 | 100 | 104 | 105 | 85 | 92 | 73 |

|  |  | Comparative Example |  |  |  |  |  |  |  |
|---|---|---|---|---|---|---|---|---|---|
|  |  | 21 | 22 | 23 | 24 | 25 | 26 | 27 | 28 |
| Formulation (parts by mass) | NR | 20 | 20 | 20 | 20 | 20 | 20 | 20 | 20 |
|  | BR | 20 | 20 | 20 | 20 | 20 | 20 | 20 | 20 |
|  | Copolymer 7 | — | — | — | — | — | — | — | — |
|  | Copolymer 11 | — | — | — | — | — | — | — | — |
|  | Copolymer 8 | 60 | — | — | — | 60 | — | — | — |
|  | Copolymer 9 | — | 60 | — | — | — | 60 | — | — |
|  | Copolymer 10 | — | — | 60 | — | — | — | 60 | — |
|  | Copolymer 12 | — | — | — | 60 | — | — | — | 60 |
|  | Carbon black | 5 | 5 | 5 | 5 | 5 | 5 | 5 | 5 |
|  | Silica | 75 | 75 | 75 | 75 | 75 | 75 | 75 | 75 |
|  | Silane coupling agent 1 (NXT-Z45) | 3 | 3 | 3 | 3 | — | — | — | — |
|  | Silane coupling agent 2 (Si363) | — | — | — | — | 6 | 6 | 6 | 6 |
|  | Silane coupling agent 3 (Si69) | — | — | — | — | — | — | — | — |
|  | Antioxidant | 2 | 2 | 2 | 2 | 2 | 2 | 2 | 2 |
|  | Wax | 2 | 2 | 2 | 2 | 2 | 2 | 2 | 2 |
|  | Oil | 20 | 20 | 20 | 20 | 20 | 20 | 20 | 20 |
|  | Stearic acid | 2 | 2 | 2 | 2 | 2 | 2 | 2 | 2 |
|  | Zinc oxide | 2 | 2 | 2 | 2 | 2 | 2 | 2 | 2 |
|  | Sulfur | 1.5 | 1.5 | 1.5 | 1.5 | 1.5 | 1.5 | 1.5 | 1.5 |
|  | Vulcanization accelerator CZ | 1.5 | 1.5 | 1.5 | 1.5 | 1.5 | 1.5 | 1.5 | 1.5 |
|  | Vulcanization accelerator D | 1 | 1 | 1 | 1 | 1 | 1 | 1 | 1 |
| Evaluation | Rolling resistance index | 102 | 96 | 80 | 110 | 108 | 101 | 80 | 100 |
|  | Wet grip performance index | 109 | 95 | 83 | 109 | 107 | 102 | 81 | 99 |
|  | Abrasion resistance index | 108 | 94 | 81 | 108 | 105 | 100 | 82 | 98 |

TABLE 6

|  |  | Example | | | Comparative Example | | |
|---|---|---|---|---|---|---|---|
|  |  | 9 | 10 | 11 | 29 | 30 | 31 |
| Formulation (parts by mass) | NR | 20 | 20 | 20 | 20 | 20 | 20 |
|  | BR | 20 | 20 | 20 | 20 | 20 | 20 |
|  | Copolymer 13 | 60 | — | 60 | 60 | — | — |
|  | Copolymer 14 | — | 60 | — | — | — | — |
|  | Copolymer 15 | — | — | — | — | 60 | 60 |
|  | Silica | 75 | 75 | 75 | 75 | 75 | 75 |
|  | Silane coupling agent 1 (NXT-Z45) | 3 | 3 | — | — | 3 | — |
|  | Silane coupling agent 2 (Si363) | — | — | 6 | — | — | — |
|  | Silane coupling agent 3 (Si69) | — | — | — | 6 | — | 6 |
|  | Carbon black | 5 | 5 | 5 | 5 | 5 | 5 |
|  | Oil | 20 | 20 | 20 | 20 | 20 | 20 |
|  | Antioxidant | 2 | 2 | 2 | 2 | 2 | 2 |
|  | Stearic acid | 2 | 2 | 2 | 2 | 2 | 2 |
|  | Zinc oxide | 2 | 2 | 2 | 2 | 2 | 2 |
|  | Wax | 2 | 2 | 2 | 2 | 2 | 2 |
|  | Sulfur | 1.5 | 1.5 | 1.5 | 1.5 | 1.5 | 1.5 |
|  | Vulcanization accelerator CZ | 1.5 | 1.5 | 1.5 | 1.5 | 1.5 | 1.5 |
|  | Vulcanization accelerator D | 1 | 1 | 1 | 1 | 1 | 1 |
| Evaluation | Rolling resistance index | 165 | 176 | 162 | 150 | 110 | 100 |
|  | Wet grip performance index | 156 | 165 | 152 | 140 | 110 | 100 |
|  | Abrasion resistance index | 102 | 101 | 103 | 102 | 100 | 100 |

As shown in Table 6, the rubber compositions of the examples that include a conjugated diene polymer (B) (copolymer 13 or 14) containing specific monomer units; silica; and a silane coupling agent containing a mercapto group (silane coupling agent 1 or 2) show synergistic improvements in fuel economy, wet grip performance, and abrasion resistance and thus achieve high levels of these properties in a balanced manner, as compared with the rubber compositions of the comparative examples.

The invention claimed is:

1. A pneumatic tire, formed from a tread rubber composition comprising: (i) a rubber component; (ii) silica in an amount of 5 to 150 parts by mass relative to 100 parts by mass of the rubber component; and (iii) a silane coupling agent containing a mercapto group,
(i) the rubber component comprising a conjugated diene polymer (A) in an amount of 20-90% by mass per 100% by mass of the rubber component, the conjugated diene polymer (A) comprising a monomer unit derived from a conjugated diene, a monomer unit derived from a compound represented by the following formula (1), and a monomer unit derived from a compound represented by the following formula (2), at least one end of the copolymer (A) being modified by the following compound (G) or an alkoxysilane compound, the conjugated diene polymer (A) having a vinyl bond content of at least 20 mol % but not more than 70 mol % based on 100 mol % of the constituent unit derived from a conjugated diene, $$V^1\text{-}S^1 \tag{1}$$

wherein $V^1$ is a group of the formula (1-V1) and S1 is a group of the formula (1-S);

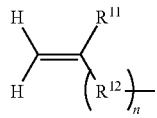
(1-V1)

wherein $R^{11}$ represents a hydrogen atom or a hydrocarbyl group; n represents 0 or 1; and $R^{12}$ represents a hydrocarbylene group,

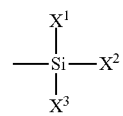
(1-S)

wherein $X^1$, $X^2$, and $X^3$ each independently represent a substituted amino group or an optionally substituted hydrocarbyl group, and at least one of $X^1$, $X^2$, and $X^3$ is a substituted amino group, $$V^2\text{-}A^2 \tag{2}$$

wherein $V^2$ represents a group represented by the following formula (2-V1); and $A^2$ represents a group represented by the following formula (2-A),

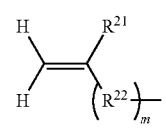
(2-V1)

wherein $R^{21}$ represents a hydrogen atom or a hydrocarbyl group; m represents 0 or 1; and $R^{22}$ represents a hydrocarbylene group,

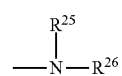
(2-A)

wherein $R^{25}$ and $R^{26}$ each represent a hydrocarbyl group or a trihydrocarbylsilyl group, or $R^{25}$ and $R^{26}$ are joined together to form a hydrocarbylene group optionally containing at least one of a nitrogen atom and en oxygen atom as a hetero atom, or $R^{25}$ and $R^{26}$ together form a single group bonded to the nitrogen atom via a double bond, Compound (G) being a compound of formula (3) and the alkoxysilane compound being a compound of formula (4):

(3)

wherein E represents an oxygen atom or a sulfur atom; and $Z^1$ and $Z^2$ each represent a substituted amino group, a hydrogen atom, an optionally substituted hydrocarbyl group, or an optionally substituted hydrocarbyloxy group, provided that at least one of $Z^1$ and $Z^1$ is a group containing a substituted amino group, or $Z^1$ and $Z^2$ are joined together to for, together with the carbonyl carbon atom, a cyclic structure containing a substituted amino group,

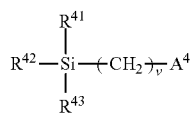
(4)

wherein v represents an integer of 1 to 10; $R^{41}$, $R^{42}$, and $R^{43}$ each independently represent an alkyl group or an alkoxy group, and at least one of $R^{41}$, $R^{42}$, and $R^{43}$ is an alkoxy group; and $A^4$ represents a substituted amino group, (iii) the silane coupling agent being at least one of a silane coupling agent represented by the following formula (I) and a silane coupling agent containing a linking unit B represented by the following formula (II) and a linking unit A represented by the following formula (III),

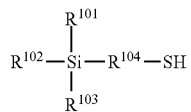
(I)

wherein $R^{101}$ to $R^{103}$ each represent a branched or unbranched C1-5 alkyl group, a branched or unbranched C1-5 alkoxy group, or a group represented by —O—$(R^{111}$—O$)_b$—$R^{112}$ where b $R^{111}$s each represent a branched or unbranched C1-15 divalent hydrocarbon group, and b $R^{111}$s may be the same as or different from one another; $R^{112}$ represents a branched or unbranched C3-25 alkyl group, a branched or unbranched C3-25 alkenyl group, a C10-20 aryl group, or a C10-20 aralkyl group; and b represents an integer of 2 to 20, and $R^{101}$ to $R^{103}$ may be the same as or different from one another; at least one of $R^{101}$ to $R^{103}$ is a group represented by —O—$(R^{111}$—O$)_b$—$R^{112}$; and $R^{104}$ represents a branched or unbranched C1-5 alkylene group,

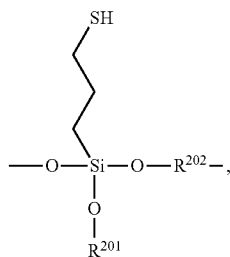
(II)

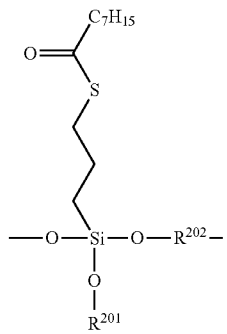
(III)

wherein $R^{201}$ represents a hydrogen atom, a halogen atom, a branched or unbranched C1-12 alkyl group, a branched or unbranched C2-12 alkenyl group, a branched or unbranched C2-12 alkynyl group, or the alkyl group in which a terminal hydrogen atom is replaced with a hydroxy group or a carboxyl group; and $R^{202}$ represents a branched or unbranched C1-12 alkylene group, a branched or unbranched C2-12 alkenylene group, or a branched or unbranched C2-12 alkynylene group, provided that $R^{201}$ and $R^{202}$ together may form a cyclic structure.

2. The pneumatic tire according to claim 1, wherein, in the formula (3),

E is an oxygen atom;

$Z^1$ is a group represented by the following formula (3-Z); and $Z^2$ is a hydrocarbyl group or a group represented by the following formula (3-Z):

-(T)$_p$-A$^3$    (3-Z)

wherein p represents 0 or 1; T represents a C1-10 hydrocarbylene group, a group represented by the following formula (3-Ta), or a group represented by the following formula (3-Tb); and $A^3$ represents a substituted amino group, and when $Z^2$ in the formula (3) is a hydrocarbyl group, $A^3$ of $Z^1$ and the hydrocarbyl group of $Z^2$ may be bonded, and when $Z^2$ in the formula (3) is a group represented by the formula (3-Z), $A^3$ of $Z^1$ and $A^3$ of $Z^2$ may be bonded,

(3-Ta)

wherein $R^{31}$ represents a C1-10 hydrocarbylene group; and $R^{31}$ and $A^3$ are bonded,

(3-Tb)

wherein $R^{32}$ represents a C1-10 hydrocarbylene group; $R^{33}$ represents a hydrogen atom or a C1-10 hydrocarbyl group; and $R^{32}$ and $A^3$ are bonded.

3. The pneumatic tire according to claim 1, wherein, in the formula (1-V1), $R^{11}$ is a hydrogen atom; and n is 0.

4. A pneumatic tire formed from a tread rubber composition comprising: a rubber component; silica; and a silane coupling agent containing a mercapto group,
the rubber component comprising a conjugated diene polymer (B) in an amount of 20-90% by mass per 100% by mass of the rubber component, the conjugated diene polymer (B) comprising a monomer unit derived from a conjugated diene, a monomer unit derived from a compound represented by the following formula (5), and a monomer unit derived from a compound represented by the following formula (6), the conjugated diene polymer (B) having a vinyl bond content of at least 20 mol % but not more than 70 mol % based on 100 mol % of the constituent unit derived from a conjugated diene,
the tread rubber composition comprising the silica in an amount of 5 to 150 parts by mass relative to 100 parts by mass of the rubber component,
the silane coupling agent being at least one of a silane coupling agent represented by the following formula (I) and a silane coupling agent containing a linking unit B represented by the following formula (II) and a linking unit A represented by the following formula (III),

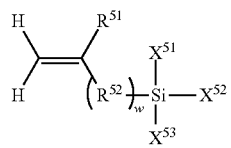
(5)

wherein $R^{51}$ represents a hydrogen atom or a hydrocarbyl group; w represents 0 or 1; $R^{52}$ represents a hydrocarbylene group; and $X^{51}$, $X^{52}$, and $X^{53}$ each independently represent a substituted amino group or an optionally substituted hydrocarbyl group, and at least one of $X^{51}$, $X^{52}$, and $X^{53}$ is a substituted amino group,

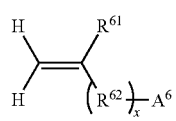
(6)

wherein $R^{61}$ represents a hydrogen atom or a hydrocarbyl group; x represents 0 or 1; $R^{62}$ represents a hydrocarbylene group; and $A^6$ represents a substituted amino group or a nitrogen-containing heterocyclic group,

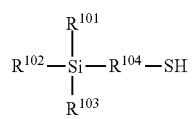
(I)

wherein $R^{101}$ to $R^{103}$ each represent a branched or unbranched C1-5 alkyl group, a branched or unbranched C1-5 alkoxy group, or a group represented by —O—($R^{111}$—O)$_b$—$R^{112}$ where b $R^{111}$s each represent a branched or unbranched C1-15 divalent hydrocarbon group, and b $R^{111}$s may be the same as or different from one another; $R^{112}$ represents a branched or unbranched C3-25 alkyl group, a branched or unbranched C3-25 alkenyl group, a C10-20 aryl group, or a C10-20 aralkyl group; and b represents an integer of 2 to 20, and $R^{101}$ to $R^{103}$ may be the same as or different from one another; at least one of $R^{101}$ to $R^{103}$ is a group represented by —O—($R^{111}$—O)$_b$—$R^{112}$; and $R^{104}$ represents a branched or unbranched C1-5 alkylene group,

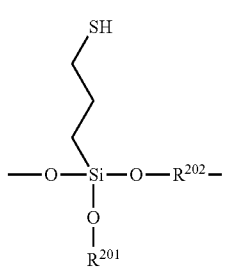
(II)

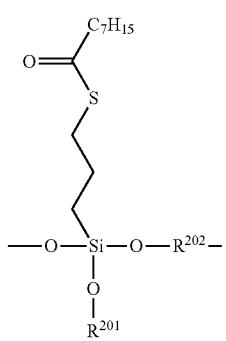
(III)

wherein $R^{201}$ represents a hydrogen atom, a halogen atom, a branched or unbranched C1-12 alkyl group, a branched or unbranched C2-12 alkenyl group, a branched or unbranched C2-12 alkynyl group, or the alkyl group in which a terminal hydrogen atom is replaced with a hydroxy group or a carboxyl group; and $R^{202}$ represents a branched or unbranched C1-12 alkylene group, a branched or unbranched C2-12 alkenylene group, or a branched or unbranched C2-12 alkynylene group, provided that $R^{201}$ and $R^{202}$ together may form a cyclic structure.

5. The pneumatic tire according to claim 4, wherein, in the formula (5), $R^{51}$ is a hydrogen atom; and w is 0.

6. The pneumatic tire according to claim 4, wherein, in the formula (6), $R^{61}$ is a hydrogen atom; x is 1; $R^{62}$ is a group represented by the following formula (6-Y); and A is a substituted amino group,

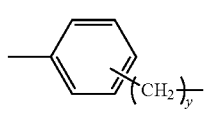
(6-Y)

wherein y represents an integer of 0 to 5; and when y is an integer of 1 to 5, $(CH_2)_y$ represents a substituent on the benzene ring and is bonded to $A^6$, and when y is 0, $(CH_2)_y$ represents a bond between the benzene ring and $A^6$.

* * * * *